(12) United States Patent
Hirayama et al.

(10) Patent No.: US 9,971,081 B1
(45) Date of Patent: May 15, 2018

(54) LIGHTING DEVICE AND DISPLAY DEVICE

(71) Applicant: Sharp Kabushiki Kaisha, Sakai, Osaka (JP)

(72) Inventors: Yoshinobu Hirayama, Sakai (JP); Takao Imaoku, Sakai (JP); Takeshi Ishida, Sakai (JP); Ryuzo Yuki, Sakai (JP); Shugo Yagi, Yonago (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days. days.

(21) Appl. No.: 15/881,849

(22) Filed: Jan. 29, 2018

Related U.S. Application Data

(63) Continuation of application No. 15/329,662, filed as application No. PCT/JP2015/070789 on Jul. 22, 2015, now Pat. No. 9,915,770.

(30) Foreign Application Priority Data

Jul. 29, 2014 (JP) .................................. 2014-153978

(51) Int. Cl.
*F21V 7/04* (2006.01)
*F21V 8/00* (2006.01)
*G02F 1/1333* (2006.01)

(52) U.S. Cl.
CPC ......... *G02B 6/0038* (2013.01); *G02B 6/0036* (2013.01); *G02B 6/0053* (2013.01); *G02B 6/0055* (2013.01); *G02B 6/0061* (2013.01); *G02B 6/009* (2013.01); *G02B 6/0085* (2013.01); *G02F 1/133308* (2013.01); *G02F 2001/133314* (2013.01); *G02F 2001/133317* (2013.01)

(58) Field of Classification Search
CPC .. G02B 6/0038; G02B 6/0055; G02B 6/0053; G02B 6/0061
See application file for complete search history.

(56) References Cited

U.S. PATENT DOCUMENTS

2009/0297991 A1* 12/2009 Mizutani ............... G03F 7/0005
430/325
2010/0053997 A1* 3/2010 Teng .................... G02B 6/0038
362/617

(Continued)

OTHER PUBLICATIONS

Hirayama et al., "Lighting Device and Display Device", U.S. Appl. No. 15/329,662, filed Jan. 27, 2017.

*Primary Examiner* — Evan Dzierzynski
(74) *Attorney, Agent, or Firm* — Keating & Bennett, LLP

(57) ABSTRACT

A backlight unit includes LEDs, a light guide plate, a prism sheet, exiting light reflecting portions, prisms, concave lenticular lenses, and flat portions. The concave lenticular lenses are configured such that an occupancy rate of concave cylindrical lenses with respect to the second direction is higher in an area closer to a light entering surface with respect to the first direction and the occupancy rate is lower in an area farther from the light entering surface. The flat portions are formed adjacent to the concave cylindrical lenses with respect to the second direction such that an occupancy rate of flat portions with respect to the second direction is lower in an area closer to a light entering surface with respect to the first direction and the occupancy rate of the flat portions with respect to the second direction is higher in an area farther from the light entering surface.

8 Claims, 46 Drawing Sheets

(56) References Cited

U.S. PATENT DOCUMENTS

2014/0367873 A1* 12/2014 Yang .................... G02B 5/0215
264/2.5
2015/0138833 A1* 5/2015 He ....................... G02B 6/0038
362/611

* cited by examiner

ANGLE RELATIVE TO FRONTWARD DIRECTION WITH RESPECT TO THE SECOND DIRECTION (°)

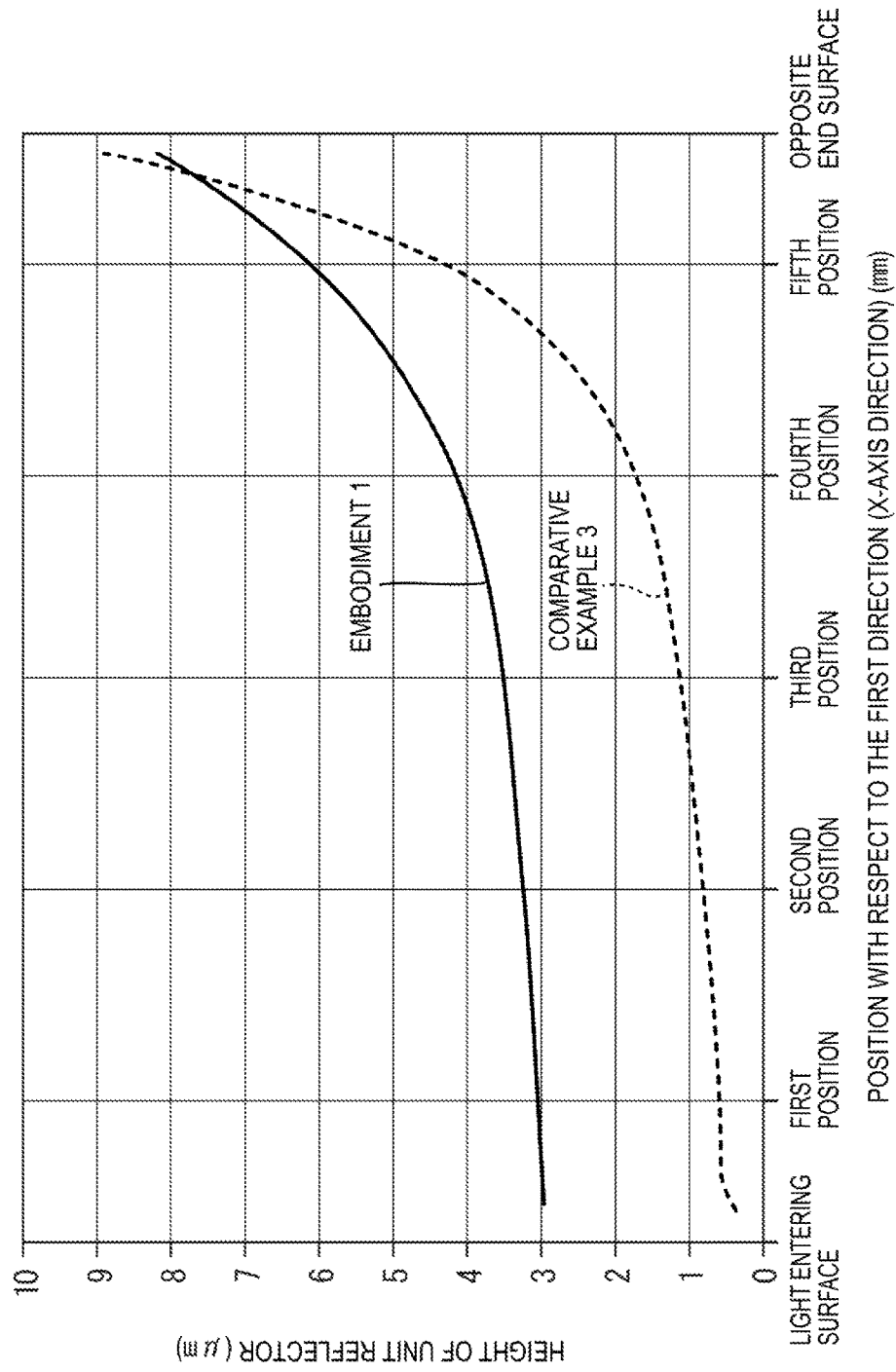

FIG.21

| | FIRST POSITION | | SECOND POSITION | | THIRD POSITION | | FOURTH POSITION | | FIFTH POSITION | |
|---|---|---|---|---|---|---|---|---|---|---|
| | HEIGHT OF UNIT REFLECTOR (μm) | SHAPE REPRODUCIBILITY | HEIGHT OF UNIT REFLECTOR (μm) | SHAPE REPRODUCIBILITY | HEIGHT OF UNIT REFLECTOR (μm) | SHAPE REPRODUCIBILITY | HEIGHT OF UNIT REFLECTOR (μm) | SHAPE REPRODUCIBILITY | HEIGHT OF UNIT REFLECTOR (μm) | SHAPE REPRODUCIBILITY |
| COMPARATIVE EXAMPLE 3 | 0.60 | BAD | 0.81 | BAD | 1.14 | BAD | 1.72 | BAD | 4.34 | GOOD |
| EMBODIMENT 1 | 3.05 | REASONABLY GOOD | 3.24 | GOOD | 3.53 | GOOD | 4.16 | GOOD | 6.13 | GOOD |

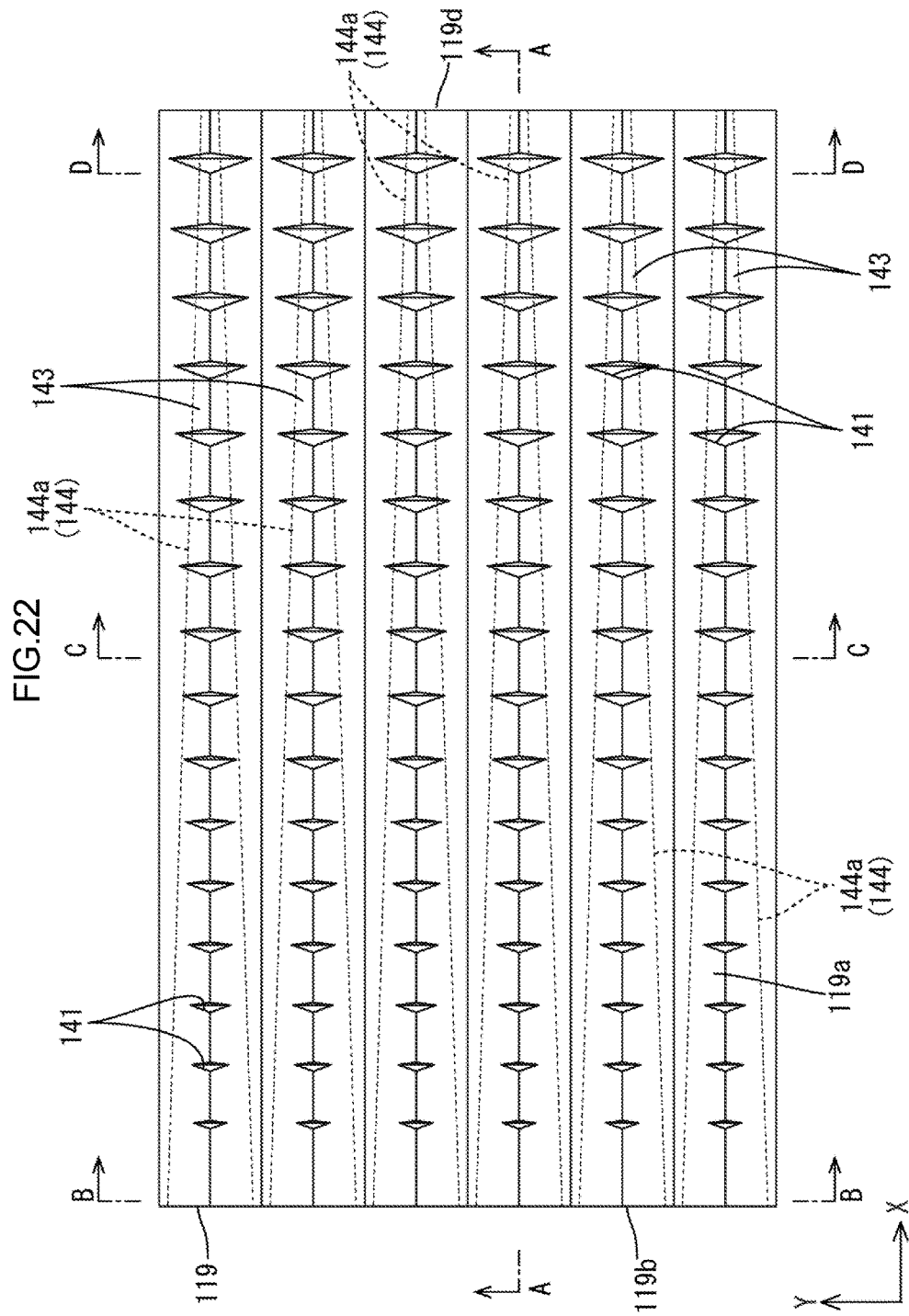

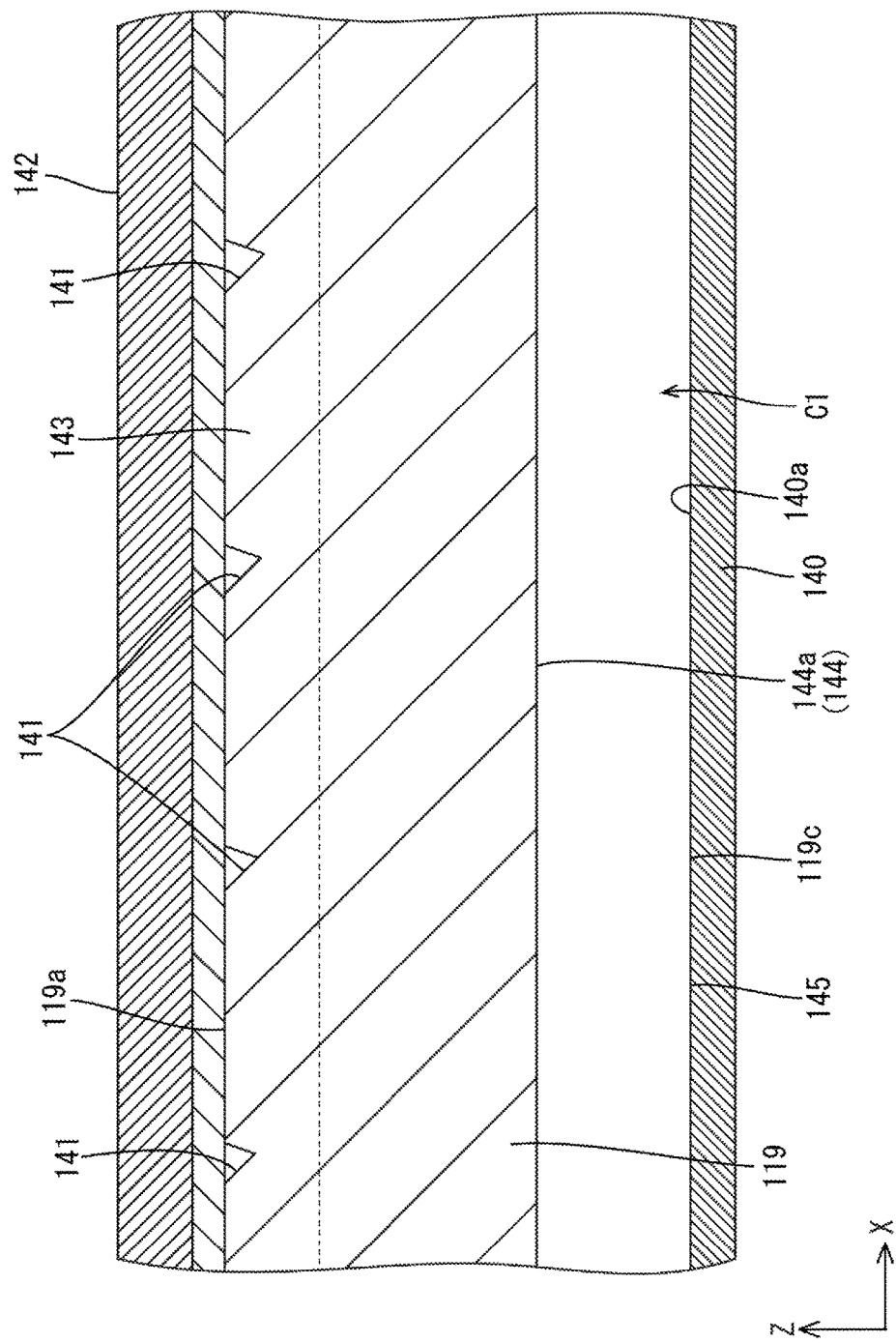

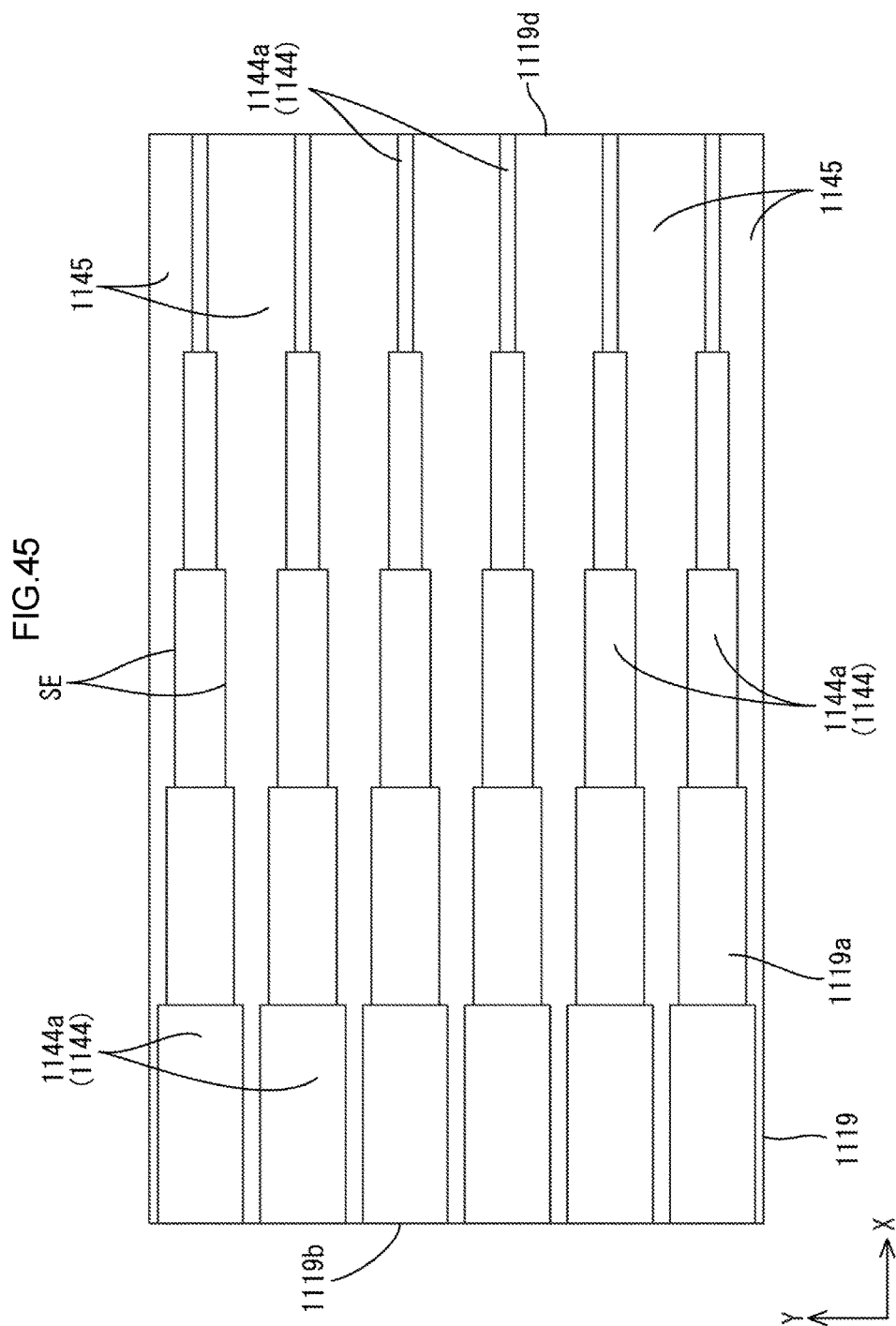

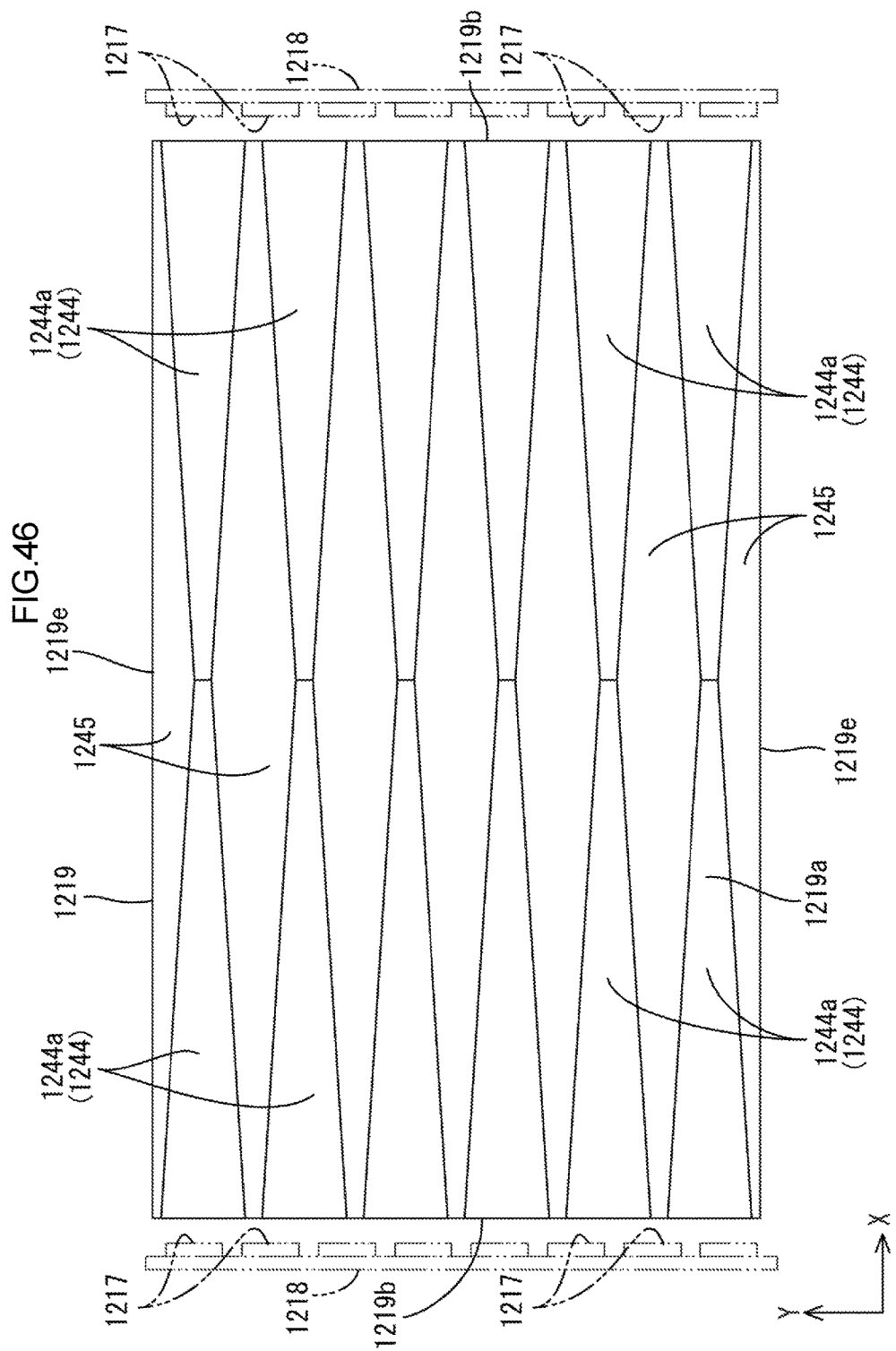

LIGHTING DEVICE AND DISPLAY DEVICE

TECHNICAL FIELD

The present invention relates to a lighting device and a display device.

BACKGROUND ART

Display components in image display devices, such as television devices, are now shifting from conventional cathode-ray tube displays to thin display panels, such as liquid crystal panels and plasma display panels. With the thin display panels, the thicknesses of the image display devices can be reduced. Liquid crystal panels included in the liquid crystal display devices do not emit light, and thus backlight devices are required as separate lighting devices. The backlight devices are generally classified into direct-type and edge-light-type according to mechanisms. An edge-light-type backlight device includes a light guide plate for guiding light from a light source and an optical member for converting the light from the light guide plate to even planar light with optical properties and for supplying the light to a liquid crystal panel. An example of such a device is disclosed in Patent Document 1. Patent Document 1 discloses a configuration that includes multiple ridged lenses on a light exiting surface of a light guide plate such that the light guide plate has light collecting properties to improve brightness without a prism sheet.

RELATED ART DOCUMENT

Patent Document

Patent Document 1: Japanese unexamined patent application publication No. 2005-71610

Problem to be Solved by the Invention

Although a technology disclosed in Patent Document 1 using the ridged lenses on the light exiting surface of the light guide plate may improve a frontward brightness of exiting light, uneven brightness is more likely to occur. Point light sources are arranged at intervals along a longitudinal direction of a light entering surface of the light guide plate in Patent Document 1. In an area of the light guide plate closer to the light entering surface, bright spots and dark spots tend to appear along an arrangement direction of the point light sources, that is, uneven brightness tends to occur in light exiting from the light exiting surface. With the ridged lenses described above, brightness of the bright spots is further increased and thus the uneven brightness in the area close to the light entering surface is more likely to occur.

DISCLOSURE OF THE PRESENT INVENTION

The present invention was made in view of the foregoing circumstances. An object is to reduce uneven brightness.

Means for Solving the Problem

A lighting device according to the present invention includes a light source, a light guide plate, alight exiting-side anisotropic light collecting portion, an exiting light reflecting portion, a prism portion, a lenticular lens portion, and flat portions. The light guide plate has a rectangular plate shape. The light guide plate includes peripheral end surfaces opposite from teach other and plate surface. At least one of the peripheral end surfaces is configured as a light entering surface through which light emitted by the light source enters. One of the plate surfaces is configured as a light exiting surface through which the light exits. The other one of the plate surfaces is defined as an opposite surface. The light exiting-side anisotropic light collecting portion formed on a light exiting side. The light exiting-side anisotropic light collecting portion includes light exiting-side unit light collectors that extend along a first direction that is parallel to peripheral end surfaces of the light guide plate not including the light entering surface. The unit light collectors are arranged parallel to one another along a second direction parallel to the peripheral end surfaces including the light entering surface. The exiting light reflecting portion is formed on one of a light exiting surface side and an opposite plate surface side of the light guide plate for reflecting light traveling through the light guide plate such that the light exits from the light exiting surface. The exiting light reflecting portion includes unit reflectors that extend along the second direction and are arranged at intervals along the first direction. The prism portion is formed on one of the light exiting surface side and the opposite plate surface side of the light guide plate. The prism portion includes unit prisms that extend along the first direction and are arranged along the second direction. The lenticular lens portion is formed on the other one of the light exiting surface and the opposite plate surface of the light guide plate. The lenticular lens portion includes cylindrical lenses that extend along the first direction and are arranged along the second direction such that an occupancy rate of the cylindrical lenses with respect to the second direction is higher in an area closer to the light entering surface and lower in an area farther from the light entering surface. Flat portions are formed on the other one of the light exiting surface and the opposite plate surface of the light guide plate. The flat portions are flat along the first direction and the second direction. The flat portions are arranged adjacent to the cylindrical lenses with respect to the second direction such that an occupancy rate of the flat portions with respect to the second direction is lower in the area closer to the light entering surface and higher in the area farther from the light entering surface.

According to the configuration, the light emitted by the light source enters the light guide plate through the light entering surface and travels through the light guide plate. During the transmission, the light is reflected by the exiting light reflecting portion. The unit reflectors of the exiting light reflecting portion extending along the second direction are arranged at intervals along the first direction. Therefore, the light traveling through the light guide plate along the first direction is reflected and directed to the light exiting surface to exit through the light exiting surface. Anisotropic light collecting effects are added to at least some rays of light exiting from the light exiting surface by the prism portion and the lenticular lens portion. The prism portion and the lenticular lens portion include unit prisms and the cylindrical lenses, respectively. The prisms and the cylindrical lenses extend along the first direction. The prisms and the cylindrical lenses are arranged along the second direction. Light collecting effects are selectively added to at least some rays of light exiting from the light exiting surface by at least one of the unit prisms and the cylindrical lenses with respect to the second direction.

Rays of light traveling through the light guide plate along the first direction without being reflected by the exiting light reflecting portion are totally reflected by the prism portion and the lenticular lens portion. As a result, the light travels through the light guide plate while diffusing with respect to the second direction. Because the lenticular lens portion includes the cylindrical lenses, the rays of light totally reflected by the cylindrical lenses are more likely to be scattered to a wider area with respect to the second direction.

The anisotropic light collecting effects are added to the light exiting from the light exiting surface of the light guide plate by the light exiting-side anisotropic light collecting portion on the light exiting side relative to the light guide plate. Because the light exiting-side anisotropic light collecting portion includes the light exiting-side unit light collectors that extend along the first direction and are arranged along the second direction, light collecting effects are electively added to rays of light exiting from the light exiting-side unit light collectors with respect to the second direction, which corresponds with an arrangement direction of the light exiting-side unit light collectors. Although the cylindrical lenses of the lenticular lens portion add the anisotropic light collecting effects to the rays of light reflected by the exiting light reflecting portion as described earlier, the rays of light to which the anisotropic light collecting effects are added are less likely to be collected with respect to the second direction at the light exiting-side anisotropic light collecting portion and more likely to be scattered with respect to the second direction. The flat portions adjacent to the cylindrical lenses with respect to the second direction are less likely to add specific optical effects to the rays of light reflected by the exiting light reflecting portion. Therefore, the anisotropic light collecting effects are dominantly added to the rays of light directed to the light exiting-side anisotropic light collecting portion via the flat portions by the prism portion. In the light exiting-side anisotropic light collecting portion, the light collecting effects are more likely to be added with respect to the second direction. As the occupancy rate of the cylindrical lenses of the lenticular lens portion with respect to the second direction is set higher and the occupancy rate of the flat portions with respect to the second direction is set lower, uneven brightness of light exiting from the light exiting-side anisotropic light collecting portion with respect to the second direction is more likely to be reduced but brightness is more likely to be reduced. As the occupancy rate of the flat portions with respect to the second direction is set higher and the occupancy rate of the cylindrical lenses with respect to the second direction is set lower, the uneven brightness of the light exiting from the light exiting-side anisotropic light collecting portion is less likely to be reduced but the brightness is more likely to be improved.

As described earlier, in the area close to the light entering surface with respect to the first direction, the occupancy late of the cylindrical lenses of the lenticular lens portion with respect to the second direction is higher and the occupancy rate of the flat portions with respect to the second direction is lower. In the area farther from the light entering surface with respect to the first direction, the occupancy rate of the cylindrical lenses with respect to the second direction is lower and the occupancy rate of the flat portions with respect to the second direction is higher. With the cylindrical lenses of the lenticular lens portion having the higher occupancy rate, in the area close to the light entering surface in which the uneven brightness due to the light source may occur, the uneven brightness is less likely to occur in the light exiting from the light exiting-side anisotropic light collecting portion with respect to the second direction. With the flat portions having the higher occupancy rate, in the area farther from the light entering surface with respect to the first direction in which the uneven brightness due to the light source is less likely to occur, the brightness of the light exiting from the light exiting-side anisotropic light collecting portion is increased. According to the configuration, the uneven brightness in the light exiting from the light exiting-side anisotropic light collecting portion is reduced and the brightness is improved.

Preferable embodiments of the present invention may include the following configurations.

(1) The exiting light reflecting portion and the prism portion may be formed on the opposite plate surface side of the light guide plate. The lenticular lens portion may be formed on the light exiting surface side of the light guide plate. According to the configuration, at least some of light rays reflected by the unit reflectors of the exiting light reflecting portion on the opposite plate surface side of the light guide plate are directed to the light exiting surface while the anisotropic light collecting effects are added by the prism portion and exit from the light exiting surface while the anisotropic light collecting effects are added by the lenticular lens portion formed on the light exiting surface. In comparison to a configuration in which the exiting light reflecting portions is formed on the light exiting surface side, light paths starting from where the light rays are reflected by the exiting light reflecting portion and ending where the light rays exit through the light exiting surface is simple and a loss of light is less likely to occur. Therefore, a reduction in brightness is less likely to occur.

(2) Each of the unit prisms of the prism portion may have a vertex angle in a range from 90° to 100°. According to the configuration, in comparison to a configuration in which the occupancy rate of the cylindrical lenses with respect to the second direction is constant, the brightness of the light exiting from the light exiting surface can be sufficiently improved.

(3) Each of the unit prisms of the prism portion may have a vertex angle of 100°. According to the configuration, in comparison to the configuration in which the occupancy rate of the cylindrical lenses with respect to the second direction is constant, the brightness of the light exiting from the light exiting surface can be improved at a maximum.

(4) Each of the unit prisms of the prism portion may have a vertex angle in a range from 120° to 160°. According to the configuration, in comparison to the configuration in which the occupancy rate of the cylindrical lenses with respect to the second direction is constant, the brightness of the light exiting from the light exiting surface can be sufficiently improved.

(5) Each of the unit prism of the prism portion may have a vertex angle in a range from 133° to 140°. According to the configuration, in comparison to the configuration in which the occupancy rate of the cylindrical lenses with respect to the second direction is constant, the brightness of the light exiting from the light exiting surface can be further improved.

(6) The lighting device may further include a reflecting member that includes a reflecting surface for reflecting light. The reflecting member may be disposed opposite the opposite plate surface of the light guide plate. The exiting light reflecting portion and the prism portion may be formed on the light exiting surface side of the light guide plate. The lenticular lens portion may be formed on the opposite plate surface side of the light guide plate. According to the configuration, some of the light rays reflected by the unit reflectors of the exiting light reflecting portion on the light exiting side of the light guide plate are directed to the opposite plate surface and exit with the anisotropic light collecting effects added by the lenticular lens portion. The exiting light rays are reflected by the reflecting member and directed to the light exiting surface after entering through the opposite plate surface. The light rays exit through the light exiting surface with the anisotropic light collecting effects added by the prism portion. Namely, light paths starting from where the light rays are reflected by the exiting light reflecting portion and ending where the light lays exit through the light exiting surface are complicated. Each of the light rays receives refraction effects at least twice when traveling from the opposite plate side to the reflecting member and when traveling from the reflecting member side to the opposite plate surface. The light rays reflected by the exiting light reflecting portion and to which the anisotropic light collecting effects are not added by the prism portion are less likely to be scattered with respect to the second direction due to the refraction effects. Therefore, the light rays are properly mixed with respect to the second direction and the uneven brightness is less likely to occur in the light exiting from the light exiting surface with respect to the second direction.

(7) Each of the unit prisms of the prism portion may have a vertex angle in a range from 135° to 155°. According to the configuration, in comparison to the configuration in which the occupancy rate of the cylindrical lenses with respect to the second direction is constant, the brightness of the light exiting from the light exiting surface can be sufficiently improved.

(8) Each of the unit prisms of the prism portion may have a vertex angle of 150°. According to the configuration, in comparison to the configuration in which the occupancy rate of the cylindrical lenses with respect to the second direction is constant, the brightness of the light exiting from the light exiting surface can be improved at a maximum.

(9) Each of the unit prisms of the prism portion may have a vertex angle of 110°. According to the configuration, in comparison to the configuration in which the occupancy rate of the cylindrical lenses with respect to the second direction is constant, the brightness of the light exiting from the light exiting surface can be sufficiently improved.

(10) Each of the cylindrical lenses of the lenticular lens portion may have a concave shape. According to the configuration, in comparison to the configuration in which each of the cylindrical lenses has a convex shape, light rays traveling through the light guide plate are more likely to enter a curved interface of the cylindrical lens with an angle of incidence larger than a critical angle. Therefore, the light rays are less likely to exit from the interface. The light rays traveling through the light guide plate are more likely to be totally reflected and to be scattered with respect to the second direction. Therefore, uneven brightness is less likely to occur with respect to the second direction.

(11) Each of the cylindrical lenses of the lenticular lens portion may have a convex shape. According to the configuration, in comparison to the configuration in which each of the cylindrical lenses has a concave shape, light rays traveling through the light guide plate are more likely to enter a curved interface of the cylindrical lens with an angle of incidence smaller than the critical angle. Therefore, the light rays are more likely to exit from the interface.

(12) The exiting light reflecting portion and the prism portion may be formed on the opposite plate surface side of the light guide plate. The lenticular lens portion may be formed on the light exiting surface side of the light guide plate. The cylindrical lenses of the lenticular lens portion may include a first cylindrical lens having a smaller height and a second cylindrical lens having a larger height. A clearance may be provided between the first cylindrical lens and the light exiting-side anisotropic light collecting portion. With the clearance between the first cylindrical lens of the cylindrical lenses and the light exiting-side anisotropic light collecting portion, the light exiting-side anisotropic light collecting portion is less likely to be in close contact with the lenticular lens portion. According to the configuration, uneven brightness of light exiting from the lighting device can be reduced.

(13) The lenticular lent portion and the flat portions may be formed such that the occupancy rate of the cylindrical lenses with respect to the second direction gradually and continuously decreases as a distance from the light entering surface with respect to the first direction increases and occupancy rate of the flat portions with respect to the second direction gradually and continuously increases as the distance from the light entering surface with respect to the first direction increases. According to the configuration, in comparison to the configuration in which the occupancy rate of the cylindrical lenses of the lenticular lens portion with respect to the second direction and the occupancy rate of the flat portions with respect to the second direction are altered stepwise, the uneven brightness is more properly reduced. Furthermore, this configuration is more preferable for improving the brightness.

(14) The unit reflectors of the exiting light reflecting portion may include segment unit reflectors arranged at intervals with respect to the second direction. An amount of light reflected by the unit reflectors tend to be proportional to a surface area of the unit reflectors. To achieve a necessary amount of reflected light, a surface area corresponding to the necessary amount of reflected light is required. If the unit reflectors are formed to extend for an entire length of the light guide plate with respect to the second direction, dimensions of the unit reflectors in a direction normal to the plate surface of the light guide plate cannot be increased more than specific dimensions to achieve the surface area of the unit reflectors. With the unit reflectors including the segment unit reflectors arranged at intervals with respect to the second direction, the dimensions of the unit reflectors in the direction normal to the plate surface of the light guide plate can be increased to achieve the surface area of the unit reflectors. If the light guide plate is prepared by molding and the exiting light reflecting portion is integrally formed with one of the light exiting surface and the opposite plate surface of the light guide plate, the segment unit reflectors of the unit reflectors on one of the light exiting surface and the opposite plate surface can be more easily formed in designed shapes. Therefore, the exiting light reflecting portion can properly deliver optical performances.

If the unit reflectors are formed to extend for the entire length of the light guide plate with respect to the second direction, the number of the unit reflectors with respect to the first direction may be reduced to adjust the total area that is calculated by adding up surface areas of the unit reflectors. According to the configuration, uneven brightness may occur because the intervals of the unit reflectors arranged in the first direction increase. With the unit reflectors including the segment unit reflectors arranged at intervals with respect to the second direction, it is not necessary to alter the number and the intervals of the unit reflectors with respect to the first direction. Therefore, uneven brightness is less likely to occur in light exiting from the lighting device.

(15) The unit reflectors of the exiting light reflecting portion are formed by cutting portions of the unit prisms of the prism portion on the vertex side to open along the second direction. If the unit reflectors do not open along the second direction but have side surfaces along the first direction, light rays may be refracted at or reflected by the side surfaces along the first direction. Namely, the prism portion may not deliver a proper level of light collecting performance. With the exiting light reflecting portion that includes the unit reflectors that are formed by cutting the portions of the unit prisms on the vertex side to open along the second direction, the prism portion can properly deliver the light collecting performances. According to the configuration, the brightness of the light exiting from the lighting device can be further improved.

Next, to solve the problem described earlier, a display device according to the present invention includes the lighting device described above and a display panel for display images using light from the lighting device.

According to the display device having such a configuration, images are displayed with high display quality because uneven brightness is less likely to occur in light exiting from the lighting device and high brightness is provided.

Advantageous Effect of the Invention

According to the present invention, the uneven brightness is less likely to occur.

BRIEF DESCRIPTION OF THE DRAWINGS

FIG. 20 is a graph illustrating heights of unit reflectors of exiting light reflecting portions of the light guide plates according to comparative example 3 and embodiment 1 in comparative experiment 5.

FIG. 21 is a table illustrating the heights of the unit reflectors and shape reproducibility at first to fifth positions on the light guide plates according to comparative example 3 and embodiment 1 in comparative experiment 5.

FIG. 22 is a cross-sectional view along line A-A in FIG. 22.

FIG. 23 is a cross-sectional view along line A-A in FIG. 22.

FIG. 45 is a plan view of a light guide plate according to a twelfth embodiment of the present invention.

FIG. 46 is a plan view of a light guide plate and LED boards according to a thirteenth embodiment of the present invention.

MODE FOR CARRYING OUT THE INVENTION

First Embodiment

Figure 1:
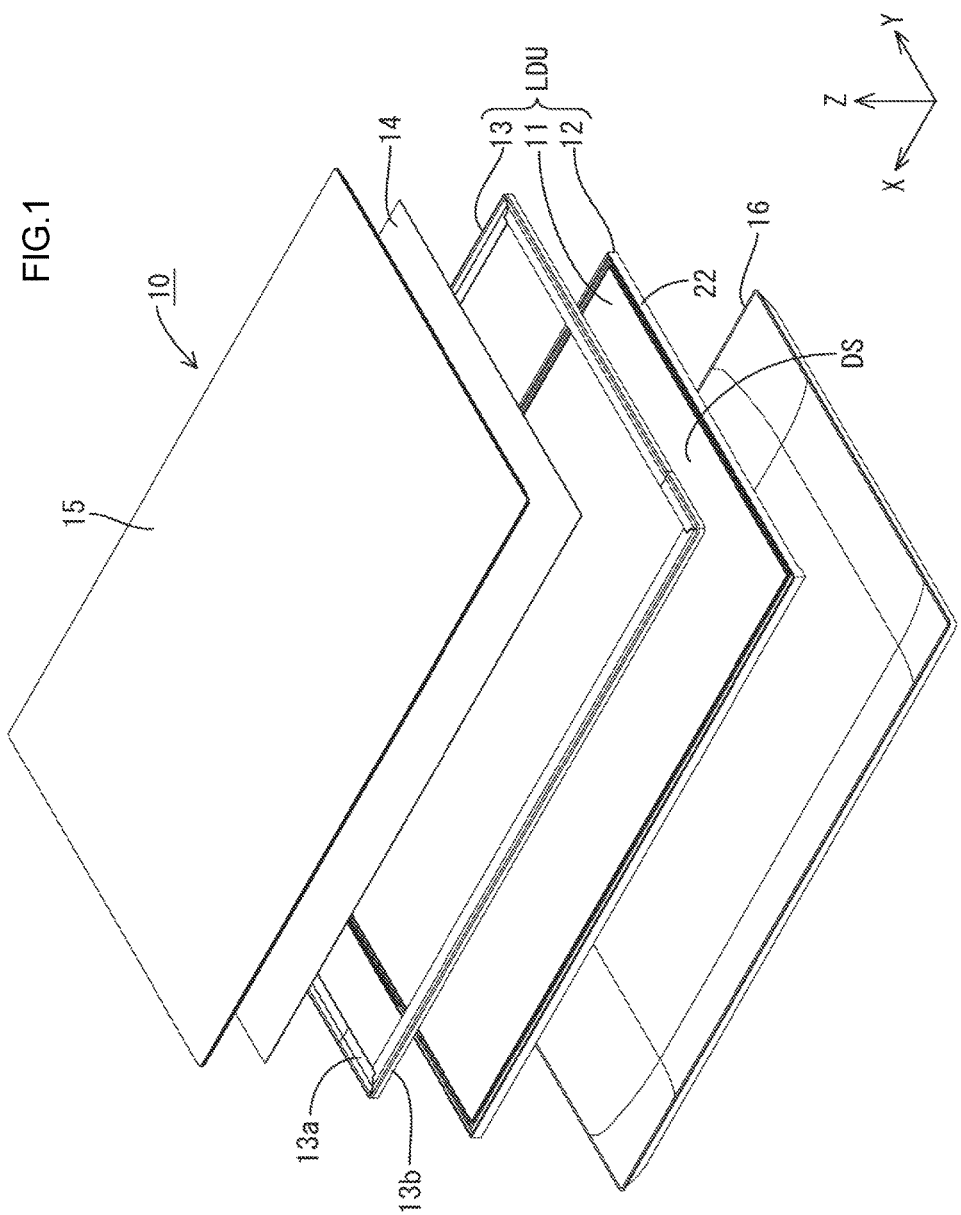
FIG. 1 is an exploded perspective view illustrating a general configuration of a liquid crystal display device according to a first embodiment of the present invention.

A first embodiment will be described with reference to FIGS. 1 to 21. In the following description, a liquid crystal display device 10 will be described. X-axes, Y-axes and Z-axes may be specified in the drawings. The axes in each drawing correspond to the respective axes in other drawings. The vertical direction is defined based on FIGS. 3 to 5 and the upper side and the lower side in those drawings correspond to the front and the rear of the device.

As illustrated in FIG. 1, the liquid crystal display device 10 has a rectangular overall shape in a plan view and includes a liquid crystal display unit LDU, which is a core component. The liquid crystal display device 10 includes a touchscreen 14, a cover panel (a protection panel, a cover glass) 15, and a case 16 fixed to the liquid crystal display unit LDU. The liquid crystal display unit LDU includes a liquid crystal panel (a display panel) 11, a backlight unit (a lighting device) 12, and a frame (a chassis component) 13. The liquid crystal panel 11 includes a display surface DS on the front side for displaying images. The backlight unit 12 is disposed behind the liquid crystal panel 11 and configured to emit light toward the liquid crystal panel 11. The frame 13 presses down the liquid crystal panel 11 from the front side, that is, a side opposite from the backlight unit 12 (a display surface DS side). The touchscreen 14 and the cover panel 15 are held in the frame 13 that is a component of the liquid crystal display unit LDU from the front and received by the frame 13 from the rear. The touchscreen 14 is disposed more to the front than the liquid crystal panel 11 with a predefined distance apart from the liquid crystal panel 11. A plate surface of the touchscreen 14 on the rear (or on the inner side) is an opposed surface that is opposed to the display surface DS. The cover panel 15 is disposed over the touchscreen 14 on the front and a plate surface thereof on the rear (or the inner side) is an opposed surface that is opposed to a plate surface of the touchscreen 14 on the front. An antireflective film AR is disposed between the touchscreen 14 and the color panel 15 (see FIG. 5). The case 16 is fixed to the frame 13 so as to cover the liquid crystal display unit LDU from the rear. Among the components of the liquid crystal display device 10, a portion of the frame 13 (a rolled portion 13b, which will be described later), the cover panel 15, and the case 16 form an appearance of the liquid crystal display device 10. The liquid crystal display device 10 according to this embodiment may be used for an electronic device such as a smartphone, a screen size of which is about 5 inches.

Figure 3:
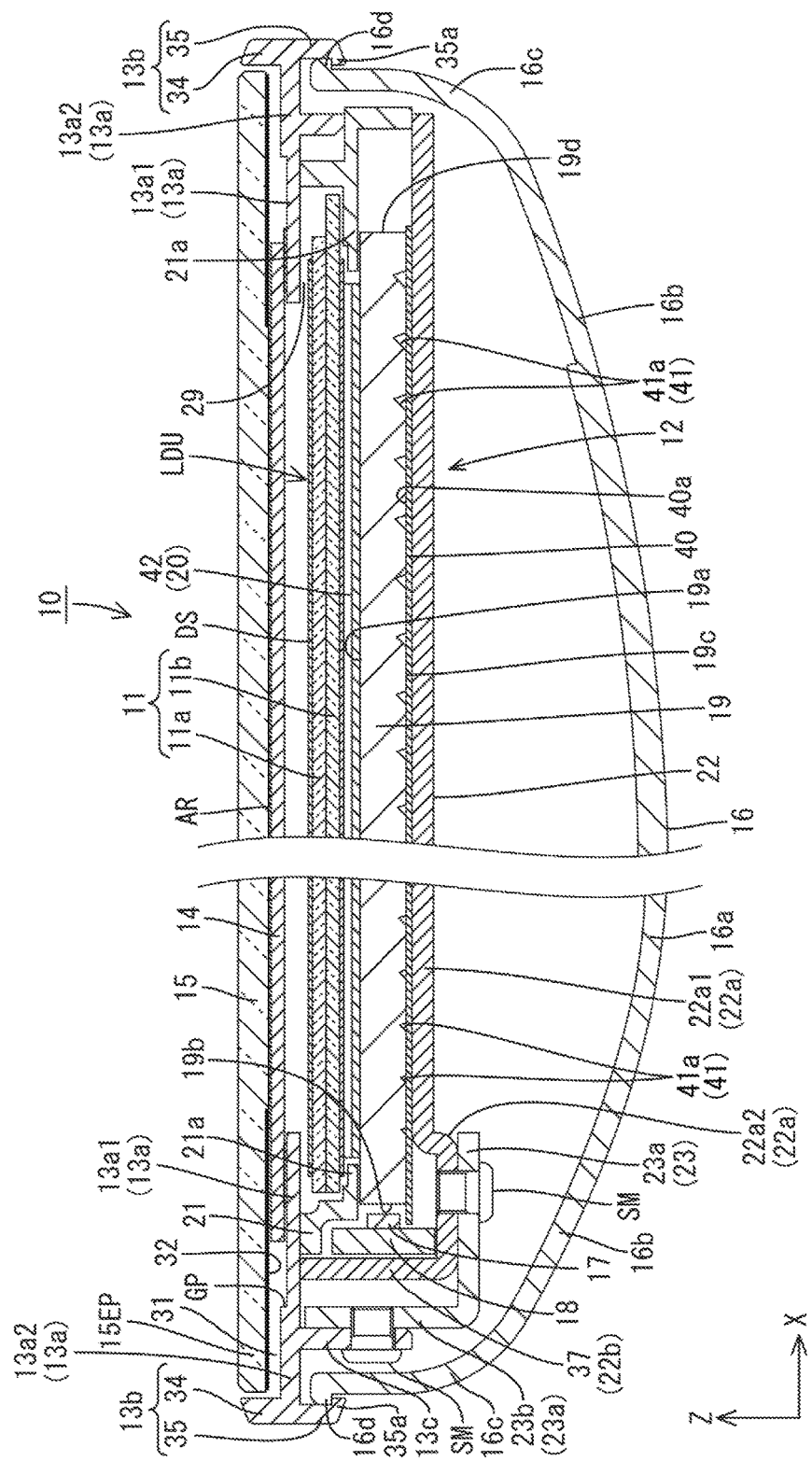
FIG. 3 is a cross-sectional view of the liquid crystal display device along a long-side direction thereof (a first direction, the X-axis direction) illustrating a cross-sectional configuration.
Figure 4:
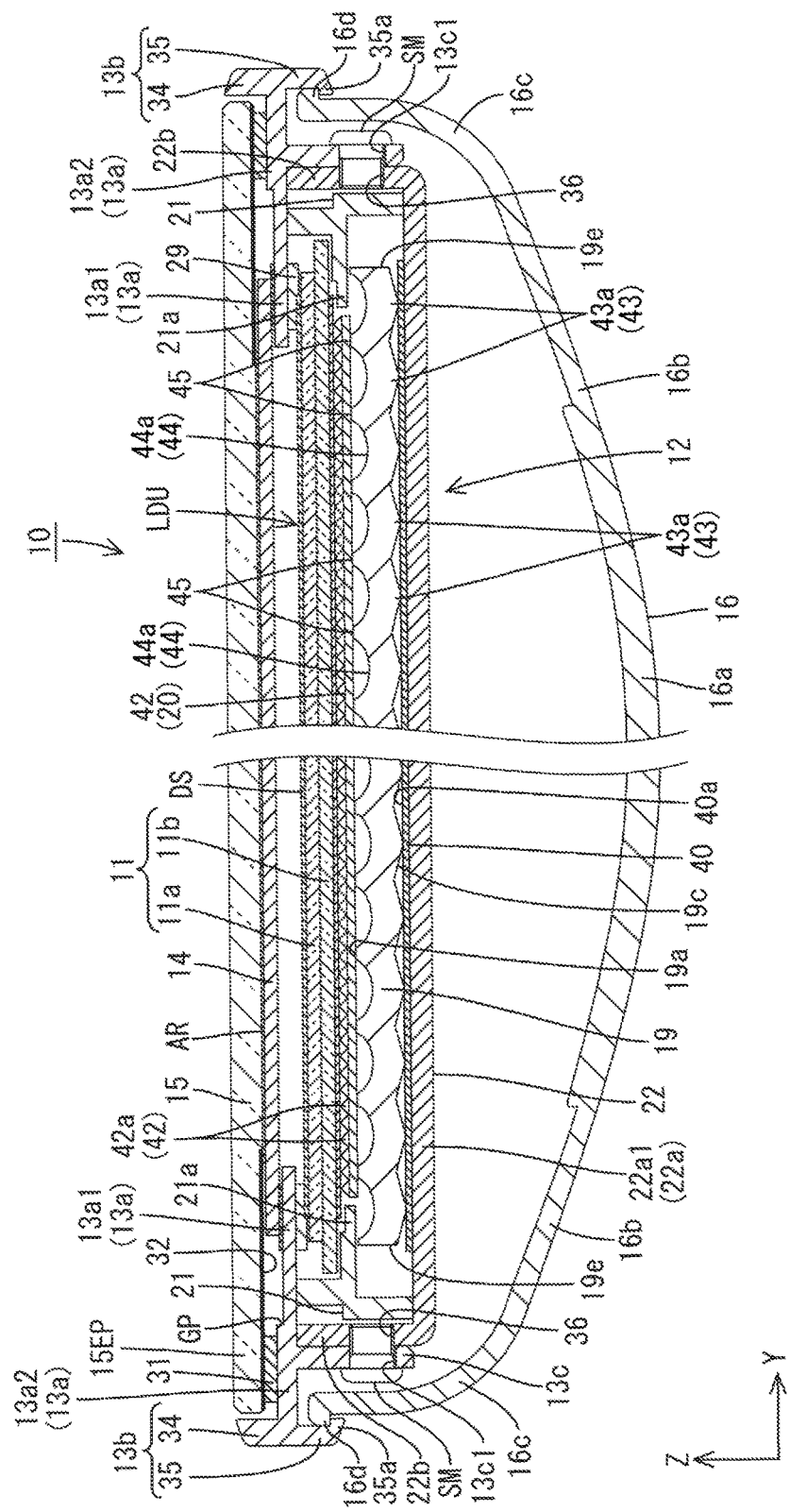
FIG. 4 is a cross-sectional view of the liquid crystal display device along a short-side direction thereof (a second direction, the Y-axis direction) illustrating a cross-sectional configuration.

The liquid crystal panel 11 included in the liquid crystal display unit LDU will be described in detail. As illustrated in FIGS. 3 and 4, the liquid crystal panel 11 includes a pair of boards 11a and 11b and a liquid crystal layer (not illustrated). Each of the glass boards 11a and 11b is a substantially transparent glass board having a rectangular shape in a plan view and substantially transparent having high light transmissivity and high light transmissivity. The liquid crystal layer is between the boards 11a and 11b. The liquid crystal layer includes liquid crystal molecules that vary their optical characteristics according to application of electrical field. The boards 11a and 11b are bonded together with a sealant, which is not illustrated, while a predefined gap corresponding to a thickness of the liquid crystal layer is maintained therebetween. The liquid crystal panel 11 includes a display area (a middle area surrounded by a plate surface light blocking layer 32, which will be described later) and a non-display area (a peripheral area overlapping the plate surface light blocking layer 32, which will be described later). Images are displayed in the display area. The non-display area has a frame-like shape so as to surround the display area. Images are not displayed in the non-display area. A long-side direction, a short-side direction, and a thickness direction of the liquid crystal panel 11 correspond with the X-axis direction, the Y-axis direction, and the Z-axis direction, respectively.

One of the boards 11a and 11b on the front is a CF board 11a and one on the rear (or on the back) is an array board 11b. On the inner surface of the array board 11b (or on the liquid crystal layer side, a side opposed to the CF board 11a), a number of thin film transistors (TFTs) that are switching components and a number of pixel electrodes are disposed. Gate lines and source lines are routed in a grid so as to surround the TFTs and the pixel electrodes. Specific image signals are supplied from a control circuit, which is not illustrated, to the lines. Each pixel electrode surrounded by the gate lines and the source lines is a transparent electrode of indium tin oxide (ITO) or zinc oxide (ZnO).

On the CF board 11a, a number of color filters are disposed at positions corresponding to pixels. The color filters are arranged such that three colors of R, G and B are repeatedly arranged. Between the color filters, a light blocking layer (a black matrix) is formed for reducing color mixture. A counter electrode that is opposed to the pixel electrodes on the array board 11b is on surfaces of the color filters and the light blocking layer. The CF board 11a is slightly smaller than the array board 11b. On the inner surfaces of the boards 11a and 11b, alignment films for alignment of liquid crystal molecules in the liquid crystal layer are formed, respectively. On the outer surfaces of the boards 11a and 11b, polarizing plates 11c and 11d are bonded, respectively (see FIG. 5).

Figure 2:
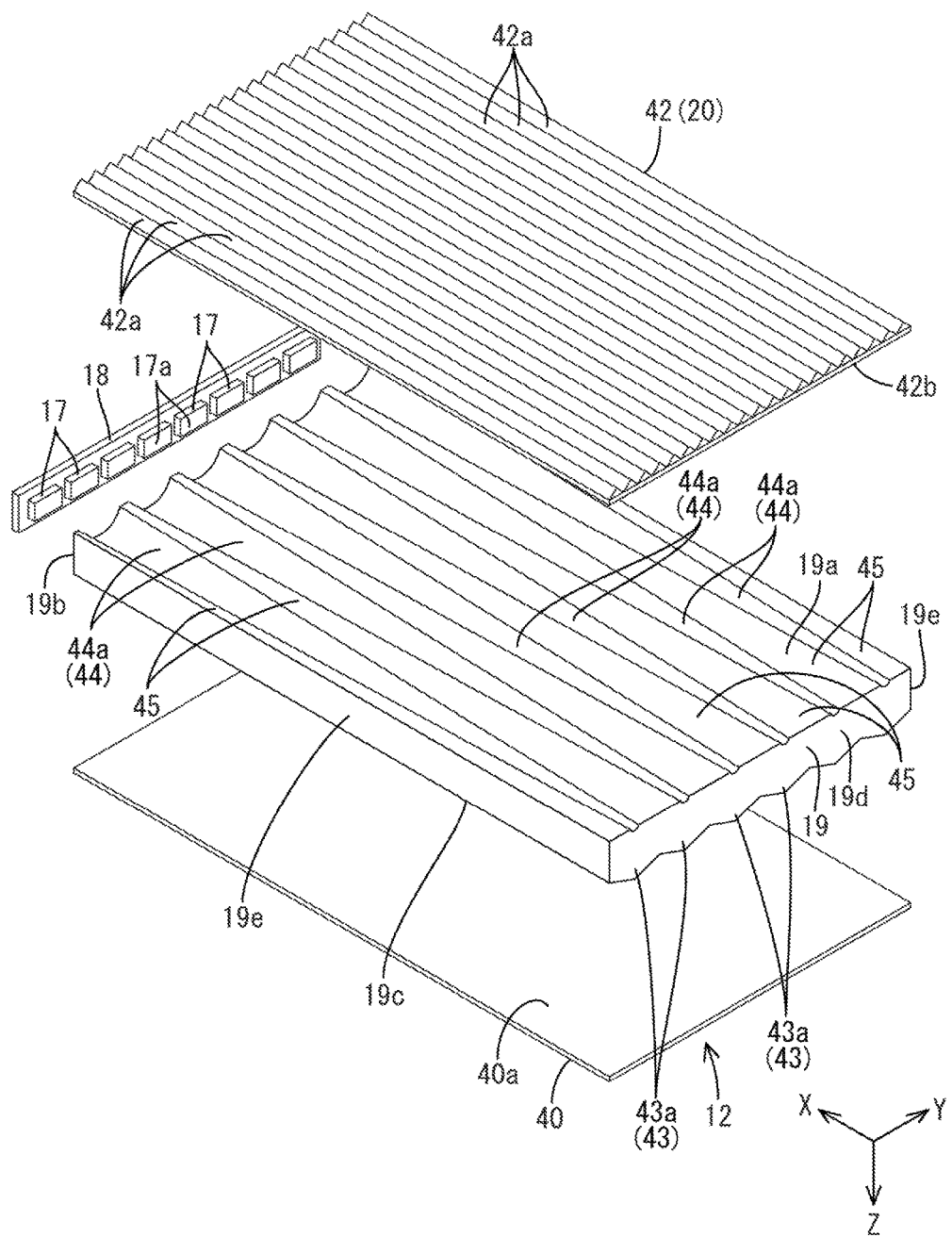
FIG. 2 is an exploded perspective view of illustrating a general configuration of a backlight unit in the liquid crystal device.

Next, the backlight unit 12 included in the liquid crystal display unit LDU will be described in detail. As illustrated in FIG. 1, the backlight unit 12 has a rectangular block-like overall shape in a plan view similar to the liquid crystal panel 11. As illustrated in FIGS. 2 to 4, the backlight unit 12 includes light emitting diodes (LEDs) 17, an LED board (a light source board) 18, a light guide plate 19, a reflection sheet (a reflecting member) 40, an optical sheet (a light exiting-side anisotropic light collector, an optical member) 20, a light blocking frame 21, a chassis 22, and a heat dissipation member 23. The LEDs 17 are light sources. The LEDs 17 are mounted on the LED board 18. The light guide plate 19 guides light from the LEDs 17. The reflection sheet 40 reflects light from the light guide plate 19. The optical sheet is layered on the light guide plate 19. The light blocking frame 21 holds down the light guide plate 19 from the front. The chassis 22 holds the LED board 18, the light guide plate 19, the optical sheet 20, and the light blocking frame 21 therein. The heat dissipation member 23 is mounted so as to be in contact with the outer surface of the chassis 22. In the backlight unit 12, the LEDs 17 (the LED board 18) are disposed at one of the short sides of the periphery of the backlight unit 12. Namely, the backlight unit 12 is an edge-light type (or a side-light type) which uses a method of supplying light from one side.

Figure 5:
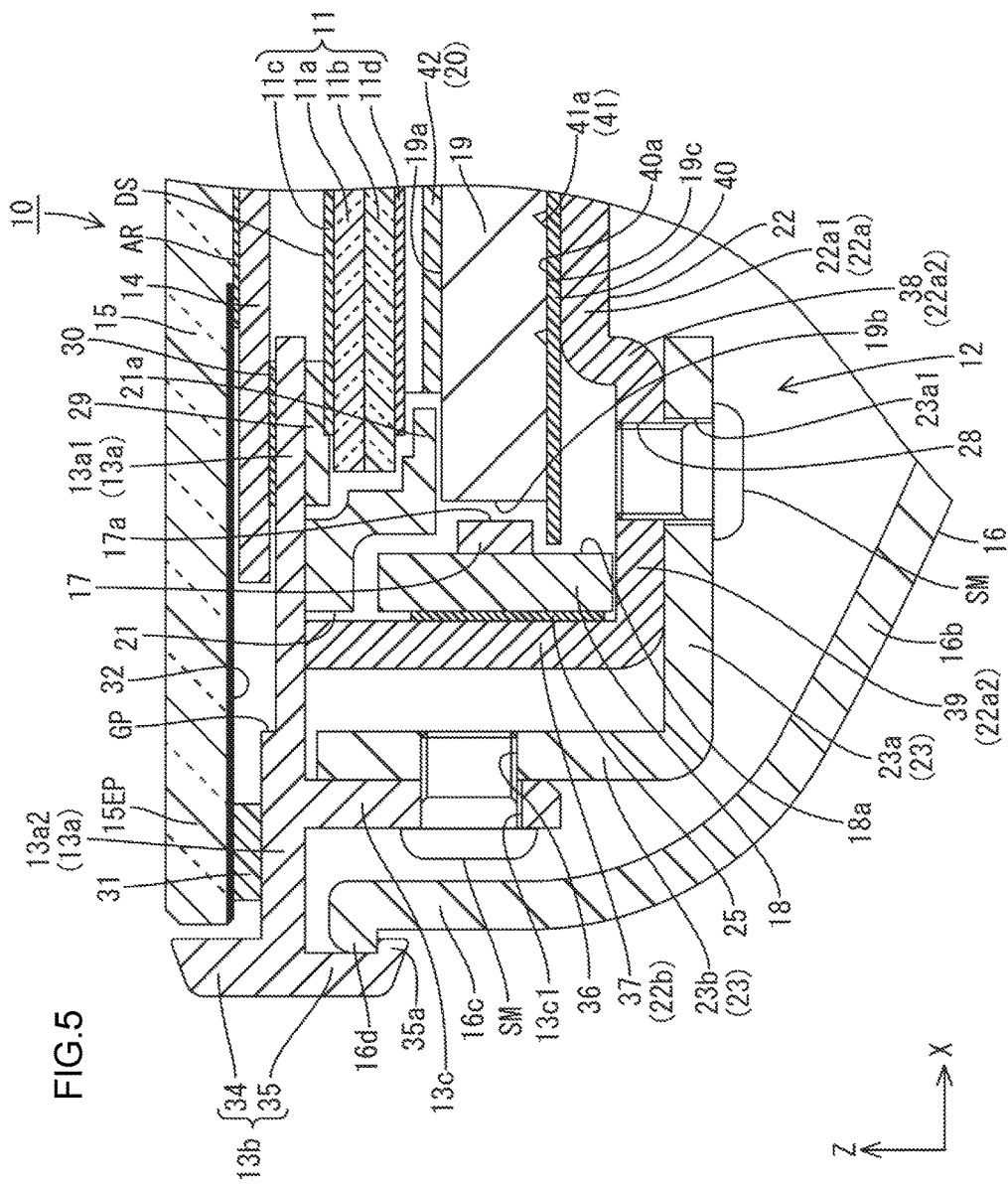
FIG. 5 is a magnified cross-sectional view of an LED and therearound illustrated in FIG. 3.

As illustrated in FIGS. 2, 3, and 5, each LED 17 includes an LED chip that is disposed on a board and sealed with a resin. The board is fixed to the LED board 18. Each LED chip mounted on the board has a main wavelength of emitting light is one kind. Specifically, the LED chip that emits light in a single color of blue is used. In the resin that seals the LED chip, phosphors that emit a certain color of light when excited by the blue light emitted by the LED chip are dispersed. An overall color of light emitted by the phosphors is substantially white. The phosphors may be selected from yellow phosphors that emit yellow light, green phosphors that emit green light, and red phosphors that emit red light and used in a combination. Alternatively, the phosphors in a single color may be used. A surface of each LED 17 is opposite from a mounting surface thereof that is mounted to the LED board 18 is a light emitting surface 17a, that is, the LED 17 is a top surface light emitting type.

As illustrated in FIGS. 2, 3, and 5, the LED board 18 has an elongated plate-like shape that extends in the Y-axis direction (or the short-side direction of the light guide plate 19 or the chassis 22). The LED board 18 is held in the chassis 22 with the plate surface thereof parallel to the Y-Z plane, that is, perpendicular to the plate surface of the liquid crystal panel 11 or the light guide plate 19. Namely, the LED board 18 is held in a position such that the long-side direction and the short-side direction of the plate surface thereof correspond with the Y-axis direction and the Z-axis direction, respectively. Furthermore, the thickness direction thereof perpendicular to the plate surface corresponds with the X-axis direction. The LED board 18 is disposed such that a plate surface thereof facing the inner side (or a mounting surface 18a) is opposite one of short peripheral surfaces of the light guide plate 19 (or a light entering surface 19b, a light source opposed end surface) with a predefined distance therefrom in the X-axis direction. An arrangement direction of the LEDs 17, the LED board 18, and the light guide plate 19 corresponds substantially with the X-axis direction. The LED board 18 has a length about equal to or larger than the short dimension of the light guide plate 19. The LED board 18 is mounted to the one of the short ends of the chassis 22, which will be described later.

As illustrated in FIG. 5, on the plate surface of the LED board 18 on the inner side, that is, the plate surface facing the light guide plate 19 (or the surface opposed to the light guide plate 19), the LEDs 17 having the configuration described earlier are surface-mounted. The plate surface is the mounting surface 18a. The LEDs 17 are arranged in line (or linearly) on the mounting surface 18a of the LED board 18 at predefined intervals along the length direction thereof (or the Y-axis direction). Namely, the LEDs 17 are arranged at intervals along the short-side direction of the backlight unit 12 at one of the short ends of the backlight unit 12. The intervals (or arrangement pitches) of the LEDs 17 are about equal. Furthermore, on the mounting surface 18a of the LED board 18, a trace (not illustrated) is formed from a metal film (e.g., a cupper film) for connecting the adjacent LEDs 17 in series. The trace extends along the Y-axis direction across the LEDs 17. When terminals formed at ends of the trace are connected to an external LED drive circuit, driving power is supplied to the LEDs 17. A base of the LED board 18 is made of metal similar to the chassis 22 and the trace (not illustrated) is formed on a surface of the base via an insulating layer. An insulating material such as ceramic may be used for the base of the LED board 18.

Figure 6:
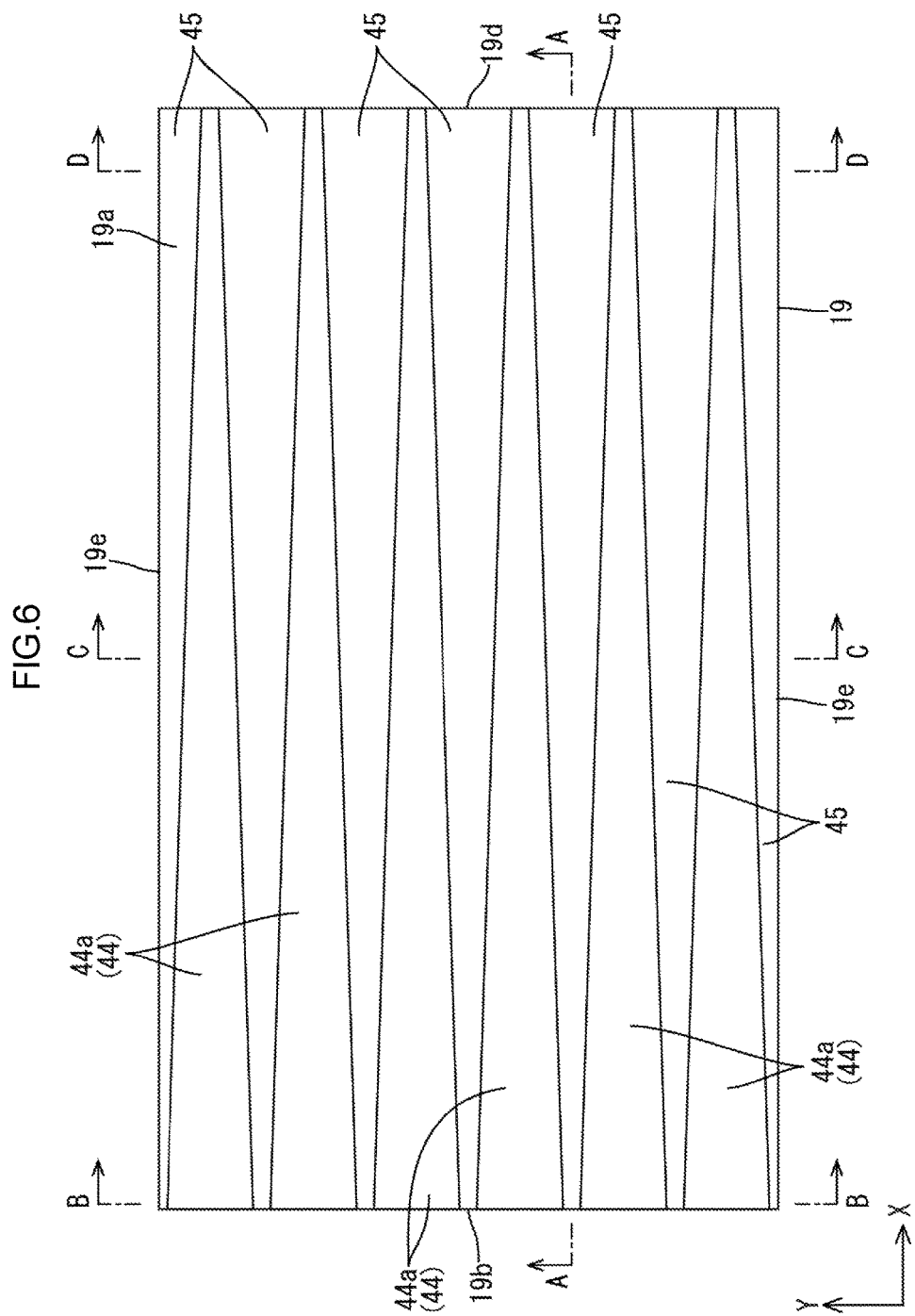
FIG. 6 is a plan view of a light guide plate.

The light guide plate 19 is made of substantially transparent synthetic resin (e.g., acrylic resin such as PMMA) having a refractive index sufficiently larger than the refractive index of the air and high light transmissivity. As illustrated in FIGS. 2 and 6, the light guide plate 19 has a substantially rectangular flat plate-like shape similar to the liquid crystal panel 11. The plate surface of the light guide plate 19 is parallel to the plate surface (or the display surface DS) of the liquid crystal panel 11. The long-side direction and the short-side direction of the light guide plate 19 correspond with the X-axis direction and the Y-axis direction, respectively. The thickness direction of the light guide plate 19 perpendicular to the plate surface corresponds with the Z-axis direction. As illustrated in FIGS. 3 and 4, the light guide plate 19 is disposed immediately below the liquid crystal panel 11 and the optical sheet 20 inside the chassis 22. One of the short peripheral surfaces of the light guide plate 19 is opposite the LEDs 17 on the LED board 18 at one of the short sides of the chassis 22. The arrangement direction of the LEDs 17 (or the LED board 18) and the light guide plate 19 corresponds with the X-axis direction. The arrangement direction of the optical sheet (or the liquid crystal panel 11) and the light guide plate 19 (or a direction in which they overlap) corresponds with the Z-axis direction. Namely, the arrangement directions are perpendicular to each other. The light guide plate 19 has a function of receiving light rays emitted from the LEDs 17 to the light guide plate 19 along the X-axis direction (or the arrangement direction of the LEDs 17 and the light guide plate 19) through the short peripheral surface, traveling the light rays therethrough, and guiding the light rays toward the optical sheet 20 (or toward the front or the light exiting side) so that the light rays exit from the plate surface.

As illustrated in FIGS. 3 and 4, the plate surface of the light guide plate 19 having a flat plate-like shape facing the front (or the light exiting side) (the surface opposed to the liquid crystal panel 11 or the optical sheet 20) is a light exiting surface 19a through which the light rays traveling therethrough exit toward the optical sheet 20 and the liquid crystal panel 11. One of short peripheries (on the left in FIG. 3) of the light guide plate 19 adjacent to the plate surface having an elongated shape along the Y-axis direction (or the arrangement direction of the LEDs 17 or the long-side direction of the LED board 18) is opposed to the LEDs 17 (or the LED board 18) with a predefined gap therebetween as illustrated in FIG. 5. The short peripheral surface is configured as a light entering surface through which the light rays from the LEDs 17 enter and an LED opposed peripheral surface (or a light source opposed peripheral surface) which is opposed to the LEDs 17. The light entering surface 19b is parallel to the Y-Z plane and substantially perpendicular to the light exiting surface 19a. The arrangement direction of the LEDs 17 and the light entering surface 19b (or the light guide plate 19) corresponds with the X-axis direction and parallel to the light exiting surface 19a. The other one of the short peripheral end surfaces of the light guide plate 19 farther from the light entering surface 19b described above (or a peripheral end surface opposite from the light entering surface 19b) is referred to as an opposite end surface (or a non-light entering opposite surface) 19d. Long peripheral end surfaces adjacent to the light entering surface 19b and the opposite end surface 19d (or the peripheral end surfaces that are opposite from each other and do not include the light entering surface 19b) are referred to as peripheral end surfaces 19e. The peripheral end surfaces 19e are surfaces parallel to the X-axis direction (or the arrangement direction of the LEDs 17 and the light guide plate 19) and the Z-axis direction. The peripheral end surfaces of the light guide plate 19 except for the light entering surface 19b, that is, the opposite end surface 19d and the peripheral end surfaces 19e are LED non-opposed peripheral end surfaces (light source non-opposed peripheral end surfaces) which are not opposed to the LEDs 17 as illustrated in FIGS. 3 and 4. The light rays emitted from the LEDs 17 and entering the light guide plate 19 through the light entering surface 19b that is a peripheral end surface of the light guide plate 19 may be reflected by the reflection sheet 40, which will be described later, or totally reflected by the light exiting surface 19a, an opposite plate surface 19c, and other peripheries (the opposite end surface 19d and the peripheral end surfaces 19e) and thus efficiently transmitted through the light guide plate 19. If the light guide plate 19 is made of acrylic resin such as PMMA, the refractive index is about 1.49. Therefore, a critical angle may be about 42°. In the following description, a direction along the peripheral end surfaces of the light guide plate 19 opposite from each other and do not include the light entering surface 19b (or the long peripheral end surfaces, the peripheral end surfaces 19e) (or the X-axis direction) is referred to as a "first direction." A direction along the peripheral end surfaces opposite from each other and including the light entering surface 19b (or the short peripheral end surfaces, the light entering surface 19b and the opposite end surface 19d) (or the Y-axis direction) is referred to as a "second direction." Furthermore, a direction normal to the plate surface of the light guide plate 19 (perpendicular to the first direction and the second direction) is referred to as a "third direction."

As illustrated in FIGS. 3 and 4, among the plate surfaces of the light guide plate 19, a plate surface facing the rear side (or an opposite side from the light exiting side) (or a surface opposed to the reflection sheet 40 and a bottom plate 22a of the chassis 22) is referred to as the opposite plate surface 19c. The reflection sheet 40 is disposed on the opposite plate surface 19c so as to cover an entire area of the opposite plate surface. The reflection sheet 40 is configured to reflect the light rays from the light guide plate 19 toward the front, that is, the light exiting surface 19a. Namely, the reflection sheet 40 is sandwiched between the bottom plate 22a of the chassis 22 and the light guide plate 19. The reflection sheet 40 is opposed to the opposite plate surface 19c of the light guide plate 19. The reflection sheet 40 includes a reflection surface (or a reflection miller surface) 40a for reflecting the light rays. The reflection surface 40a of the reflection sheet 40 is silver and specularly reflects light. The reflection sheet 40 may include a film base made of synthetic resin and a metal film (e.g., a silver thin film) vapor-deposited on a surface of the film base. As illustrated in FIG. 5, an end portion of the reflection sheet 40 closer to the light entering surface 19b of the light guide plate 19 is outer than the light entering surface 19b, that is extends toward the LEDs 17. The extending end portion reflects the light rays from the LEDs 17. According to the configuration, light entering efficiency at the light entering surface 19b improves.

Figure 7:
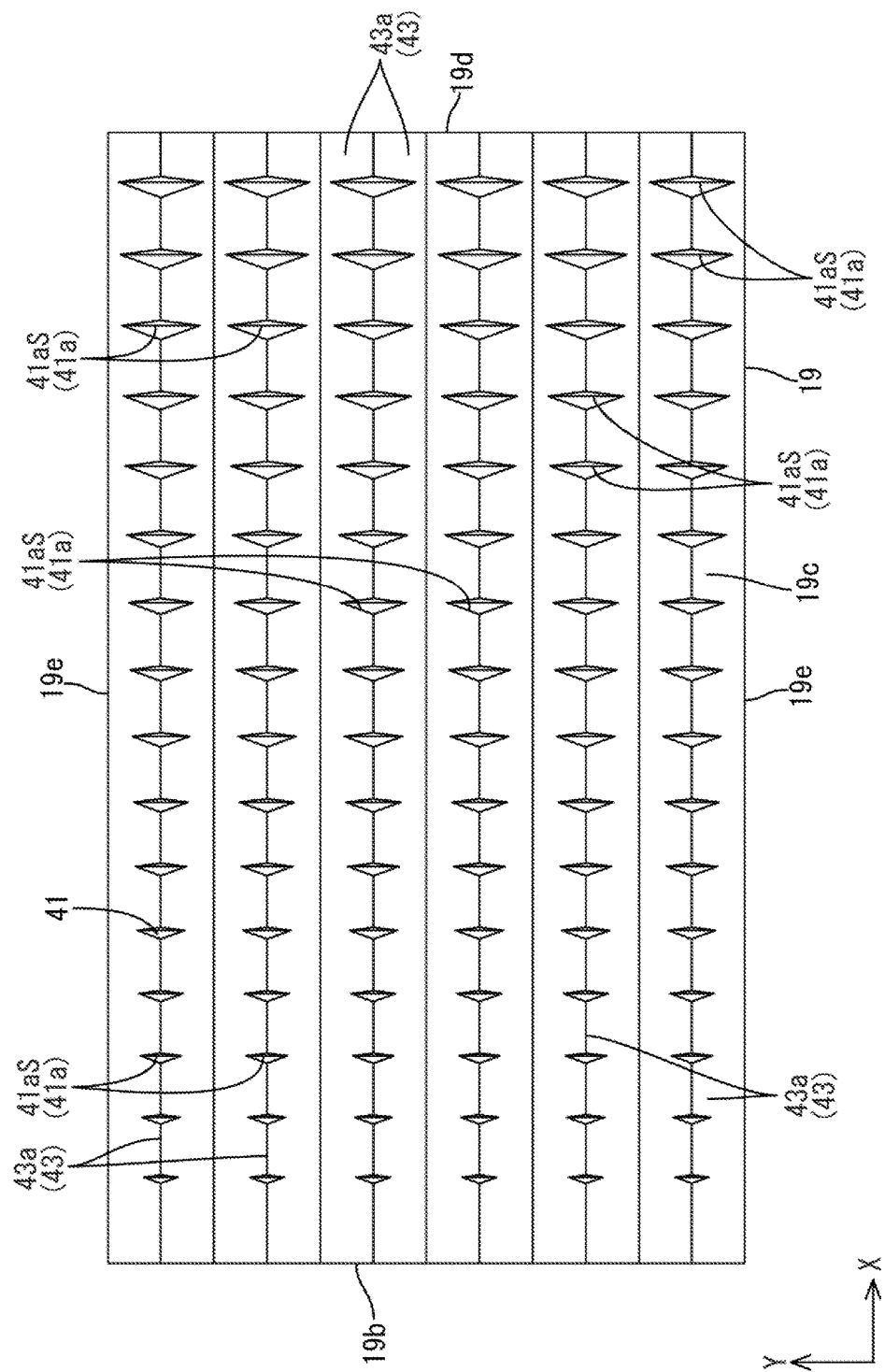
FIG. 7 is a bottom view of the light guide plate.
Figure 9:
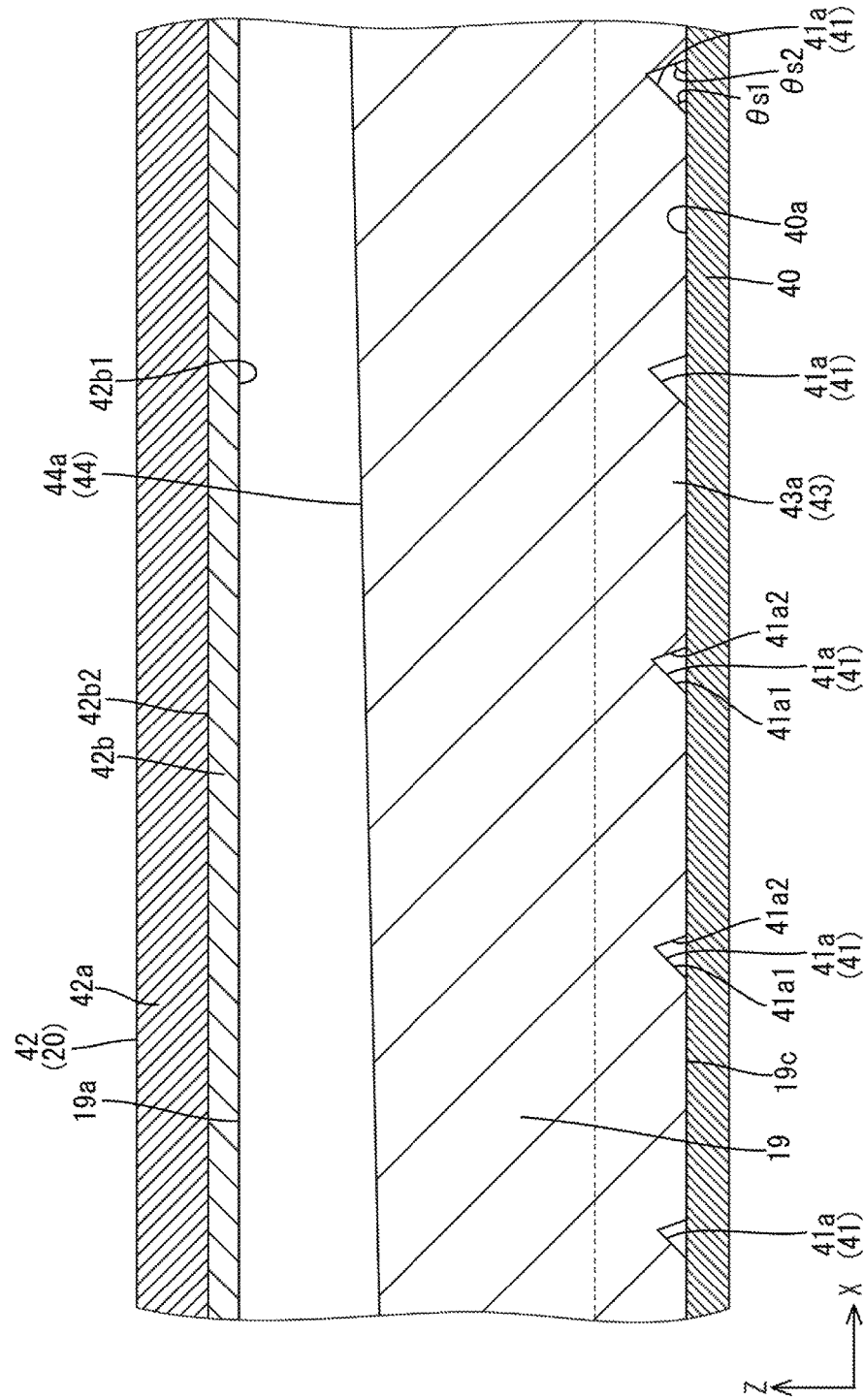
FIG. 9 is a cross-sectional view along line A-A in FIG. 6.

As illustrated in FIGS. 3 and 7, the opposite plate surface 19c of the light guide plate 19 includes an exiting light reflecting portion 41 for reflecting the light rays traveling through the light guide plate 19 such that the light rays exit from the light exiting surface 19a. The exiting light reflecting portion 41 is integrated with the light guide plate 19. The light guide plate 19 is prepared by injection molding. A pattern of the exiting light reflecting portion 41 is formed on a forming surface of a forming die for forming the opposite plate surface 19c. As illustrated in FIG. 9, the exiting light reflecting portion 41 includes unit reflectors (exiting light unit reflectors) 41a each having a triangular cross-sectional shape (or a V-like cross-sectional shape) and extending along the second direction (or the Y-axis direction). The unit reflectors 41a are arranged at intervals (i.e., intermittently arranged) along the first direction (or the X-axis direction). Each unit reflector 41a includes a main reflecting surface 41a1 and a reentering surface 41a2. The main reflecting surface 41a1 is arranged on the LED 17 side (or the light entering surface 19b side) with respect to the first direction. The reentering surface 41a2 is arranged on the opposite side from the LED 17 side (or on the opposite end surface 19d side). The main reflecting surface 41a1 is a sloped surface that inclines such that the main reflecting surface 41a1 becomes closer to the light exiting surface 19a (or farther from the opposite plate surface 18c) as a distance from the LED 17 increases (or a distance to the opposite end surface 19d decreases) with respect to the first direction. Each reentering surface 41a2 is a sloped surface that declines such that the reentering surface 41a2 becomes farther from the light exiting surface 19a (or closer to the opposite plate surface 19c) as a distance from the LED 17 increases with respect to the first direction. It is preferable to set an angle θs1 between the main reflecting surface 41a1 and the light exiting surface 19a or the opposite plate surface 19c in a range from 40° to 50°. In FIG. 9, the angle θs1 is about 45°. It is preferable to set an angle θs2 between the reentering surface 41a2 and the light exiting surface 19a or the opposite plate surface 19c in a range from 70° to 80°. In FIG. 9, the angle θs2 is about 80°. Namely, the angle θs1 of the main reflecting surface 41a1 is smaller than the angle θs1 of the reentering surface 41a2. The light rays are reflected by the main reflecting surface 41a1 of the unit reflector 41a arranged on the light entering surface 19b with respect to the first direction. According to the configuration, the angles of incidence of the light rays to the light exiting surface 19a do not exceed the critical angle and thus the light rays are more likely to exit from the light exiting surface 19a. Regarding the reentering surface 41a2 of the unit reflector 41a, the light rays having angles of incidence smaller than the critical angle and passed through the main reflecting surface 41a1 reenter the light guide plate 19 through the reentering surface 41a2. Heights (or dimensions in the third direction) of the unit reflectors 41a, lines of which are arranged along the first direction, gradually increase and areas of the main reflecting surfaces 41a1 and the reentering surfaces 41a2 increase as a distance from the light entering surface 19b (or the LEDs 17) with respect to the first direction increases. According to the configuration, the light rays exiting from the light exiting surface 19a are controlled such that a uniform light distribution is achieved within the light exiting surface 19a. The unit reflectors 41a are arranged at substantially equal intervals with respect to the first direction regardless of the distance from the LEDs 17.

As illustrated in FIGS. 2 to 4, the optical sheet 20 has a rectangular shape in a plan view similar to the liquid crystal panel 11 and the chassis 22. The optical sheet 20 is disposed so as to cover the light exiting surface 19a of the light guide plate 19 from the front (or the light exiting side). Because the optical sheet 20 is disposed between the liquid crystal panel 11 and the light guide plate 19, the light rays exiting from the light guide plate 19 pass through the optical sheet 20. The optical sheet 20 directs the light rays toward the liquid crystal panel 11 with specific optical properties added to the light rays while passing therethrough. The optical sheet 20 will be described in detail later.

As illustrated in FIGS. 3 and 4, the light blocking frame 21 is formed in a frame-like (or a picture frame-like) shape that extends along the periphery (or the peripheral end surfaces) of the light guide plate 19. The light blocking frame 21 presses down the periphery of the light guide plate 19 for substantially the entire periphery. The light blocking frame 21 is made of synthetic resin. The light blocking frame 21 includes a surface in black, that is, has light blocking properties. The light blocking frame 21 is disposed such that an inner edge portion 21a thereof are arranged between the periphery of the light guide plate 19 and LEDs 17 and the periphery (or the peripheral end surfaces) of the liquid crystal panel 11 and the periphery of the optical sheet 20 for the entire periphery thereof. The light blocking frame 21 optically separate those from one another. According to the configuration, the light rays from the LEDs 17 and not entering the light guide plate 19 through the light entering surface 19b or the light rays leaking through the opposite end surface 19d or the peripheral end surfaces 19e are blocked by the light blocking frame 21 and thus less likely to directly enter peripheries (especially the peripheral end surfaces) of the liquid crystal panel 11 and the optical sheet 20. Each of three edge portions of the light blocking frame 21 not overlapping the LEDs 17 and the LED board 18 in a plan view (long edge portions and a short edge portion farther from the LED board 18) includes a portion projecting from the bottom plate 22a of the chassis 22 and a portion that supports the frame 13 from the rear. A short edge portion overlapping the LEDs 17 and the LED board 18 in a plan view is formed so as to cover the end of the light guide plate 19 and the LED board 18 (or the LEDs 17) from the front and bridge the long edge portions. The light blocking frame 21 is fixed to the chassis 22, which will be described next, with fixing members such as screws.

The chassis 22 is formed from a metal sheet having high thermal conductivity such as an aluminum sheet and an electrolytic zinc coated steel sheet (SECC). As illustrated in FIGS. 3 and 4, the chassis 22 includes the bottom plate 22a and side plates 22b. The bottom plate 22a has a rectangular shape similar to the liquid crystal panel 11 in a plan view. The side plates 22b project from outer edges (long edges and short edges) of the bottom plate 22a toward the front, respectively. A long-side direction and a short-side direction of the chassis 22 (or the bottom plate 22a) correspond with the X-axis direction and the Y-axis direction, respectively. A large portion of the bottom plate 22a is a light guide plate holding portion 22a1 for supporting the light guide plate 19 from the rear (or an opposite side from the light exiting surface 19a). An end portion of the bottom plate 22a closer to the LED board 18 is a board holding portion that protrudes toward the rear so as to form a step. As illustrated in FIG. 5, a board holding portion 22a2 has an L-like cross section. The board holding portion 22a2 includes a rising portion 38 and a holding bottom portion 39. The rising portion 38 bends from an end of the light guide plate holding portion 22a1 and rises toward the rear. The holding bottom portion 39 bends from a distal end of the rising portion 38 and projects toward a side opposite from the light guide plate holding portion 22a1. A position at which the rising portion 38 rises from the end of the light guide plate holding portion 22a1 is farther from the LEDs 17 than the light entering surface 19b of the light guide plate 19 (or closer to the middle of the light guide plate holding portion 22a1). The long side plate 22b bends and rises from the distal end of the holding bottom portion 39 toward the front. The LED board 18 is mounted to the short side plate 22b continues to the board holding portion 22a2. The short side plate 22b is a board mounting portion 37. The board mounting portion 37 includes an opposed surface that is opposed to the light entering surface 19b of the light guide plate 19. The LED board 18 is mounted to the opposed surface. A plate surface of the LED board 18 opposite from the mounting surface 18a on which the LEDs 17 are mounted is fixed to an inner plate surface of the board mounting portion 37 with a board fixing member 25 such as a double-sided tape. The mounted LED board 18 is arranged with a small gap to the inner plate surface of the holding bottom portion 39 of the board holding portion 22a2. On the rear plate surface of the bottom plate 22a of the chassis 22, a liquid crystal panel drive circuit board (not illustrated) for controlling driving of the liquid crystal panel 11, an LED drive circuit board (not illustrated) for supplying driving power to the LEDs 17, and a touchscreen drive circuit board (not illustrated) for controlling driving of the touchscreen 14 are mounted.

The heat dissipation member 23 is formed from a metal sheet having high thermal conductivity such as an aluminum sheet. As illustrated in FIG. 3, the heat dissipation member 23 extends along the short edge of the chassis 22, specifically, the board holding portion 22a2 for holding the LED board 18. As illustrated in FIG. 5, the heat dissipation member 23 includes a first heat dissipation portion 23a and a second heat dissipation portion 23b. The first heat dissipation portion 23a has an L-like cross section. The first heat dissipation portion 23a is parallel to an outer surface of the board holding portion 22a2 and in contact with the outer surface. The second heat dissipation portion 23b is parallel to an outer surface of the side plate 22b that continues to the board holding portion 22a2 (or the board mounting portion 37). The first heat dissipation portion 23a has an elongated flat plate-like shape that extends along the Y-axis direction. A plate surface of the first heat dissipation portion 23a facing the front and parallel to the X-Y plane is in contact with the outer surface of the holding bottom portion 39 of the board holding portion 22a2 for about the entire length thereof. The first heat dissipation portion 23a is fixed to the holding bottom portion 39 with screws SM. The first heat dissipation portion 23a includes screw insertion holes 23a1 in which the screws SM are inserted. The holding bottom portion 39 includes screw holes 28 for the screws SM to be screwed. According to the configuration, heat from the LEDs 17 are transmitted to the first heat dissipation portion 23a via the LED board 18, the board mounting portion 37, and the board holding portion 22a2. The screws SM are arranged at intervals along the extending direction of the first heat dissipation portion 23a and fixed thereto. The second heat dissipation portion 23b has an elongated flat plate-like shape that extends along the Y-axis direction. A plate surface of the second heat dissipation portion 23b facing the inner side and parallel to the Y-Z plane is arranged opposite the outer plate surface with a predefined gap between the plate surface and the outer plate surface of the board mounting portion 37.

Next, the frame 13 included in the liquid crystal display unit LDU will be described. The frame 13 is made of metal having high thermal conductivity such as aluminum. As illustrated in FIG. 1, the frame 13 has a rectangular frame-like (or a picture frame-like) overall shape along the peripheries (or the outer edge portions) of the liquid crystal panel 11, the touchscreen 14, and the cover panel 15 in a plan view. The frame 13 may be prepared by stamping. As illustrated in FIGS. 3 and 4, the frame 13 holds down the periphery of the liquid crystal panel 11 and holds the liquid crystal panel 11, the optical sheet 20, and the light guide plate 19, which are layered, together with the chassis 22 of the backlight unit 12. The frame 13 receives the peripheries of the touchscreen 14 and the cover panel 15 from the rear. The frame 13 is disposed between the peripheries of the liquid crystal panel 11 and the touchscreen 14. According to the configuration, a predefined gap is provided between the liquid crystal panel 11 and the touchscreen 14. Even if the touchscreen 14 is pushed by the cover panel 15 when an external force is applied to the cover panel 15 and deformed toward the liquid crystal panel 11, the deformed touchscreen 14 is less likely to affect the liquid crystal panel 11.

As illustrated in FIGS. 3 and 4, the frame 13 includes a frame portion (or a frame base portion, a picture frame-like portion) 13a, a rolled portion (or a tubular portion) 13b, and mounting plate portions 13c. The frame portions 13a are along the peripheries of the liquid crystal panel 11, the touchscreen 14, and the cover panel 15. The rolled portion 13b continues from the outer edge of the frame portion and surrounds the touchscreen 14, the cover panel 15, and the case 16 from the outer side. The mounting plate portions 13c project from the frame portion 13a toward the rear. The mounting plate portions 13c are mounted to the chassis 22 and the heat dissipation member 23. The frame portion 13a has a rectangular frame-like shape in a plan view including plate surfaces having flat plate-like shapes and parallel to the plate surfaces of the liquid crystal panel 11, the touchscreen 14, and the cover panel 15. An outer peripheral portion 13a2 of the frame portion 13a has a thickness larger than a thickness of an inner peripheral portion 13a1 thereof. A gap GP is provided at a boundary between the inner peripheral portion 13a1 and the outer peripheral portion 13a2. The inner peripheral portion 13a1 of the frame portion 13a is disposed between the periphery of the liquid crystal panel 11 and the periphery of the touchscreen 14. The outer peripheral portion 13a2 receives the periphery of the cover panel 15 from the rear. Because the front plate surface of the frame portion 13a is covered with the cover panel 15 for about the entire area thereof, the front surface is less likely to be exposed to the outside. According to the configuration, even if a temperature of the frame 13 increases due to the heat from the LEDs 17, a user of the liquid crystal display device 10 is less likely to directly touch a portion of the frame 13 exposed to the outside. This configuration is advantageous in terms of safety. As illustrated in FIG. 5, a shock absorber 29 is fixed to the rear plate surface of the inner peripheral portion 13a1 of the frame portion 13a. The shock absorber 29 is for pressing down the periphery of the liquid crystal panel 11 from the front and absorbing an impact that may be applied to the periphery of the liquid crystal panel 11. A first fixing member 30 is fixed to the front plate surface of the inner peripheral portion 13a1 for fixing the periphery of the touchscreen 14 and absorbing an impact that may be applied to the periphery of the touchscreen 14. The shock absorber 29 and the first fixing member 30 are arranged at a position within the inner peripheral portion 13a1 overlapping each other in a plan view. A second fixing member 31 is fixed to the front plate surface of the outer peripheral portion 13a2 of the frame portion 13a for fixing the periphery of the cover panel 15 and absorbing an impact that may be applied to the periphery of the cover panel 15. The shock absorber 29 and the fixing members 30 and 31 are disposed so as to extend along the sides of the frame portion 13a except for four corners. The fixing members 30 and 31 may be double-side tapes that includes base materials having cushioning properties.

As illustrated in FIGS. 3 and 4, the rolled portion 13b includes a first rolled portion 34 and a second rolled portion 35. The first rolled portion 34 has a short rectangular tubular overall shape in a plan view and projects from an outer peripheral edge of the outer peripheral portion 13a2 of the frame portion 13a toward the front. The second rolled portion 35 projects from the outer peripheral edge of the outer peripheral portion 13a2 of the frame portion 13a toward the rear. Namely, the outer edge of the frame portion 13a continues to the inner surface of the rolled portion 13b having a short rectangular tubular shape at about the middle of the inner surface with respect the axial direction (or the Z-axis direction) for the entire periphery of the rolled portion 13b. An inner periphery of the first rolled portion 34 is opposed to the peripheries of the touchscreen 14 and the cover panel 15. An outer periphery of the first rolled portion 34 is exposed to the outside of the liquid crystal display device 10, that is, forms appearances of sides of the liquid crystal display device 10. The second rolled portion 35 covers front edges (or a mounting portion 16c) of the case 16 that is disposed behind the frame portion 13a from peripheral sides. An inner periphery of the second rolled portion 35 is opposed to the mounting portion 16c of the case 16, which will be described later. An outer periphery of the second rolled portion 35 is exposed to the outside of the liquid crystal display device 10, that is, forms appearances of sides of the liquid crystal display device 10. The second rolled portion includes a frame-side fixing portion 35a having a hook-like cross section at a distal end thereof. The case 16 is held to the frame-side fixing portion 35*a* to maintain the case 16 being fixed.

As illustrated in FIGS. 3 and 4, the mounting plate portions 13*c* project from the outer peripheral portion 13*a*2 of the frame portion 13*a* toward the rear and has a plate-like shape that extends along the sides of the frame portion 13*a*. Plate surface of the mounting plate portions 13*c* are substantially perpendicular to the plate surface of the frame portion 13*a*. The mounting plate portions 13*c* are arranged at the respective sides of the frame portion 13*a*. The mounting plate portion 13*c* at the short side of the frame portion 13*a* on the LED board 18 side is mounted such that the inner plate surface thereof is in contact with the outer plate surface of the second heat dissipation portion 23*b* of the heat dissipation member 23. The mounting plate portions 13*c* are fixed to the second heat dissipation portion 23*b* with screws SM. The mounting plate portions 13*c* include screw insertion holes 13*c*1. The second heat dissipation portion 23*b* includes screw holes 36 for the screws SM to be fixed. Heat from the LEDs 17 transmitted from the first heat dissipation portion 23*a* to the second heat dissipation portion 23*b* is transmitted to the mounting plate portions 13*c* and then to the entire area of the frame 13. According to the configuration, the heat is efficiently dissipated. The mounting plate portion 13*c* is indirectly fixed to the chassis 22 via the heat dissipation member 23. The mounting plate portion 13*c* at the short side of the frame portion 13*a* farther from the LED board 18 and the mounting plate portions 13*c* at the long sides of the frame portion 13*a* are fixed with the screws SM such that the inner plate surface thereof is in contact with the outer plate surfaces of the side plates 22*b* of the chassis 22. The mounting plate portions 13*c* include the screw insertion holes 13*c*1 in which the screws SM are inserted. The side plates 22*b* include screw holes 36 for the screws SM to be fixed. The screws SM are arranged along the extending direction of each mounting plate portion 13*c* at intervals and fixed to the mounting plate portions 13*c*.

Next, the touchscreen 14 fixed to the frame 13 the is described above will be described. As illustrated in FIGS. 1, 3 and 4, the touchscreen 14 is a position input device through which the user can input information regarding positions within the display surface DS of the liquid crystal panel 11. The touchscreen 14 has a rectangular shape. The touchscreen 14 includes a glass substrate that is substantially transparent and has high light transmissivity and a predefined touchscreen pattern (not illustrated) formed on the substrate. Specifically, the touchscreen 14 includes a glass substrate having a rectangular shape similar to the liquid crystal panel 11 in a plan view and a touchscreen transparent electrode (not illustrated) formed the front plate surface of the substrate. The touchscreen transparent electrodes are the touchscreen pattern using the projected capacitive touchscreen technology. A number of the touchscreen transparent electrodes are arranged in a grid within the plate surface of the substrate. Terminals (not illustrated) are formed in one of short edge portions of the touchscreen 14. The terminals are connected to traces continue from the touchscreen transparent electrodes that are portions of the touchscreen pattern. A flexible printed circuit board, which is not illustrated, is connected to the terminals. Electrical potentials are applied to the touchscreen transparent electrodes of the touchscreen pattern by a touchscreen drive circuit board. As illustrated in FIG. 5, the inner plate surface of the touchscreen 14 at the periphery thereof is fixed to the inner peripheral portion 13*a*1 of the frame portion 13*a* of the frame 13 with the first fixing member 30 that is described earlier while they are opposed each other.

Next, the cover panel 15 mounted to the frame 13 will be described. As illustrated in FIGS. 1, 3 and 4, the cover panel 15 covers the entire area of the touchscreen 14 from the front to protect the touchscreen 14 and the liquid crystal panel 11. The cover panel 15 covers the entire area of the frame portion 13*a* of the frame 13 from the front and forms a front appearance of the liquid crystal display device 10. The cover panel 15 has a rectangular shape in a plan view. The cover panel 15 includes a base in a plate-like shape and made of transparent glass having high light transmissivity, preferably, toughened glass. Chemically toughened glass may be preferable for the tempered glass used for the cover panel 15. The chemically toughened glass includes a chemically toughened layer formed through a chemical toughening process on a surface of the glass base having a plate-like shape. The chemical toughening process may be a process for toughening a glass base having a plate-like shape by replacing alkali metal ions included in glass material with alkali metal ions each having a larger diameter by alkali metal ion exchange. The chemically toughened layer formed as above is a compressive stress layer (ion exchange layer) in which compression stress remains. Because the cover panel 15 has mechanical strength and high shock resistance, the cover panel 15 more properly protects the touchscreen 14 and the liquid crystal panel 11 disposed behind the cover panel 15 from break or damage.

As illustrated in FIGS. 3 and 4, the cover panel 15 has a rectangular shape similar to the liquid crystal panel 11 and the touchscreen 14 in a plan view. A size of the cover panel 15 in a plan view is slightly larger than those of the liquid crystal panel 11 and the touchscreen 14. The cover panel 15 includes a projecting portion 15EP that project outward over the peripheries of the liquid crystal panel 11 and the touchscreen 14 for the entire periphery, that is, the projecting portion 15EP has an eaves-like shape. The projecting portion 15EP has a rectangular frame-like shape (or a picture frame-like shape) which surrounds the liquid crystal panel 11 and the touchscreen 14. As illustrated in FIG. 5, an inner plate surface of the projecting portion 15EP is fixed to the outer peripheral portion 13*a*2 of the frame portion 13*a* of the frame 13 with the second fixing member 31 described earlier while they are opposed each other. A middle portion of the cover panel 15 opposite the touchscreen 14 is layered on the touchscreen 14 on the front via the antireflective film AR.

Aa illustrated in FIGS. 3 and 4, a plate surface light blocking layer (or a light blocking layer, a plate surface light blocking portion) 32 is formed on an inner plate surface (or a rear plate surface, a plate surface opposed to the touchscreen 14) of the cover panel 15 that includes the projecting portion 15EP at the outer periphery. The plate surface light blocking layer 32 is made of light blocking material such as black paint. The plate surface light blocking layer 32 is formed by printing the light blocking material on the inner plate surface and thus integral with the plate surface. For forming the plate surface light blocking layer 32, printing including screen printing and inkjet printing may be used. The plate surface light blocking layer 32 is formed in the entire area of the projecting portion 15EP and an area that overlap the peripheries of the touchscreen and the liquid crystal panel 11 in a plan view. Namely, the plate surface light blocking layer 32 is formed so as to surround the display area of the liquid crystal panel 11. Therefore, light rays outside the display area are blocked by the plate surface light blocking layer 32 and thus images are displayed in the display area with high display quality.

Next, the case 16 mounted to the frame 13 will be described. The case 16 is made of synthetic resin or metal. As illustrated in FIGS. 1, 3 and 4, the case 16 has a bowl-like shape with an opening on the front and covers the frame portion 13a and the mounting plate portions 13c of the frame 13, the chassis 22, and the heat dissipation member 23 from the rear and forms a rear appearance of the liquid crystal display device 10. The case 16 includes a bottom portion 16a, a curved portion 16b, and the mounting portion 16c. The bottom portion 16a is substantially flat. The curved portion 16b curves from a boundary of the bottom portion 16a toward the front and has a curved cross section. The mounting portion 16c projects from a boundary of the curved portion 16b substantially straight toward the front. The mounting portion 16c includes a case-side fixing portion 16d having a hook-like cross section. The case-side fixing portion 16d is hooked to a frame-side fixing portion 35d of the frame 13. According to the configuration, the case 16 is maintained fixed to the frame 13.

As illustrated in FIG. 3, the light guide plate 19 included in the backlight unit 12 having the above configuration includes the exiting light reflecting portion 41 for reflecting light rays traveling through the light guide plate 19 to increase rays of light exiting through the light exiting surface 19a. Light collecting effects are selectively added to the light rays reflected by the exiting light reflecting portion 41 and the angles of incidence to the light exiting surface 19a are less likely to be smaller than the critical angle. Therefore, more light rays exit. Detailed configurations regarding the exiting light reflecting portion 41 will be described later.

The backlight unit 12 in this embodiment has a configuration for collecting rays of exiting light with respect to the second direction (or the Y-axis direction). The configuration and a reason why it has such a configuration will be described. As illustrated in FIGS. 3 and 5, light rays traveling through the light guide plate 19 may be reflected by the unit reflectors 41a of the exiting light reflecting portion 41. The angles of incidence of the light rays entering to the light exiting surface 19a are equal to or smaller than the critical angle and the light rays exit from the light exiting surface 19a. With respect to the first direction (or the X-axis direction), the light rays are reflected toward the front by the unit reflector 41a, that is, the light rays are collected so as to travel from the light exiting surface 19a toward the front along the normal direction. The exiting light reflecting portion 41 adds the light collecting effects to the reflected light rays with respect to the first direction but less likely to add the light collecting effects to the reflected light rays with respect to the second direction. Therefore, brightness anisotropy may occur in light exiting from the light exiting surface 19a. This embodiment has the following configuration to collect the light rays with respect to the second direction. As illustrated in FIG. 2, the optical sheet 20 includes a prism sheet (light exiting-side anisotropic light collecting portion) 42 having light collecting anisotropy for selectively adding the light collecting effects to the transmitted light rays with respect to the second direction. The opposite plate surface 19c of the light guide plate 19 includes the prism portion (the opposite plate surface-side prism portion) 43 having light collecting anisotropy for selectively adding the light collecting effects to the light rays reflected by the exiting light reflecting portion 41 with respect to the second direction.

The LEDs 17 are arranged at intervals with respect to the second direction, that is, the longitudinal direction of the light entering surface 19b of the light guide plate 19. Mixture of the light rays emitted by the LEDs 17 and entering the light entering surface 19b tend to be insufficient on a side closer to the light entering surface 19b with respect to the first direction. Uneven brightness with respect to the second direction tends to occur in the light exiting from the light exiting surface 19a. In this embodiment, the uneven brightness of the exiting light with respect to the second direction is compensated by the configuration described below. As illustrated in FIG. 2, the prism portion 43 is formed on the opposite plate surface 19c of the light guide plate 19. The prism portion 43 is for totally reflecting the light rays traveling through the light guide plate 19 to diffuse the light rays with respect to the second direction. The concave lenticular lens portion (the lenticular lens portion, the light exiting surface-side lenticular lens portion) 44 is formed on the light exiting surface 19a of the light guide plate 19. The concave lenticular lens portion 44 is for totally reflecting the light rays traveling through the light guide plate 19 to diffuse the light rays with respect to the second direction. Next, the prism sheet 42, the prism portion 43, and the concave lenticular lens portion 44 will be described.

Figure 10:
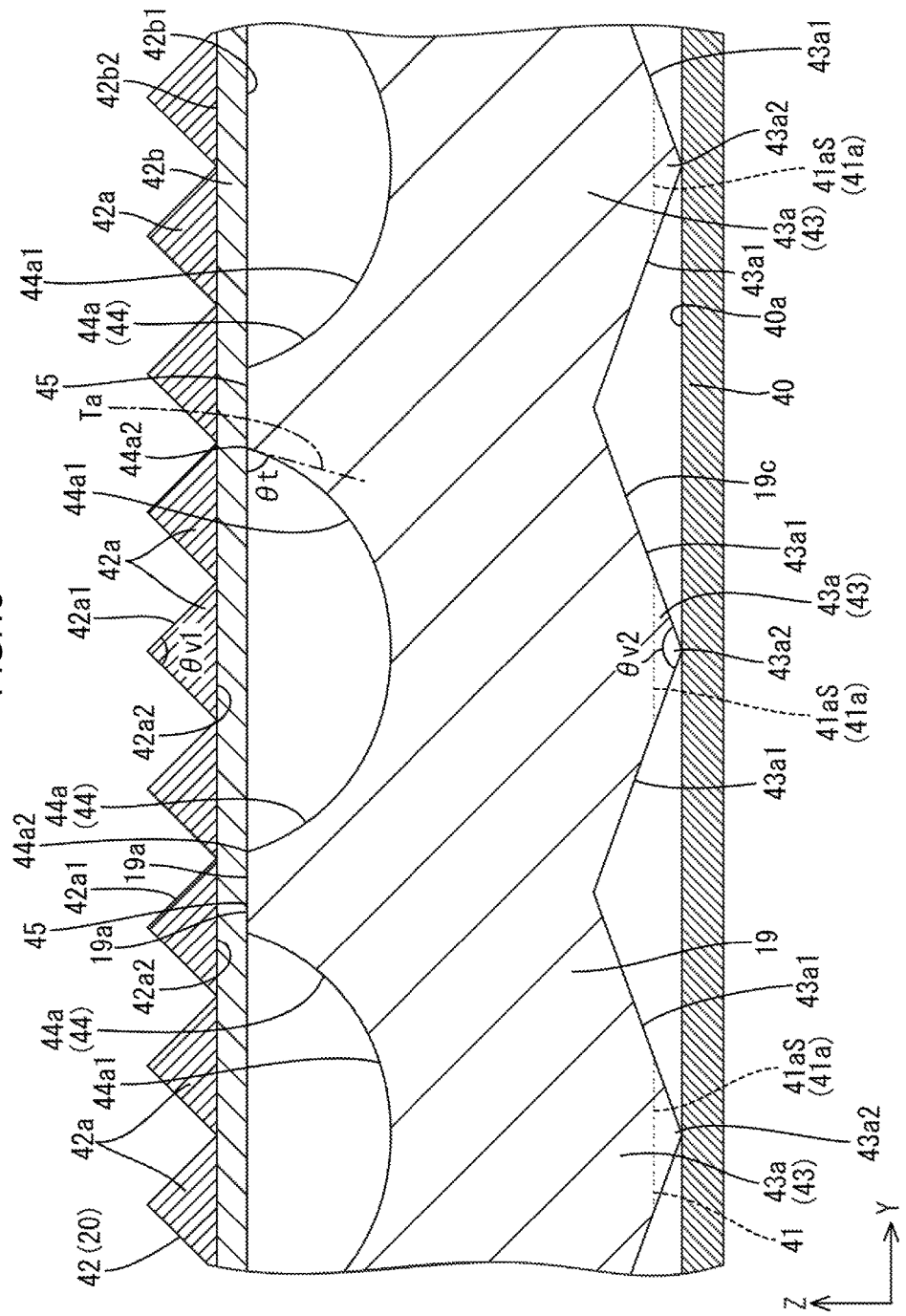
FIG. 10 is a cross-sectional view along line B-B in FIG. 6.
Figure 11:
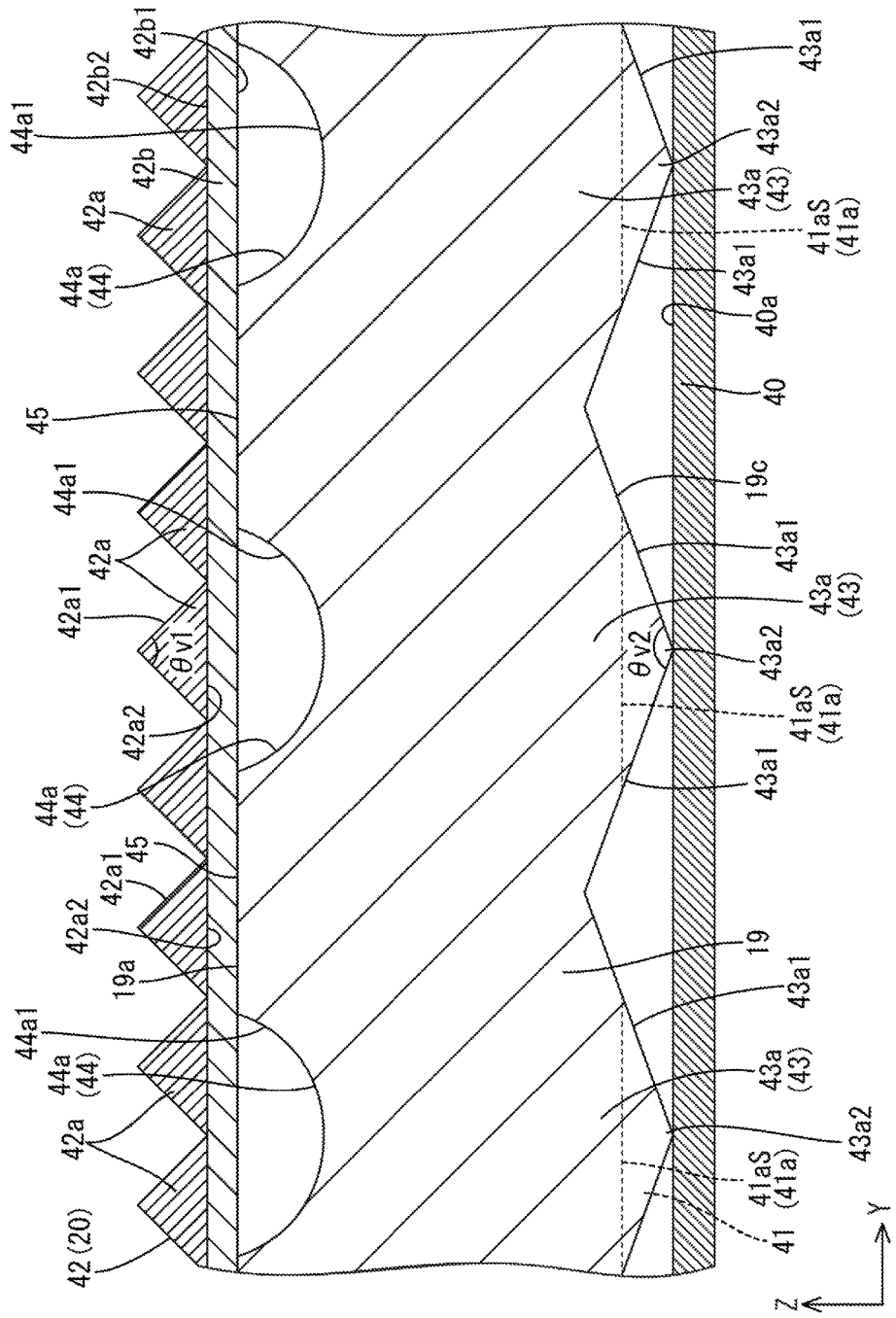
FIG. 11 is a cross-sectional view along line C-C in FIG. 6.
Figure 12:
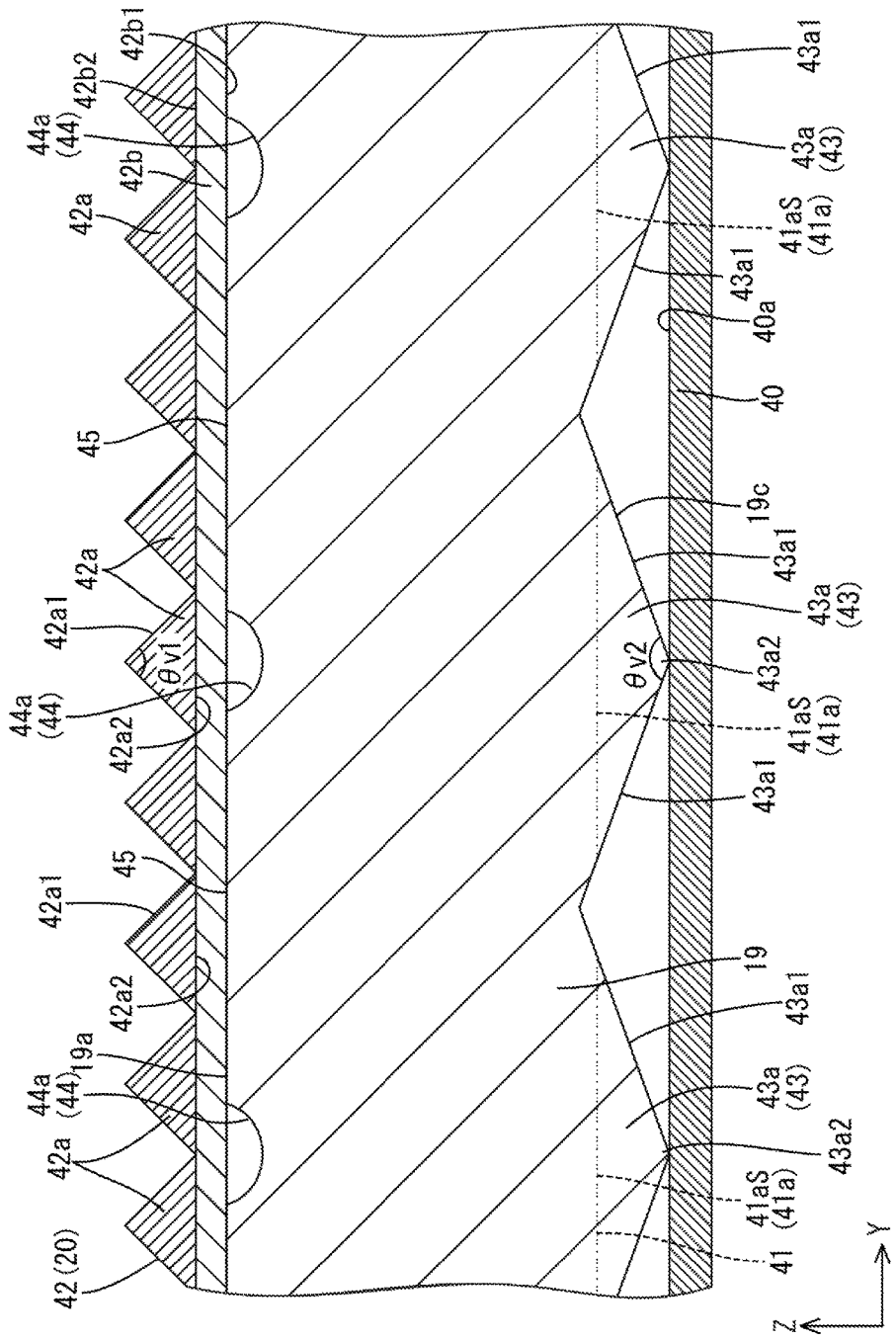
FIG. 12 is a cross-sectional view along line D-D in FIG. 6.
Figure 13:
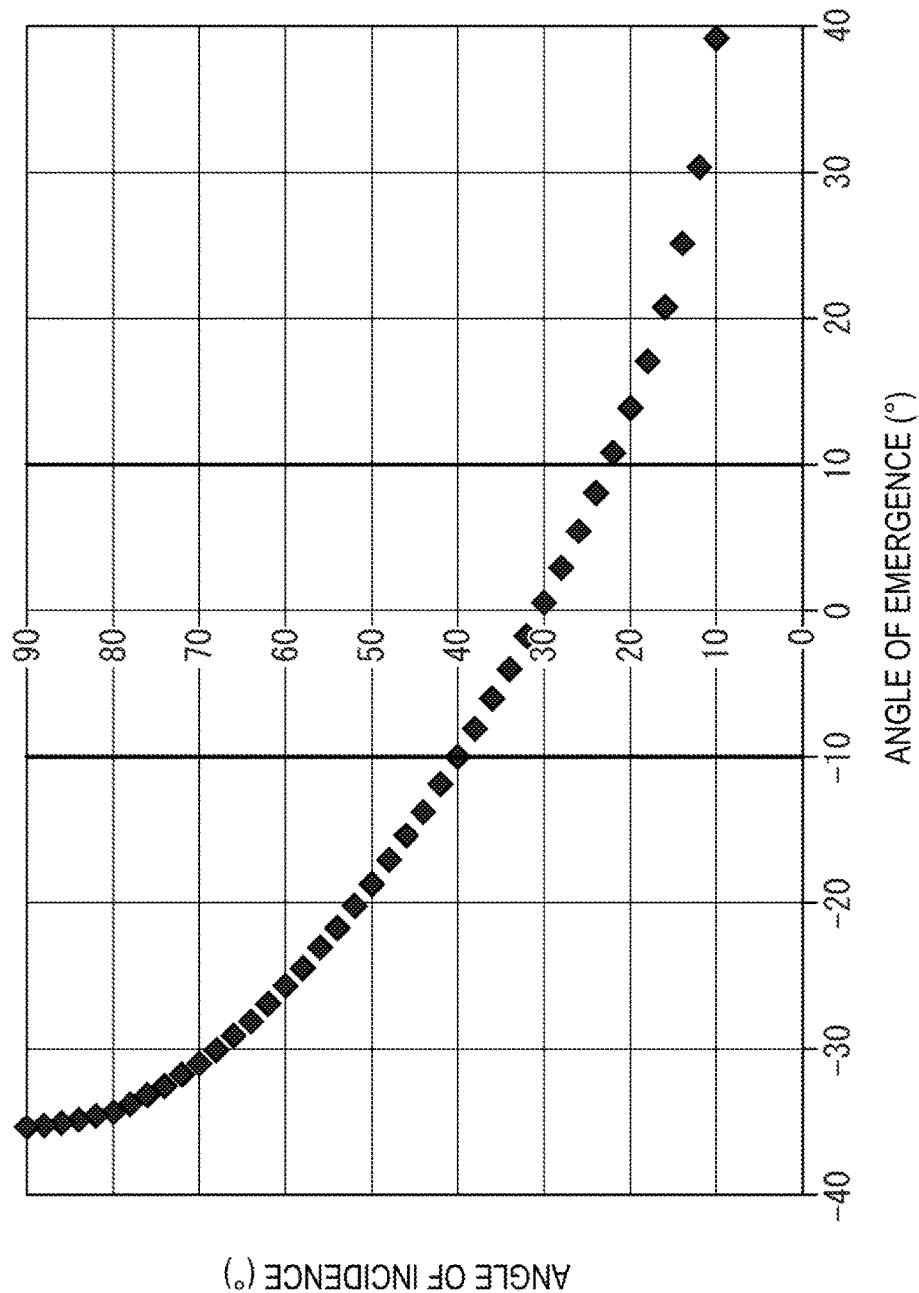
FIG. 13 is a graph illustrating relationships between angles of incidence of light entering a prism sheet and angles of emergence of light exiting from the prism sheet.

As illustrated in FIGS. 2 and 10, the prism sheet 42 includes a sheet base 42b and light exiting-side unit prisms (light exiting-side unit collectors) 42a. The sheet base 42b has a sheet shape. The sheet base 42b includes a light entering-side plate surface 42b1 and a light exiting-side plate surface 42b2. The light exiting from the light guide plate 19 enters through the light entering-side plate surface 42b1. The light exiting-side plate surface 42b2 is located on an opposite side (or the light exiting side) from the light entering-side plate surface 42b1. The light exiting-side unit prisms 42a are formed on the light exiting-side plate surface 42b2. The light exiting-side unit prisms 42a have light collecting anisotropic properties. The sheet base 42b is made of substantially transparent synthetic resin, specifically, thermosetting resin such as PET. The refractive index of the resin is about 1.667. The light exiting-side unit prisms 42a are integrally formed with the light exiting-side plate surface 42b2, which is the front plate surface (or on the light exiting side) of the sheet base 42b. The light exiting-side unit prisms 42a are made of transparent ultraviolet curing resin, which is one kind of light curing resin. In the production of the prism sheet 42, an ultraviolet curing resin that is not cured is inserted in a forming die to fill the die and then the sheet base 42b is placed over an opening of the die such that the ultraviolet curing resin that is not cured is in contact with the light exiting-side plate surface 42b2. Ultraviolet rays are applied to the ultraviolet curing resin via the sheet base 42b in the above condition. When the ultraviolet curing resin is cured, the light exiting-side unit prisms 42a are integrally formed with the sheet base 42b. The ultraviolet curing resin used for the light exiting-side unit prisms 42a may be acrylic resin such as PMMA. The refractive index of the resin may be about 1.59. The light exiting-side unit prisms 42a project from the light exiting-side plate surface 42b2 of the sheet base 42b toward the front (or the light exiting side) along the third direction (or the Z-axis direction). Each light exiting-side unit prism 42a has a substantially triangular cross section along the second direction (or the Y-axis direction) and linearly extends along the first direction (or the X-axis direction). Multiple light exiting-side unit prisms 42a are arranged along the second direction on the light exiting-side plate surface 42b2. The widths (or the dimensions in the second direction) of the light exiting-side unit prisms 42a are the same for an entire length with respect to the first direction. Each light exiting-side unit prism 42a has an isosceles triangular cross section including a pair of slopes 42a1 and a vertex angle θv1 of about 90° (a right angle). The light exiting-side unit prisms 42a arranged along the second direction include vertex angles θv1 about equal to one another, widths of bottom surfaces 42a2 about equal to one another, and heights about equal to one another. Intervals of the light exiting-side unit prisms 42a are about equal to one another.

When light rays from the light guide plate 19 enter the prism sheet 42 having the above configuration, as illustrated in FIG. 10, the light rays enter the light entering-side plate surface 42b1 of the sheet base 42b via an air layer between the light exiting surface 19a of the light guide plate 19 and the sheet base 42b of the prism sheet 42. The light rays are refracted at interfaces with angles in response to angles of incidence. If the light rays transmitted through the light exiting-side unit prisms 42a have reached the slope surfaces 42a1 of the light exiting-side unit prisms 42a and the angles of incidence thereof are larger than the critical angle, the light rays are totally reflected and returned to the sheet base 42b (retroreflected). If the angles of incidence are smaller than the critical angle, the light rays are not reflected at the interfaces and thus exit. The light rays traveling toward the adjacent light exiting side-unit prisms 42a among the light rays exiting from the slope surfaces 42a1 of the light exiting-side unit prisms 42a enter the light exiting-side unit prisms 42a and return to the sheet base 42b. The light rays exiting from the light exiting-side unit prisms 42a are controlled to travel in directions closer to a frontward direction toward the front with respect to the second direction. Namely, light collecting effects are selectively added to the exiting light with respect to the second direction.

Next, the prism portion 43 on the opposite plate surface 19c of the light guide plate 19 will be described. The prism portion 43 is integrally formed with the light guide plate 19. To integrally form the prism portion 43 with the light guide plate 19, the light guide plate 19 may be prepared by injection molding with a forming die including a forming surface for forming the opposite plate surface 19c with a pattern of the prism portion 43. As illustrated in FIGS. 2, 7 and 10, the prism portion 43 includes the unit prisms (opposite plate surface-side unit prisms) 43a arranged along the second direction (or the Y-axis direction). Each unit prism 43a extends along the first direction (or the X-axis direction). The unit prisms 43a project from the opposite plate surface 19c toward the front (or the light exiting side) along the third direction (or the Z-axis direction). Each unit prism 43a has a substantially triangular cross section along the second direction and linearly extends along the first direction. Widths (or dimensions in the second direction) of the unit prisms 43a are equal to one another for the entire length with respect to the first direction. Each unit prism 43a has an isosceles triangular cross section including a pair of slope surfaces 43a1 and a vertex angle θv2 larger than 90° (an obtuse angle). Preferably, the vertex angle θv2 is in a range from 100° to 150°, most preferably, about 140°. Namely, the vertex angle θv2 of each unit prism 43a is larger than the vertex angle θv1 of each light exiting-side unit prism 42a. The unit prisms 43a arranged along the second direction include vertex angles θv2 about equal to one another, widths of bottom surfaces about equal to one another, and heights about equal to one another. Intervals of the unit prisms 43a are about equal to one another.

As illustrated in FIG. 10, the prism portion 43 having the above configuration add the optical effects to the light rays traveling through the light guide plate 19 and reached the opposite plate surface 19c as follows. If the light rays that have reached the opposite plate surface 19c enter the slope surfaces 43a1 of the unit prisms 43a with angles of incidence smaller than the critical angle, at least some light rays are refracted at the slope surfaces 43a1 and selectively collected with respect to the second direction. Then, the collected light rays exit the unit prisms 43a. The light rays that have exited the unit prisms 43a are reflected by the reflection surface 40a of the reflection sheet 40. The reflected light rays that have reached the opposite plate surface 19c enter the slope surfaces 43a1 of the unit prisms 43a. Some light rays are refracted, that is, selectively collected with respect to the second direction. The light rays to which the light collecting effects are added by the prism portion 43 are more likely to be collected with respect to the second direction at the prism sheet 42. According to the configuration, frontward brightness related to the light rays exiting from the prism sheet 42 improves. Optical effects for diffusing the light rays with respect to the second direction may be added to some light rays refracted at the slope surfaces 43a1 of the unit prisms 43a to which the anisotropic light collecting effects described above are not added. If the light rays that have reached the opposite plate surface 19c enter the slope surfaces 43a1 of the unit prisms 43a with the angles of incidence larger than the critical angle, the light rays are totally reflected by the slope surfaces 43a1. The light rays that are totally reflected by the slope surfaces 43a1 of the unit prisms 43a travel through the light guide plate 19 to be diffused with respect to the second direction. The light rays are reflected by the exiting light reflecting portion 41. Therefore, uneven brightness with respect to the second direction is less likely to occur in the light exiting from the light exiting surface 19a.

Next, the concave lenticular lens portion 44 on the light exiting surface 19a side of the light guide plate 19 will be described. The concave lenticular lens portion 44 is integrally formed with the light guide plate 19. To integrally form the concave lenticular lens portion 44 with the light guide plate 19, the light guide plate 19 may be prepared by injection molding with a forming die including a forming surface for the light exiting surface 19a with a pattern of the concave lenticular lens portion 44. As illustrated in FIGS. 2, 6 and 10, the concave lenticular lens portion 44 includes concave cylindrical lenses (cylindrical lenses, light exiting surface-side cylindrical lenses) 44a that extend along the first direction (or the X-axis direction). The concave cylindrical lenses 44a are arranged along the second direction (or the Y-axis direction) in the light exiting surface 19a. The concave cylindrical lenses 44a are concave lenses formed by recessing the light exiting surface 19a along the third direction (or the Z-axis direction) toward the rear side. Each concave cylindrical lens 44a has a groove shape that extends along the first direction with a semicircular cross section along the second direction. Each concave cylindrical lens 44a includes a concave surface 44a1. Each concave cylindrical lens 44a has the following configuration. When an angle θt of a tangent line Ta at a base section 44a2 of the concave surface 44a1 relative to the second direction is referred to as "a tangent angle," the tangent angle θt may be about 70°. The detailed configuration of the concave lenticular lens portion 44 will be described later.

As illustrated in FIG. 10, the concave cylindrical lenses 44a having the above configuration add optical effects to light rays that have traveled through the light guide plate 19 and reached the light exiting surface 19a as follows. If the light rays that have reached the light exiting surface 19a enter the concave surfaces 44a1 with angles of incidence larger than the critical angle, the light rays are totally reflected by the concave surfaces 44a1. The reflected light rays travel through the light guide plate 19 so as to be diffused with respect to the second direction. In comparison to convex cylindrical lenses, the light rays are more likely to enter the concave surfaces 44a1 of the concave cylindrical lenses 44a with the angles of incidence larger than the critical angle. Therefore, the concave cylindrical lenses 44a are more likely to totally reflect the light rays and thus the light rays are diffused in a wider area with respect to the first direction. The light reflected by the exiting light reflecting portion 41 and exiting from the light exiting surface 19a are less likely to have uneven brightness with respect to the second direction. If the light rays that have reached the light exiting surface 19a enter the concave surfaces 44a1 of the concave cylindrical lenses 44a with the angles of incidence equal to or smaller than the critical angle, at least some of the light rays are refracted at the concave surfaces 44a1 exit toward the prism sheet 42 with the light collecting effects with respect to the second direction selectively added to the light rays. The light rays with the anisotropic light collecting effects added by the concave cylindrical lenses 44a are less likely to be collected by the prism sheet 42 with respect to the second direction. The light rays are more likely to be diffused with respect to the second direction. Although the light can improve the uneven brightness of the light exiting from the prism sheet 42, the light cannot contribute to the improvement of the frontward brightness.

As illustrated in FIGS. 9 and 10, the light rays emitted by the LEDs 17 and entering the light guide plate 19 through the light entering surface 19b as described above travel through the light guide plate 19 toward the opposite end surface 19d with respect to the first direction. During traveling through the light guide plate 19, the light rays are totally reflected by the prism portion 43 on the opposite plate surface 19c and the concave lenticular lens portion 44 in the light exiting surface 19a, that is, the light rays are diffused in the wide area with respect to the second direction. The light rays traveling through the light guide plate 19 are properly mixed with respect to the second direction, which corresponds to the arrangement direction of the LEDs 17. Therefore, the light exiting from the light exiting surface 19a is less likely to have uneven brightness with respect to the second direction. At least some of the light rays reflected by the exiting light reflecting portion 41 during traveling through the light guide plate 19 exit from the light exiting surface 19a with the light collecting effects selectively added by either the prism portion 43 or the concave lenticular lens portion 44 or both. The light rays with the anisotropic light collecting effects added by the concave lenticular lens portion 44 are less likely to be collected by the prism sheet 42 with respect to the second direction. However, the light rays with the anisotropic light collecting effects added not by the concave lenticular lens portion 44 but by the prism portion 43 are more likely to be collected by the prism sheet 42 with respect to the second direction. Therefore, the frontward brightness related to the light exiting from the prism sheet 42 improves.

As illustrated in FIG. 10, the prism sheet 42 includes the light exiting-side unit prisms 42a having the vertex angles θv1 smaller than the vertex angles θv2 of the unit prisms 43a. In comparison to the prism portion 43, the prism sheet 42 retroreflects more light rays and restricts the range of the angles of emergence of the exiting light to a smaller range. Namely, the prism sheet 42 has the strongest light collecting effects. The anisotropic light collecting effects are added to some light rays entering the prism sheet 42 by the prism portion 43 at the opposite plate surface 19c of the light guide plate 19. Therefore, a percentage of the light rays that are retroreflected by the light exiting-side unit prisms 42a of the prism sheet 42 is low and thus the light rays efficiently exit from the light exiting-side unit prisms 42a. According to the configuration, high light use efficiency is achieved. This configuration is preferable for improving the brightness of light exiting from the backlight unit 12.

The following examination was performed to determine angles of the light rays entering the prism sheet 42 for contribution of the light rays exiting from the prism sheet 42 to the improvement of the frontward brightness. A relationship between the angles of incidence of the light rays entering the light entering-side plate surface 42b1 of the sheet base 42b of the prism sheet 42 and the angles of emergence of the light rays exiting from the prism sheet 42 is determined based on Snell's law. Results are presented in FIG. 13. A specific method of calculation is provided below. An angle of emergence of each light ray exiting from the light entering-side plate surface 42b1 is calculated based on an angle of incidence of the light ray entering the light entering-side plate surface 42b1. The angle of emergence of light ray exiting from the light entering-side plate surface 42b1 is equal to the angle of incident of light entering the light exiting-side plate surface 42b2 or the bottom surface 42a2 of the light exiting-side unit prism 42a. Therefore, an angle of emergence of light ray exiting from the light exiting-side plate surface 42b2 and an angle of emergence of light ray exiting from the bottom surface 42a2 of the light exiting-side unit prism 42a can be calculated (see FIG. 10). The angle of emergence of the light ray exiting from the light exiting-side plate surface 42b2 or the angle of emergence of the light ray exiting from the bottom surface 42a2 of the light exiting-side unit prism 42a is equal to an angle of incidence of the light ray entering the slope surface 42a1 of the light exiting-side unit prism 42a (see FIG. 10). The refractive indexes of the sheet base 42b and the light exiting-side unit prisms 42a and the vertex angles θv1 of the light exiting-side unit prisms 42a have been described earlier. The refractive index of the external air layer is set to "1.0." In FIG. 13, the vertical axis represents angles of incidence of light rays entering the light entering-side plate surface 42b1 of the sheet base 42b (in unit of "°") and the horizontal axis represents angles of emergence of light rays exiting from the slope surface 42a1 of the light exiting-side unit prism 42a. The light rays with the angle of refraction of 0° travel in the direction parallel to the frontward direction toward the front. According to FIG. 13, to achieve light rays exiting from the slope surfaces 42a1 of the light exiting-side unit prisms 42a with angles within in a range of ±10°, the angles of incidence of the light rays entering the light entering-side plate surface 42b1 of the sheet base 42b need to be set in a range from 23° to 40°. If the light rays entering the prism sheet 42, that is, the light rays exiting from the light exiting surface 19a of the light guide plate 19 are controlled to exit with the angles of emergence in the range from 23° to 40°, the light rays exit from the light exiting-side unit prisms 42a of the prism sheet 42 with the angles of emergence in the range of ±10° relative to the frontward direction. This is effective for improving the frontward brightness related to the exiting light. In this embodiment, the light rays to which the anisotropic light collecting effects are added by the prism portion 43 of the light guide plate 19 tend to include a larger number of light rays exiting from the light exiting surface 19a with the angles of emergence in the range from 23° to 40°. Furthermore, the light rays to which the anisotropic light collecting effects are added by the concave lenticular lens portion 44 tend to include a larger number of light rays exiting from the light exiting surface 19a with the angles of emergence out of the range from 23° to 40°.

In the known technology, elongated protrusions are formed on the light exiting surface of the light guide plate to improve the frontward brightness of exiting light. However, uneven brightness is more likely to occur according to the above configuration. In the known technology, point light sources are arranged at intervals along a longitudinal direction of the light entering surface of the light guide plate. In a portion of the light guide plate closer to the light entering surface, bright spots and dark spots tend to be created by the light exiting from the light exiting surface along the arrangement direction of the point light sources. The elongated protrusions tend to increase the brightness in the bright spots and thus the uneven brightness is more likely to occur in the portion close to the light entering surface. If cylindrical lenses are formed instead of the elongated protrusions, the uneven brightness may be reduced. However, the cylindrical lenses may produce light rays that do not contribute to collection of light by a prism sheet and may create another issue that the frontward brightness decreases.

As illustrated in FIGS. 7 and 10 to 12, the light exiting surface 19a of the light guide plate 19 according to this embodiment includes flat portions 45 in addition to the concave lenticular lens portion 44. Furthermore, an occupancy rate of the flat portions 45 with respect to the second direction varies according to positions with respect to the first direction. Specifically, the concave lenticular lens portion 44 is configured as follows. A width (or a dimension in the second direction) of the concave cylindrical lens 44a located close to the light entering surface 19b (or farther from the opposite end surface 19d) with respect to the first direction, that is, the occupancy rate with respect to the second direction is higher. The occupancy rate of the concave cylindrical lens 44a located farther from the light entering surface 19b (or closer to the opposite end surface 19d) with respect to the second direction is lower. The flat portions 45 are flat along the first direction (or the X-axis direction) and the second direction (or the Y-axis direction). The flat portions 45 are arranged in areas of the light exiting surface 19a of the light guide plate 19 in which the concave lenticular lens portion 44 is not formed. The flat portions 45 are arranged adjacent to the concave cylindrical lenses 44a of the concave lenticular lens portion 44 with respect to the second direction. The concave cylindrical lenses 44a and the flat portions 45 are alternately arranged with respect to the second direction on the light exiting surface 19a of the light guide plate 19. The widths of the flat portions 45 closer to the light entering surface 19b (or farther from the opposite end surface 19d) with respect to the first direction are smaller, that is, the occupancy rates with respect to the second direction are lower. The occupancy rates of the flat portions 45 farther from the light entering surface 19b (or closer to the opposite end surface 19d) with respect to the second direction are higher.

More specifically, as illustrated in FIGS. 7 and 10 to 12, the widths of the concave cylindrical lenses 44a, that is, the occupancy rates in the light exiting surface 19a with respect to the second direction gradually decrease as a distance from the light entering surface 19b with respect to the first direction increases and a distance to the opposite end surface 19d decreases. The occupancy rates gradually increase as the distance from the opposite end surface 19d with respect to the first direction increases and the distance to the light entering surface 19b decreases. The occupancy rate of the concave cylindrical lens 44a is at a maximum in an end portion (closer to an edge) of the light guide plate 19 closer to the light entering surface 19b, which is in a range from 70% to 90%. The occupancy rate of the concave cylindrical lens 44a is at a minimum in an end portion of the light guide plate 19 closer to the opposite end surface 19d, which is in a range from 10% to 30%. The occupancy rate is about 50% in the middle portion of the light guide plate 19 with respect to the first direction. The concave cylindrical lenses 44a are formed such that heights thereof (or dimensions in the third direction) vary according to positions with respect to the first direction. Specifically, the concave cylindrical lenses 44a are formed such that the heights, that is, heights from the light exiting surface 19a gradually decrease as the distance from the light entering surface 19b with respect to the first direction increases and the distance to the opposite end surface 19d decreases. The heights gradually increase as the distance from the opposite end surface 19d with respect to the first direction increases and the distance to the light entering surface 19b decreases. Namely, the heights of the concave cylindrical lenses 44a vary according to the positions with respect to the first direction, similarly to the widths. Therefore, surface areas of the concave cylindrical lenses 44a (areas of the concave surfaces 44a1) also vary according to the positions with respect to the first direction, similarly to the widths and the heights. Each concave cylindrical lens 44a has a slope that inclines as the distance from the light entering surface 19b with respect to the first direction increases and the distance to the opposite end surface 19d decreases. The slope declines as the distance from the opposite end surface 19d increases and the distance to the light entering surface 19b decreases. Namely, the slope declines toward the light entering surface 19b (toward the LEDs 17). The widths of the flat portions 45, that is, the occupancy rates of the flat portions in the light exiting surface 19a with respect to the second direction gradually decrease as the distance to the light entering surface 19b with respect to the first direction decreases and the distance from the opposite end surface 19d increases. The occupancy rates gradually increase as the distance to the opposite end surface 19d with respect to the first direction decreases and the distance from the light entering surface 19b increases. The occupancy rate of the flat portions 45 in the end portion (closer to the edge) of the light guide plate 19 with respect to the first direction closer to the light entering surface 19b is at a minimum, which is in the range from 10% to 30%. The occupancy rate of the flat portions 45 in the end portion closer to the opposite end surface 19d is at a maximum, which is in the range from 70% to 90%. The occupancy rate of the flat portions 45 in the middle portion is about 50%. Namely, in the middle area of the light exiting surface 19a with respect to the first direction, the occupancy rate of the concave cylindrical lens 44a with respect to the second direction and the occupancy rate of the flat portions 45 in the meddle area with respect to the second direction are equal to each other.

As described above, the concave lenticular lens portion 44 adds the anisotropic light collecting effects to the light rays reflected by the exiting light reflecting portion 41. The light rays to which the anisotropic light collecting effects are added are less likely to be collected by the prism sheet 42 with respect to the second direction and more likely to be diffused with respect to the second direction. The flat portions 45 arranged adjacent to the concave cylindrical lenses 44a with respect to the second direction are less likely to add specific optical effects to the light rays reflected by the exiting light reflecting portion 41. The prism portion 43 dominantly adds the anisotropic light collecting effects to the light rays exiting toward the prism sheet 42 through the flat portions 45. Therefore, the light collecting effects are more likely to be added to the light rays by the prism sheet 42. As the occupancy rate of the concave cylindrical lenses 44a of the concave lenticular lens portion 44 with respect to the second direction increases and the occupancy rate of the flat portions 45 with respect to the second direction decreases, the uneven brightness of the light exiting from the prism sheet 42 with respect to the second direction is more likely to be reduced. As the occupancy rate of the flat portions 45 with respect to the second direction increases and the occupancy rate of the concave cylindrical lenses 44a with respect to the second direction decreases, the uneven brightness of the light exiting from the prism sheet 42 is less likely to be reduced but the brightness tends to increase.

Regarding the concave lenticular lens portion 44 and the flat portions 45, as described above, the occupancy rate of the concave lenticular lens portion 44a with respect to the second direction is higher and the occupancy rate of the flat portions 45 with respect to the second direction is lower in the area closer to the light entering surface 19b with respect to the first direction. In the area farther from the light entering surface 19b (or closer to the opposite end surface 19d) with respect to the first direction, the occupancy rate of the concave cylindrical lenses 44a with respect to the second direction is lower and the occupancy rate of the flat portions 45 with respect to the second direction is higher. In the area closer to the light entering surface 19b with respect to the first direction in which the uneven brightness that may be caused by the LEDs 17 arranged along the light entering surface 19b may occur, the concave cylindrical lenses 44a of the concave lenticular lens portion 44 with the higher occupancy rate reduce the uneven brightness of the light exiting from the prism sheet 42 with respect to the second direction. In the area farther from the light entering surface 19b with respect to the first direction in which the uneven brightness that may be caused by the LEDs 17 is less likely to occur, the flat portions 45 with the higher occupancy rate improve the brightness of the light exiting from the prism sheet 42. According to the configuration, the uneven brightness of the light exiting from the prism sheet 42 is reduced and the brightness of the exiting light improves.

Figure 14:
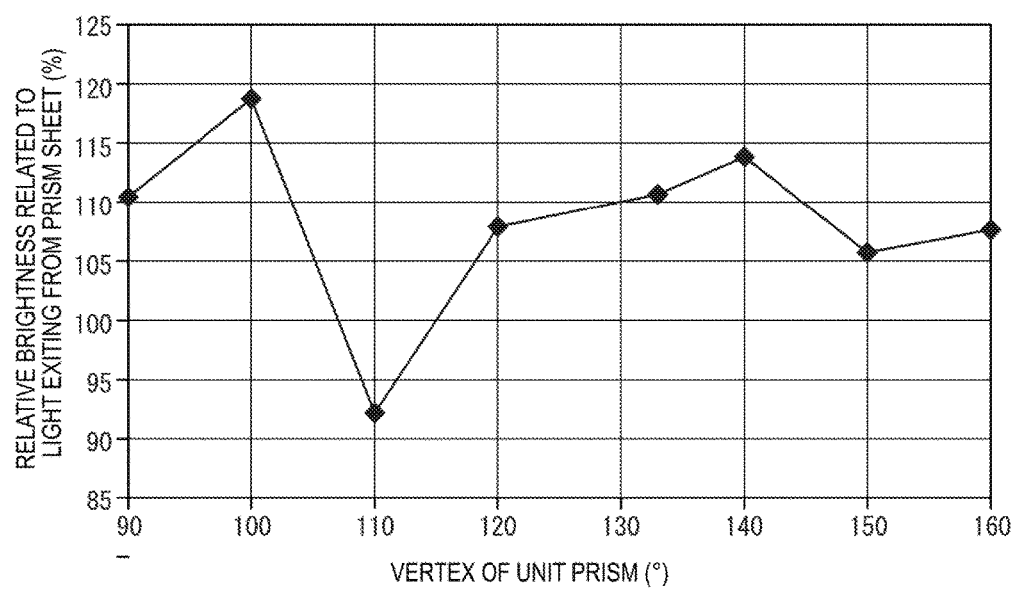
FIG. 14 is a graph illustrating relationships between vertices of unit prisms of the light guide plate and relative brightness levels of light exiting from the prism sheet in comparative experiment 1.

Comparative experiment 1 was conducted. In comparative experiment 1, a light guide plate that included a light exiting surface, an entire area of which was configured as a flat portion, and an opposite plate surface on which a prism portion was formed was used. Vertex angles of unit prisms of the prism portion were altered and how brightness changed in response to the alteration of the vertex angles were determined. The light guide plate used in comparative experiment 1 included the flat portion formed on the entire light exiting surface. The light guide plate further included an exiting light reflecting portion and a prism portion formed on the opposite plate surface. The vertex angles of the unit prisms of the prism portion were altered in a range from 90° to 160°. The brightness levels of light exiting from the light guide plate through the light exiting surface, traveling through a prism sheet, and exiting from the prism sheet were measured as the vertex angles were altered. The results are presented in FIG. 14. The configuration of the light guide plate used in comparative experiment 1 other than the flat portion formed on the entire light exiting surface is the same as the configuration of the light guide plate descried above. The configuration of the prism sheet used in comparative experiment 1 is the same as the configuration of the prism sheet described above. In FIG. 14, the horizontal axis represents vertex angles of the unit prisms (in unit of "°") and the vertical axis represents relative brightness levels of light exiting from the prism sheet (in unit of "%"). The relative brightness levels of the exiting light represented by the vertical axis in FIG. 14 are expressed in brightness levels relative to a reference. A brightness level of light exiting from the light guide plate (hereinafter referred to as a light guide plate of comparative example 2) including the concave lenticular lens portion including the concave cylindrical lenses with a width that did not change for an entire length and formed on the entire area of the light exiting surface and the unit prisms of the prism portion on the opposite plate surface with the vertex angle of 100° was defined as the reference (100%). The light guide plate including the unit prisms with the vertex angle of 100° used in comparative experiment 1 was referred to as comparative example 1.

The results of comparative experiment 1 will be described. From FIG. 14, when the vertex angles of the unit prisms of the light guide plate used in comparative experiment 1 were in a range from 90° to 100° or in a range from 120° to 160°, the relative brightness levels were at least 5% higher in comparison to the light guide plate of comparative example 2. When the vertex angles of the unit prisms were in a range from 90° to 100° or in a range from 133° to 140°, the relative brightness levels were at least 10% higher in comparison to the light guide plate of comparative example 2. When the vertex angles of the unit prisms were 100°, the brightness levels were the highest and the relative brightness levels were about 18% higher in comparison to the light guide plate of comparative example 2. When the plate portion is formed on the entire light exiting surface of the light guide plate as in comparative experiment 1, specific optical effects are not added to the light by the flat portion. Therefore, the prism portion dominantly adds the anisotropic light collecting effects to the light exiting from the light guide plate. It is preferable to set the vertex angles of the unit prisms of the prism portion in the range from 90° to 100° or in the range from 120° to 160°, more preferably, in the range from 133° to 140°. It is most preferable to set the vertex angles of the unit prisms of the prism portion to 100°. This tendency may be observed in the configuration in which the concave lenticular lens portion 44 with the width that varies according to the positions with respect to the first direction and the flat portions 45 are formed on the light exiting surface 19a of the light guide plate.

Figure 15:
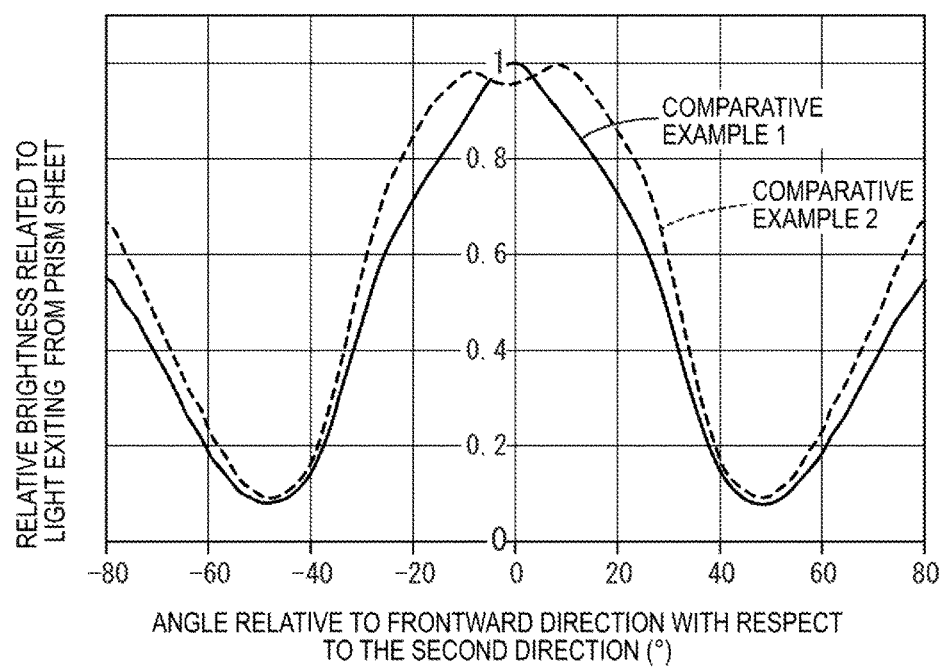
FIG. 15 is a graph illustrating brightness angle distributions of light exiting from the prism sheets after exiting from the light guide plates and traveling through the prism sheets of comparative examples 1 and 2 with respect to the second direction in comparative experiment 2.

Comparative experiment 2 was conducted to determine differences in brightness distribution between a light guide plate including an entire light exiting surface configured as a flat portion and a light guide plate including an entire light exiting surface configured as a lenticular lens portion. In comparative example 2, the light guide plates having the following configurations were used. The light guide plate including the flat portion on the entire light exiting surface and an exiting light reflecting portion and a prism portion including unit prisms with a vertex angle of 100° on an opposite plate surface was referred to as comparative example 1. The light guide plate including the concave lenticular lens portion including concave cylindrical lenses with the width that does not change for the entire length with respect to the first direction on the entire light exiting surface and the prism portion including unit prisms with the vertex angle of 100° on the opposite plate surface was referred to as comparative example 2. Brightness distribution of light exiting through the light guide plate of comparative example 1 and a prism sheet and brightness distribution of light exiting through the light guide plate of comparative example 2 and a prism sheet were measured. The results are presented in FIG. 15. In FIG. 15, the vertical axis represents relative brightness levels (no unit) of light exiting from the prism sheets and the horizontal axis represents angles relative to the frontward direction with respect to the second direction (in unit of "°"). The relative brightness levels represented by the vertical axis in FIG. 15 are expressed in brightness levels relative to a reference. A brightness level relative to the frontward direction (with the angle of 0°) on the light guide plate according to each of comparative examples 1 and 2 is defined as the reference (1.0). In FIG. 15, a solid line expresses measurements of comparative example 1 and a broken line expresses measurements of comparative example 2. The prism sheet used in comparative experiment 2 has the same configuration as the configuration of the prism sheet described above.

Results of comparative experiment 2 will be described. According to FIG. 15, the frontward brightness of light exiting from the prism sheet of comparative example 1 with respect to the second direction is higher than the frontward brightness of comparative example 2. Specifically, the light exiting through the light guide plate according to comparative example 1 and the prism sheet includes more light rays traveling in directions in an angle range of ±5° relative to the direction toward the front than the light exiting through the light guide plate according to comparative example 2 and the prism sheet. Furthermore, the light exiting through the light guide plate according to comparative example 1 and the prism sheet includes less light rays traveling in directions in an angle range of ±5° to ±40° relative to the frontward direction in comparison to the light exiting through the light guide plate according to comparative example 2 and the prism sheet. Namely, more light rays exiting through the light guide plate according to the first embodiment and the prism sheet were collected in the frontward direction in comparison to comparative example 2. As illustrated in FIG. 14 according to comparative experiment 1, the relative brightness level of comparative example 1 including the flat portion on the entire light exiting surface and the unit prisms with the vertex angle of 100° was improved by about 18% from the relative brightness level of comparative example 2 including the concave lenticular lens portion on the entire light exiting surface and the unit prisms with the vertex angle of 100°.

Comparative experiment 3 was conducted to determine whether uneven brightness occurs in light exiting from light guide plates have the following configurations: a light guide plate including a flat portion in an entire area of a light exiting surface; a light guide plate including a concave lenticular lens portion on an entire light exiting surface; and the light guide plate 19 including the concave lenticular lens portion 44 and the flat portions 45. In comparative experiment 3, the light guide plates according comparative examples 1 and 2 used in comparative experiment 2 described above were used and the light guide plate 19 was used as embodiment 1. The light guide plate 19 according to embodiment 1 includes the concave lenticular lens portion 44 and the flat portions 45. In the area closer to the light entering surface 19b with respect to the first direction, the occupancy rate of the concave cylindrical lens 44a of the concave lenticular lens portion 44 with respect to the second direction is higher and the occupancy rate of the flat portion with respect to the second direction is lower. In the area farther from the light entering surface 19b with respect to the first direction, the occupancy rate of the concave cylindrical lens 44a with respect to the second direction is lower and the occupancy rate of the flat portions 45 with respect to the second direction is higher. The detailed configuration is the same as the configuration of the light guide plate described before the description of comparative experiment 1. The vertex angle θv2 of the unit prisms 43a of the prism portion 43 on the opposite plate surface 19c of the light guide plate 19 according to embodiment 1 is 100°. In comparative experiment 3, in the backlight units including the light guide plates according to comparative examples 1 and 2 and embodiment 1, respectively, pictures were taken from the light exiting surface side in a condition that the light from the LEDs enters the light guide plates through the light entering surfaces and exit from the light exiting surfaces to determine whether uneven brightness was present based on the pictures. The results are presented in FIG. 16. Each of the backlight units has a configuration same as the configuration of the backlight unit described before the description of comparative experiment 1 except for each of the light guide plates according to comparative examples 1 and 2 and embodiment 1. The pictures taken from the light exiting surface side in the condition that the light exiting from the light guide plates through the light exiting surfaces according to the comparative examples 1 and 2 and embodiment 1 and the results of the determination about the uneven brightness based on the pictures are presented in FIG. 16. The pictures in FIG. 16 include portions of the light exiting surfaces of the light guide plates. The LEDs are arranged on below lower ends of the light guide plates in FIG. 16.

Figure 16:
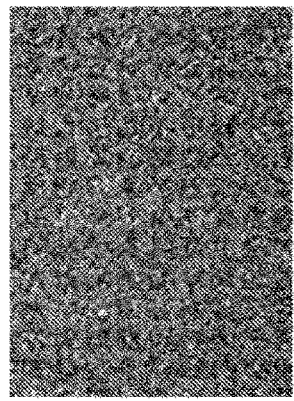
FIG. 16 is a table including pictures of the light guide plates of comparative examples 1 and 2 and embodiment 1 taken from the light exiting surface side and illustrating results of determination about uneven brightness in comparative experiment 3.

Results of comparative experiment 3 will be described. In FIG. 16, the uneven brightness is observed in the picture of the light guide plate according to comparative example 1 but the uneven brightness is rarely observed in the picture of the light guide plate according to comparative example 2. The light guide plate according to comparative example 1 included the entire light exiting surface configured as the flat portion and did not include the concave lenticular lens portion. Therefore, light traveling through the light guide plate was diffused with respect to the second direction at a lower level. As a result, the uneven brightness occurred in the light exiting from the light exiting surface such that bright spots and dark spots alternately appeared with respect to the second direction (or the arrangement direction of the LEDs). Contrarily, the light guide plates according to comparative example 2 and embodiment 1 had the configurations in which the concave lenticular lens portions were formed on the light exiting surfaces. The light traveling each of the light guide plates was properly diffused by the concave lenticular lens portion with respect to the second direction. Therefore, the uneven brightness with respect to the second direction rarely occurred in the light exiting from the light exiting surface. There was not much difference in level of uneven brightness between the comparative example 2 and embodiment 1. In comparison to comparative example 2, the occupancy rate of the concave lenticular lens portion 44 in the light exiting surface 19a in embodiment 1 was lower. However, in the area of the light exiting surface 19a closer to the light entering surface 19b in which the uneven brightness may occur due to arrangement of the LEDs 17 (in which the LEDs 17 were arranged at intervals along the light entering surface 19b), the widths of the concave cylindrical lenses 44a of the concave lenticular lens portion 44 were sufficiently large, that is, the occupancy rate of the concave cylindrical lenses 44a was sufficiently high. Therefore, in the area closer to the light entering surface 19b with respect to the first direction, the light traveling through the light guide plate 19 was diffused with respect to the second direction at a sufficient level by the concave lenticular lens portion 44. As a result, the uneven brightness with respect to the second direction was reduced at the same level as comparative sample 2.

Figure 17:
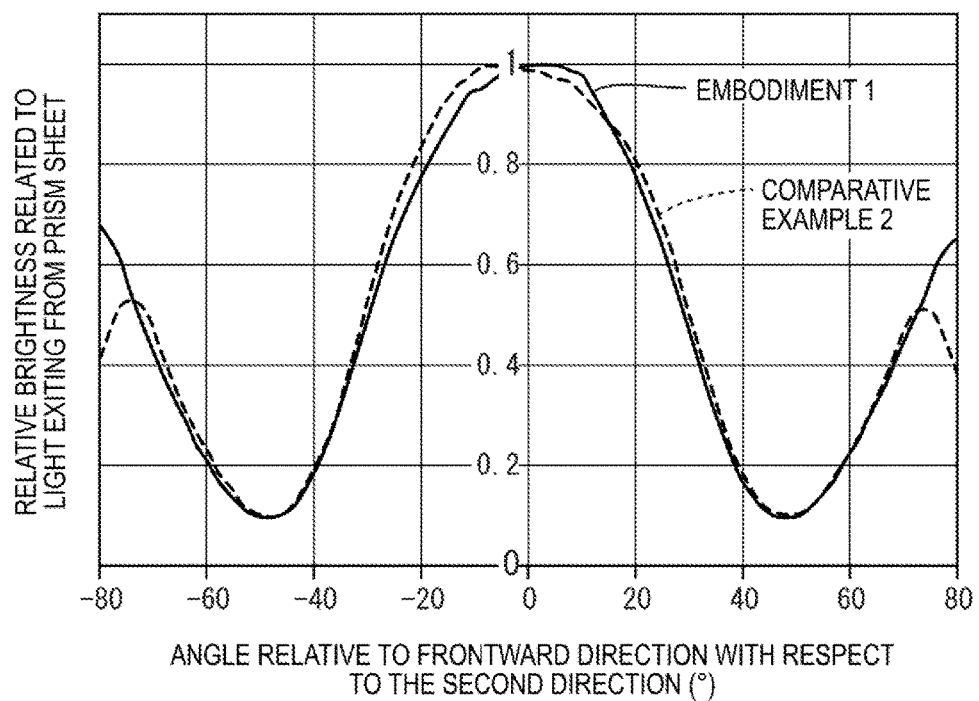
FIG. 17 is a graph illustrating brightness angle distributions of light exiting from the prism sheets after exiting from portions of the light guide plates closer to the light entering surfaces with respect to the first direction and traveling through the prism sheets of comparative example 2 and embodiment 1 with respect to the second direction in comparative experiment 4.
Figure 18:
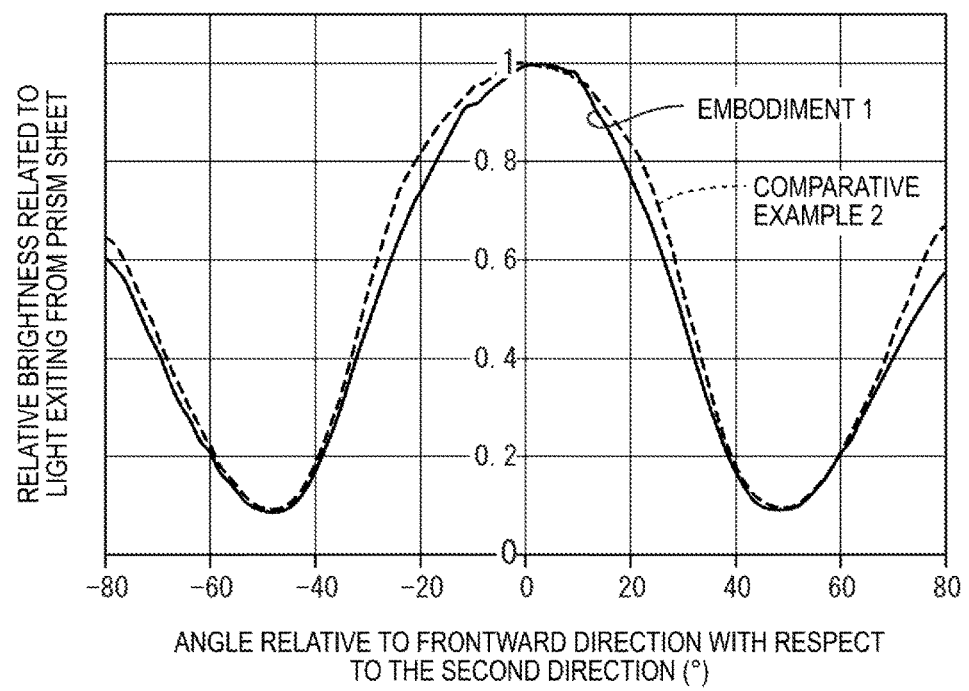
FIG. 18 is a graph illustrating brightness angle distributions of light exiting from the prism sheets after exiting from middle portions of the light guide plates with respect to the first direction and traveling through the prism sheets of comparative example 2 and embodiment 1 with respect to the second direction in comparative experiment 4.
Figure 19:
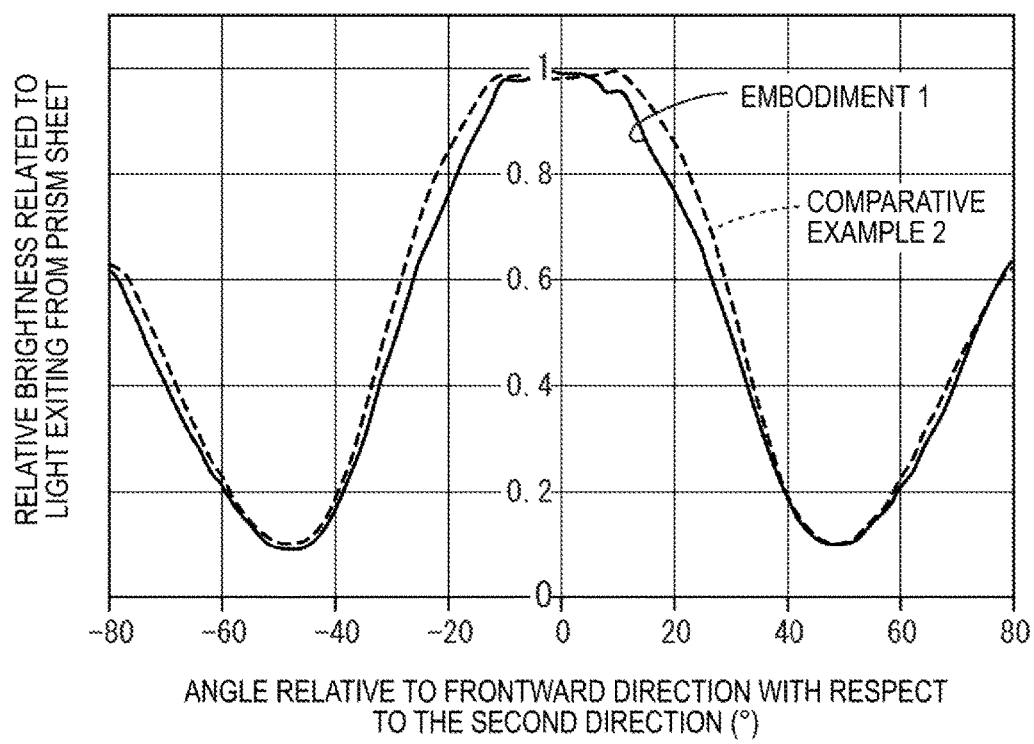
FIG. 19 is a graph illustrating brightness angle distributions of light exiting from the prism sheets after exiting from portions of the light guide plates closer to the opposite end surfaces with respect to the first direction and traveling through the prism sheets of comparative example 2 and embodiment 1 with respect to the second direction in comparative experiment 4.

Comparative experiment 4 was conducted to determine differences in brightness distribution between a configuration in which a concave lenticular lens portion including concave cylindrical lenses having a width that did not change for an entire length was formed on an entire light exiting surface and a configuration in which the concave lenticular lens portion 44 with the occupancy rate with respect to the second direction which changed according to the positions with respect to the first direction and the flat portions 45 on the light exiting surface 19a. In comparative experiment 4, the light guide plate according to comparative example 2 in the description of comparative experiment 2 and the light guide plate 19 according to embodiment 1 in the description of comparative experiment 3 were used. Brightness distributions of light exiting through the light guide plate according to comparative example 2 and the prism sheet and light exiting through the light guide plate according to embodiment 1 and the prism sheet were measured. The measurements are presented in FIGS. 17 to 19. The measurements of the brightness distributions were performed at three points of each of the light guide plate according to comparative example 2 and embodiment 1: a point closer to the light entering surface with respect to the first direction; a point in the middle; and a point closer to the opposite plate surface. The measurements at the point closer to the light entering surface are present in FIG. 17. The measurements at the point in the middle are presented in FIG. 18. The measurements at the point closer to the opposite plate surface are presented in FIG. 19. In each of FIGS. 17 to 19, the vertical axis represents relative brightness levels (no unit) of light exiting from the prism sheet and the horizontal axis represents angle relative to the frontward direction with respect to the second direction (in unit of "°"). The relative brightness levels represented by the vertical axis in each of FIGS. 17 to 19 are expressed in brightness levels relative to a reference. A brightness level relative to the frontward direction (with the angle of 0°) on the light guide plate according to each of comparative example 2 and embodiment 1 was defined as the reference (1.0). In each of FIGS. 17 to 19, a broken line expresses the measurements of comparative example 2 and a solid line expresses the measurements of embodiment 1. Each prism sheet used in comparative experiment 4 had the same configuration as the configuration of the prism sheet in the description before this paragraph.

Results of comparative experiment 4 will be described. In FIGS. 17 to 19, the frontward brightness of the light guide plate 19 according to embodiment 1 is higher at any point with respect to the first direction in comparison to the light guide plate according to comparative example 1. From comparison between FIGS. 18 and 19, it is obvious that the front brightness of embodiment 1 is higher at the point closer to the opposite end surface with respect to the first direction than at the point in the middle with respect to the first direction. The frontward brightness of the light guide plate 19 according to embodiment 1 increased as the distance from the light entering surface 19b increased and the distance to the opposite end surface 19d decreased. This expresses tendency that the front brightness is inversely proportional to variations in width of the concave cylindrical lenses 44a. The width of the concave cylindrical lenses 44a (or the occupancy rate thereof with respect to the second direction) was at a maximum at an end position closer to the light entering surface 19b with respect to the first direction and at a minimum at an end position closer to the opposite end surface 19d with respect to the first direction. As the width decreased, the frontward brightness of the light exiting through the light guide plate 19 and the prism sheet 42 improved. The concave cylindrical lenses 44a having the width that varied as above properly reduced the uneven brightness with respect to the second direction with the width set larger in the area closer to the light entering surface 19b with respect to the first direction. Furthermore, in the middle area or the area closer to the opposite end surface 19d with respect to the first direction in which such uneven brightness was less likely to occur, the concave cylindrical lenses 44a having a smaller width improved the frontward brightness achieved with the light exiting from the prism sheet. The brightness level of the light exiting through the light guide plate 19 according to embodiment 1 and the prism sheet 42 was measured. The brightness level was improved by about 9% in comparison to the brightness level of the light exiting through the light guide plate according to comparative example 2.

Figure 8:
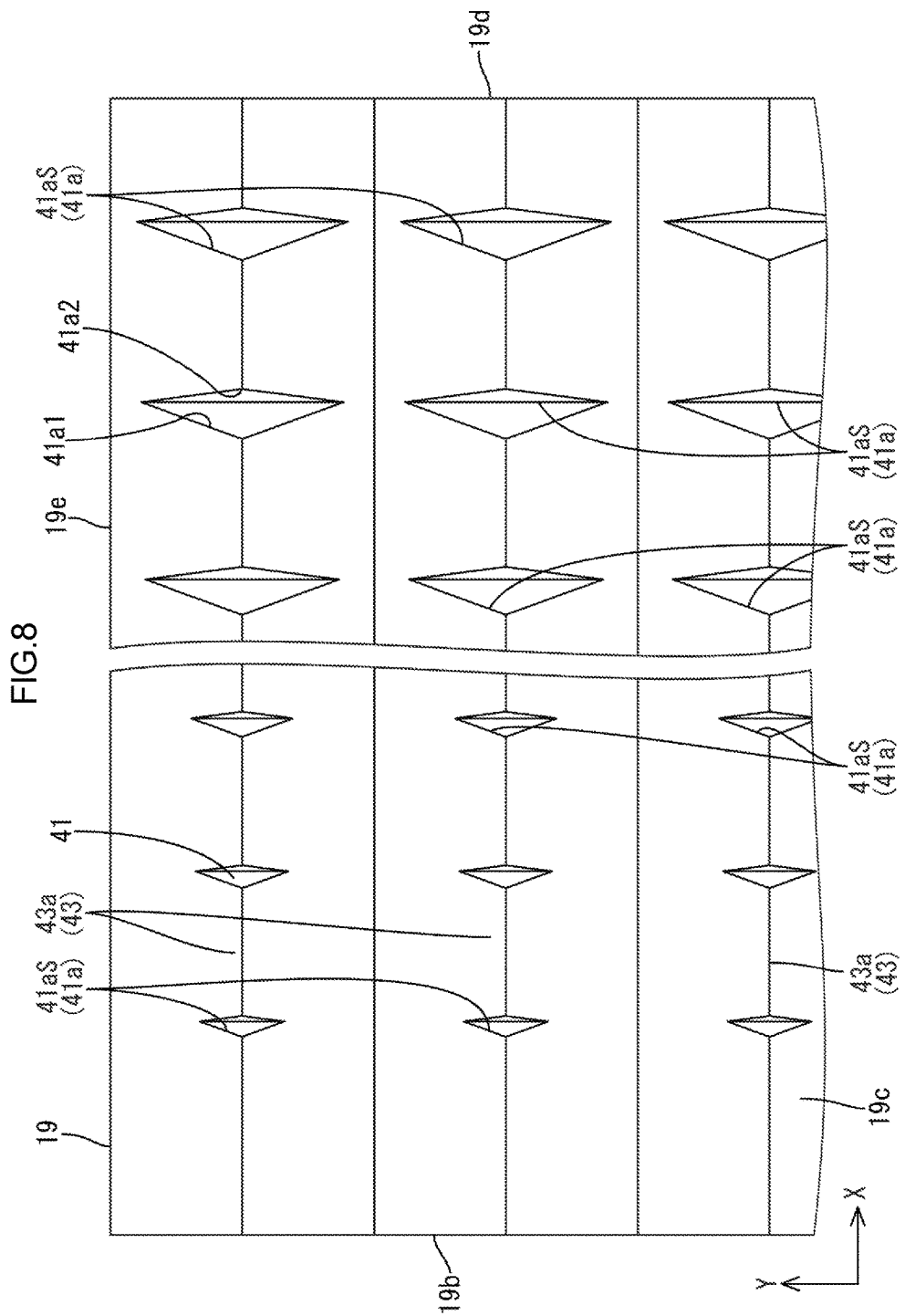
FIG. 8 is a magnified plan view illustrating an end portion of the light guide plate on a light entering surface side and an end portion of the light guide plate on an opposite end surface side.

A relationship between the exiting light reflecting portion 41 and the prism portion 43 on the opposite plate surface 19c of the light guide plate 19 will be described in detail. As illustrated in FIGS. 7 and 10, the unit reflectors 41a of the exiting light reflecting portion 41 are formed by cutting portions of the unit prisms 43a of the prism portion 43 on the vertex 43a2 side. The unit reflectors 41a are not formed by cutting portions of the bottoms of the unit prisms 43a on the opposite side from the vertex 43a2 side, that is, the bottoms are non-forming portions in which the unit reflectors 41a are not formed. The height of the unit reflectors 41a (or the dimension in the third direction) is smaller than the height of the unit prisms 43a. According to the configuration, as illustrated in FIG. 7, the unit reflectors 41a extend along the second direction but do not continuously extend for the entire length of the light guide plate 19 with respect to the second direction and have breaks. In other words, the unit reflectors 41a include segment unit reflectors 41aS that are arranged at intervals with respect to the second direction. Furthermore, the unit reflectors 41a are formed by cutting portions of the unit prisms 43a on the vertex 43a2 side such that the unit reflectors 41a open toward sides along the second direction. The number of the segment unit reflectors 41aS of the unit reflectors 41a is equal to a total number of the unit prisms 43a of the prism portion 43. A middle point of each unit reflector 41a with respect to the second direction substantially corresponds with the location of the vertex 43a2 of the corresponding unit prism 43a with respect to the second direction. The height (or the depth) of each of the unit reflectors 41a arranged with respect to the first direction gradually increases as the distance from the light entering surface (of the LEDs 17) with respect to the first direction increases (see FIG. 3). The width of the unit reflector 41a (or the area in which the unit reflector 41a is formed with respect to the second direction) gradually increases as the distance from the light entering surface 19b with respect to the first direction increases. As illustrated in FIG. 8, the width of the unit reflectors 41a arranged closer to the light entering surface 19b with respect to the first direction is smaller and the surface area thereof is smaller. The width of the unit reflectors 41a closer to the opposite end surface 19d with respect to the first direction is larger and the surface area of the unit reflectors 41a is larger.

The amount of reflected light tends to be proportional to the surface area of the unit reflectors 41a described above. To achieve a necessary amount of reflected light, the surface area needs to correspond to the necessary amount of reflected light. This applies to the exiting light reflecting portion 41. To achieve the necessary amount of reflected light by the exiting light reflecting portion 41, a total surface area of the exiting light reflecting portion 41 (or a total area including the surface area of the unit reflectors 41a) needs to correspond to the necessary amount. If the unit reflectors are formed to extend for the entire length of the light guide plate 19 in the second direction, the dimensions of the unit reflectors in the third direction cannot be increased more than specific dimensions. The unit reflectors 41a include the segment unit reflectors 41aS that are arranged at intervals with respect to the second direction. To set the surface area of the unit reflectors 41a as described above, the dimensions of the unit reflectors 41a in the third direction can be increased. In the preparation of the light guide plate 19 by molding in which the exiting light reflecting portion 41 is integrally formed with the opposite plate surface 19c, the segment unit reflectors 41aS of the unit reflectors 41a can be easily formed in designed shapes in the opposite plate surface 19c. Therefore, the exiting light reflecting portion 41 can properly deliver the optical performances. If the unit reflectors are formed to extend for the entire length of the light guide plate 19 with respect to the second direction, the number of the unit reflectors arranged with respect to the first direction may be reduced. According to the configuration, the total surface area including the surface areas of the unit reflectors may be adjusted. However, the intervals between the unit reflectors with respect to the first direction increase and thus the uneven brightness may occur. Because the unit reflectors 41a include the segment unit reflectors 41aS arranged at intervals with respect to the second direction, the number and the intervals of the unit reflectors 41a with respect to the first direction do not need to be altered. Therefore, the uneven brightness is less likely to occur in light exiting from the backlight unit 12. Furthermore, the unit reflectors 41a are formed by cutting the portions of the unit prisms 43a on the vertex 43a2 side to open along the second direction. According to the configuration, the prism portion 43 can properly deliver the light collecting performances. If the unit reflectors do not open along the second direction and have side surfaces along the first direction, light rays may be refracted at or reflected by the side surfaces along the first direction. Namely, the prisms may not deliver proper levels of light collecting performances. Because the unit reflectors 41a are formed by cutting the portions of the unit prisms 43a on the vertex 43a2 side to open along the second direction, the prism portion 43 can properly deliver the light collecting performances. According to the configuration, the brightness of the light exiting from the backlight unit can be further increased.

Comparative experiment 5 was conducted to determine how shape reproducibility of the unit reflectors 41a of the exiting light reflecting portion 41 changed between the configurations with and without the prism portion 43. In comparative experiment 5, the light guide plate 19 including the exiting light reflecting portion 41 and the prism portion 43 on the opposite plate surface 19c was referred as embodiment 1 and a light guide plate including the exiting light reflecting portions formed on the opposite plate surface but not the prism portions was referred to as comparative example 3. The configuration of the light guide plate according to comparative example 3 in comparative experiment 5 other than the prism portions that were not included was the same as the configuration of the light guide plate 19 according to embodiment 1. Unit reflectors on the light guide plate according to comparative example 3 were formed to continuously extend for the entire length of the light guide plate with respect to the second direction (or the Y-axis direction). The number of the unit reflectors with respect to the first direction (or the X-axis direction) was equal to the number of the unit reflectors 41a on the light guide plate 19 according to embodiment 1. In comparative experiment 5, heights of the unit reflectors of the light guide plate according to comparative example 3 and the light guide plate 19 according embodiment 1 were measured. Results are presented in FIG. 20. The unit reflectors were included in the light reflecting portions corresponding to positions with respect to the first direction. In comparative experiment 5, each of the light guide plates according to comparative example 3 and embodiment 1 was divided substantially equally into 6 sections with respect to the first direction. Boundaries of the sections were referred to as a first position, a second position, a third position, a fourth position, and a fifth position from the side closer to the light entering surface. The shape reproducibility of the unit reflectors 41a was determined for each position. Results are presented in FIG. 21. In FIG. 20, the vertical axis represents height of the unit reflectors (in unit of "μm") and the horizontal axis represents position on each light guide plate with respect to the first direction. The leftmost position on the horizontal axis with respect to the first direction in FIG. 20 corresponds to the light entering surface of each light guide plate. The rightmost position in FIG. 20 corresponds to the opposite end surface of each light guide plate. In FIG. 21, the heights of the unit reflectors at the first to the fifth positions and results of evaluation of the shape reproducibility of the unit reflectors are present. The shape reproducibility of the unit reflectors was evaluated based on differences between light distributions (theoretical values) regarding light exiting from a light guide plate defined in optical simulation and a light distribution (measurements) regarding the light guide plates actually produced by molding. If the differences were out of the tolerance, the shape reproducibility was determined as "bad." If the differences were within the tolerance, the shape reproducibility was determined as "good."

Results of comparative experiment 5 will be described. FIG. 20 describes that the light guide plate 19 according to embodiment 1 and the light guide plate according to comparative example 3 have heights that gradually increase from the light entering surface side to the opposite surface side. FIG. 20 also describes that the unit reflectors 41a on the light guide plate 19 according to embodiment 1 have heights larger than those of the unit reflectors on the light guide plate according to comparative example 3. This results from the fact that the unit reflectors on the light guide plate according to comparative example 3 continuously extend for the entire length of the light guide plate with respect to the second direction but the unit reflectors 41a on the light guide plate 19 according to embodiment 1 include the segment unit reflectors 41aS arranged at intervals with respect to the second direction. The reason will be described in detail below. The surface area of the unit reflectors and the amount of the light reflected by the unit reflectors are proportional to each other. To achieve the necessary amount of the reflected light, the surface area of the unit reflectors needs to be set to correspond to the target amount of the reflected light. The unit reflectors on the light guide plate according to comparative example 3 continuously extend for the entire length of the light guide plate with respect to the second direction. Therefore, the heights of the unit reflectors cannot be significantly increased to set the surface area of the unit reflectors as described above. The unit reflectors 41a on the light guide plate according to embodiment 1 include the segment unit reflectors 41aS arranged at intervals with respect to the second direction. The heights of the unit reflectors 41a can be increased in comparison to comparative example 3 to set the surface area of the unit reflectors 41a. For such a reason, the unit reflectors 41a on the light guide plate 19 according to embodiment 1 have the heights larger than those of the unit reflectors on the light guide plate according to comparative example 3.

FIG. 21 describes that the unit reflectors exert good shape reproducibility when the heights of the unit reflectors are about 3 μm or larger. At the first to the fourth positions, the shape reproducibility of the unit reflectors on the light guide plate according to comparative example 3 was determined as bad. At the fifth position, the shape reproducibility was determined as reasonably good. This was because the heights of the most unit reflectors on the light guide plate according to comparative example 2 were less than the reference (3 μm) while the heights of the most unit reflectors 41a on the light guide plate 19 according to embodiment 1 were larger than 3 μm, which was the reference for determination of the shape reproducibility of the unit reflectors. As described above, in embodiment 1, the prism portion 43 is formed on the opposite plate surface 19c of the light guide plate 19 in addition to the exiting light reflecting portion 41 and the unit reflectors 41a of the exiting light reflecting portion 41 include the segment unit reflectors 41aS. According to the configuration, the unit reflectors 41a can be formed with the sufficiently large heights. Therefore, in the production of the light guide plate 19 by molding, the segment unit reflectors 41aS of the unit reflectors 41a can be easily formed in designed shapes. This allows the exiting light reflecting portion 41 properly deliver the optical performances. To increase the heights of the unit reflectors on the light guide plate according to comparative example 3, the number of the unit reflectors with respect to the first direction may be reduced to adjust the total of the surface areas of the unit reflectors to a specific value. If the number is reduced, the intervals of the unit reflector with respect to the first direction increase and thus uneven brightness may occur in light exiting from the light guide plate. Because the unit reflectors 41a on the light guide plate according to embodiment 1 include the segment unit reflectors 41aS arranged at intervals with respect to the second direction, the number and the intervals of the unit reflectors 41a with respect to the first direction do not need to be altered, the uneven brightness is less likely to occur in the light exiting from the light guide plate 19.

As described above, the backlight unit (the lighting device) 12 according to this embodiment includes the LEDs (the light sources) 17, the light guide plate 19, the exiting light reflecting portion 41, the prism sheet (the light exiting-side anisotropic light collecting portion) 42, the prism portion 43, the concave lenticular lens portion (the lenticular lens portion) 44, and the flat portions 45. The light guide plate 19 has a rectangular plate shape including a pair of end surfaces, at least one of which is configured as the light entering surface 19b through which the light emitted by the LEDs 17 enters. The light guide plate 19 further includes the plate surfaces, one of which is configured as the light exiting surface 19a through which the light exits and the other one of which is configured as the opposite plate surface 19c. The prism sheet 42 includes the light exiting-side unit prisms (the light exiting-side unit collecting portions) 42a that extend along the first direction along the pair of end surfaces of the light guide plate which do not include the light entering surface 19b and opposite to each other. The light exiting-side unit prisms 42a are arranged along the second direction along the pair of end surfaces of the light guide plate 19 which include the light entering surface 19b. The exiting light reflecting portions 41 are arranged on one of the light exiting surface 19a and the opposite plate surface 19c of the light guide plate for reflecting the light rays traveling through the light guide plate 19 and directing the light rays to exit through the light exiting surface 19a. The exiting light reflecting portions 41 include the unit reflectors 41a that extend along the second direction and lines of which are arranged at intervals along the first direction. The prism portion 43 is formed on one of the light exiting surface 19a side and the opposite plate surface 19c side of the light guide plate 19. The prism portion 43 includes the unit prisms 43a that extend along the first direction. The unit prisms 43a are arranged along the second direction. The concave lenticular lens portion 44 is formed in the other one of the light exiting surface 19a and the opposite plate surface 19c of the light guide plate 19. The concave lenticular lens portion 44 includes the concave cylindrical lenses (the cylindrical lenses) 44a that extend along the first direction. The concave cylindrical lenses 44a are arranged along the second direction. The occupancy rate of the concave cylindrical lenses 44a with respect to the second direction is higher in the area closer to the light entering surface 19b with respect to the first direction. The occupancy rate of the concave cylindrical lenses 44a with respect to the second direction is lower in the area farther from the light entering surface 19b. The flat portions 45 are formed on the other one of the light exiting surface 19a and the opposite plate surface 19c. The flat portions 45 are flat along the first direction and the second direction. The flat portions 45 are adjacent to the concave cylindrical lenses 44a with respect to the second direction. The occupancy rate of the flat portions 45 with respect to the second direction is lower in the area closer to the light entering surface 19b with respect to the first direction. The occupancy rate with respect to the second direction is higher in the area farther from the light entering surface 19b.

According to the configuration, the light rays emitted by the LEDs 17 enter the light guide plate 19 through the light entering surface 19b and travel through the light guide plate 19. While traveling through the light guide plate 19, the light rays are reflected by the exiting light reflecting portion 41. The unit reflectors 41a of the exiting light reflecting portion 41 extend along the second direction and lines of the unit reflectors 41a are arranged at intervals along the first direction. Therefore, the unit reflectors 41a can reflect the light rays traveling along the first direction through the light guide plate 19 and direct the light rays to exit from the light exiting surface 19a. The anisotropic light collecting effects are added to at least some light rays exiting from the light exiting surface 19a by at least one of the prism portion 43 and the concave lenticular lens portion 44. The prism portion 43 and the concave lenticular lens portion 44 include the unit prisms 43a and the concave cylindrical lenses 44a, respectively. The prism portion 43 and the concave lenticular lens portion 44 extend along the first direction. The prism portion 43 and the concave lenticular lens portion 44 are arranged along the second direction. According to the configuration, the light collecting effects are selectively added to at least some of light rays exiting from the light exiting surface 19a by at least one of the unit prisms 43a and the concave cylindrical lenses 44a with respect to the second direction.

The light rays that travel along the first direction through the light guide plate 19 without being reflected by the exiting light reflecting portion 41 are totally reflected by the prism portion 43 and the concave lenticular lens portion 44. As a result, the light rays are diffused with respect to the second direction and transmitted through the light guide plate 19.

Because the concave lenticular lens portion 44 includes the concave cylindrical lenses 44a, the light rays that are totally reflected by the concave cylindrical lenses 44a are diffused in the wider area with respect to the second direction.

The anisotropic light collecting effects are added to the light rays exiting from the light guide plate 19 through the light exiting surface 19a by the prism sheet 42 on the light exiting side with respect to the light guide plate 19. The prism sheet 42 includes the light exiting-side unit prisms 42a that extend along the first direction. The light exiting-side unit prisms 42a are arranged along the second direction. According to the configuration, the light collecting effects are selectively added to the light rays exiting from the light exiting-side unit prisms 42a with respect to the second direction in which the light exiting-side unit prisms 42a are arranged. The concave cylindrical lenses 44a of the concave lenticular lens portion 44 add the anisotropic light collecting effects to the light rays reflected by the exiting light reflecting portion 41 as described above. However, the light rays to which the anisotropic light collecting effects are added are less likely to be collected by the prism sheet 42 with respect to the second direction and more likely to be diffused with respect to the second direction. The flat portions 45 adjacent to the concave cylindrical lenses 44a with respect to the second direction are less likely to add specific optical effects to the light rays reflected by the exiting light reflecting portion 41. Therefore, the anisotropic light collecting effects are dominantly added to the light rays directed to the prism sheet 42 via the flat portions 45 by the prism portion 43 and thus the light collecting effects are more likely to be added by the prism sheet 42 with respect to the second direction. As the occupancy rate of the concave cylindrical lenses 44a of the concave lenticular lens portion 44 with respect to the second direction increases and the occupancy rate of the flat portions 45 with respect to the second direction decreases, the uneven brightness of the light exiting from the prism sheet 42 with respect to the second direction is more likely to be reduced but the brightness is more likely to be decreased. As the occupancy rate of the flat portions 45 with respect to the second direction increases and the occupancy rate of the concave cylindrical lenses 44a with respect to the second direction decreases, the uneven brightness of the light exiting from the prism sheet 42 is less likely to be reduced but the brightness is more likely to be increased.

As described above, in the area closer to the light entering surface 19b with respect to the first direction, the occupancy rate of the concave cylindrical lenses 44a of the concave lenticular lens portion 44 with respect to the second direction is higher and the occupancy rate of the flat portions 45 with respect to the second direction is lower. In the area farther from the light entering surface 19b with respect to the first direction, the occupancy rate of the concave cylindrical lenses 44a with respect to the second direction is lower and the occupancy rate of the flat portions 45 with respect to the second direction is higher. In the area closer to the light entering surface 19b with respect to the first direction in which the uneven brightness resulting from the LEDs 17 are more likely to occur, with the concave cylindrical lenses 44a of the concave lenticular lens portion 44 having the higher occupancy rate, the uneven brightness is less likely to occur in the light exiting from the prism sheet 42 with respect to the second direction. In the area farther from the light entering surface 19b with respect to the first direction in which the uneven brightness resulting from the LEDs 17 is less likely to occur, with the flat portions 45 having the higher occupancy rate, the higher brightness is achieved for the light exiting from the prism sheet 42.

The exiting light reflecting portions 41 and the prism portion 43 are formed on the opposite plate surface 19c side of the light guide plate 19. The concave lenticular lens portion 44 is formed on the light exiting surface 19a side of the light guide plate 19. According to the configuration, some of the light rays reflected by the unit reflectors 41a of the exiting light reflecting portion 41 on the opposite plate surface 19c side of the light guide plate 19, to which the anisotropic light collecting effects are added by the prism portion 43, are directed to the light exiting surface 19a. The anisotropic light collecting effects are added to the light rays that have reached the light exiting surface 19a by the concave lenticular lens portion 44 that is formed on the light exiting surface 19a. In comparison to a configuration in which the exiting light reflecting portions on the light exiting surface 19a side, a light path through which the light rays reflected by the exiting light reflecting portion 41 travels before exiting from the light exiting surface 19a is simpler and losses of the light rays are less likely to occur. Therefore, a decrease in brightness is less likely to occur.

The vertex angle θv2 of each unit prism 43a of the prism portion 43 may be in the range from 90° to 100°. In comparison to the configuration in which the occupancy rate of the concave cylindrical lenses with respect to the second direction is constant, the brightness of the light exiting from the light exiting surface 19a can be sufficiently improved.

The vertex angle θv2 of each unit prism 43a of the prism portion 43 may be 100°. In comparison to the configuration in which the occupancy rate of the concave cylindrical lenses with respect to the second direction is constant, the brightness of the light exiting from the light exiting surface 19a can be improved more than others.

The vertex angle θv2 of each unit prism 43a of the prism portion 43 may be in the range from 120° to 160°. In comparison to the configuration in which the occupancy rate of the concave cylindrical lenses with respect to the second direction is constant, the brightness of the light exiting from the light exiting surface 19a can be sufficiently improved.

The vertex angle θv2 of each unit prism 43a of the prism portion 43 may be in the range from 133° to 140°. In comparison to the configuration in which the occupancy rate of the concave cylindrical lenses with respect to the second direction is constant, the brightness of the light exiting from the light exiting surface 19a can be more improved.

The concave lenticular lens portion 44 includes the concave cylindrical lenses 44a each having recessed shapes. In comparison to a configuration in which the cylindrical lenses have protruding shapes, the light rays traveling through the light guide plate 19 are more likely to enter the interfaces that are curved surfaces of the concave cylindrical lenses 44a with the angles of incidence larger than the critical angle. Therefore, the light rays are less likely to exit through the interfaces. The light rays traveling through the light guide plate 19 are more likely to be totally reflected by the concave cylindrical lenses 44a and to be diffused with respect to the second direction. Therefore, the uneven brightness is further less likely to occur with respect to the second direction.

The occupancy rate of the concave cylindrical lenses 44a of the concave lenticular lens portion 44 with respect to the second direction gradually and continuously decreases as the distance from the light entering surface 19b with respect to the first direction increases. The occupancy rate of the flat portions 45 with respect to the second direction gradually and continuously increases as the distance from the light entering surface 19b with respect to the first direction increases. In comparison to a configuration in which the occupancy rate of the concave cylindrical lenses of the concave lenticular lens portion with respect to the second direction and the occupancy rate of the flat portions with respect to the second direction are altered in steps, the uneven brightness is more properly reduced and the brightness is properly improved.

The unit reflectors 41a of the exiting light reflecting portion 41 include the segment unit reflectors 41aS arranged at intervals with respect to the second direction. The amount of light reflected by the unit reflectors 41a tends to be proportional to the surface area of the unit reflectors 41a. To achieve the necessary amount of the reflected light, the surface area need to be set corresponding to the necessary amount. If the unit reflectors are formed to extend for the entire length of the light guide plate 19 with respect to the second direction, dimensions of the unit reflectors 41a in the direction normal to the plate surface of the light guide plate 19 cannot be increased more than a certain dimension to set the surface area of the unit reflectors 41a as described above. According to the configuration in which the unit reflectors 41a include the segment unit reflectors 41aS that are arranged at intervals with respect to the second direction, the dimensions of the unit reflectors 41a in the direction normal to the plate surface of the light guide plate 19 can be increased to set the surface area of the unit reflectors 41a as described above. In the production of the light guide plate 19 by molding in which the exiting light reflecting portion 41 are integrally formed with one of the light exiting surface 19a and the opposite plate surface 19c, the segment unit reflectors 41aS of the unit reflectors 41a can be easily formed in the designed shape in the one of the light exiting surface 19a and the opposite plate surface 19c. According to the configuration, the exiting light reflecting portion 41 can properly deliver the optical performances.

If the unit reflectors are formed to extend for the entire length of the light guide plate 19 with respect to the second direction, the number of lines of the unit reflectors 41a in the first direction may be reduced to adjust the total area of the unit reflectors 41a, which is the sum of the surface areas of the unit reflectors 41a. However, by reducing the number, the intervals of the lines of the unit reflectors 41a arranged in the first direction increase. This may cause the uneven brightness. Because the unit reflectors 41a include the segment unit reflectors 41aS arranged at intervals with respect to the second direction, the number and the intervals of the lines of the unit reflectors 41a arranged in the first direction do not need to be altered. Therefore, the uneven brightness is less likely to occur in the light exiting from the backlight unit 12.

The unit reflectors 41a of the exiting light reflecting portion 41 are formed by cutting portions of the unit prisms 43a of the prism portion 43 on the vertex 43a2 side to open along the second direction. In comparison to a configuration in which the unit reflectors 41a do not open along the second direction and cover the side surfaces along the first direction, light rays may be refracted at or the reflected by the side surfaces along the first direction. Namely, the prism portion 43 may not deliver proper levels of light collecting performances. Because the exiting light reflecting portion 41 are formed such that the unit reflectors 41a are formed by the portions of the unit prisms 43a on the vertex 43a2 side to open along the second direction, the prism portion 43 can properly deliver the light collecting performances and thus the brightness related to the light exiting from the backlight unit 12 further improves.

The liquid crystal display device (the display device) 10 according to this embodiment includes the backlight unit 12 described above and the liquid crystal panel (the display panel) 11 for displaying images using the light from the backlight unit 12. According to the liquid crystal display device 10 having such a configuration, the uneven brightness is less likely to occur in the light exiting from the backlight unit 12 and the high brightness is achieved. Therefore, high display quality is achieved.

Second Embodiment

A second embodiment of the present invention will be described with reference to FIGS. 22 to 31. The second embodiment includes exiting light reflecting portions 141, a prism portion 143, a concave lenticular lens portion 144, and flat portions 145 arranged inversely to the first embodiment. Configurations, functions, and effects similar to those of the first embodiment described above will not be described.

Figure 24:
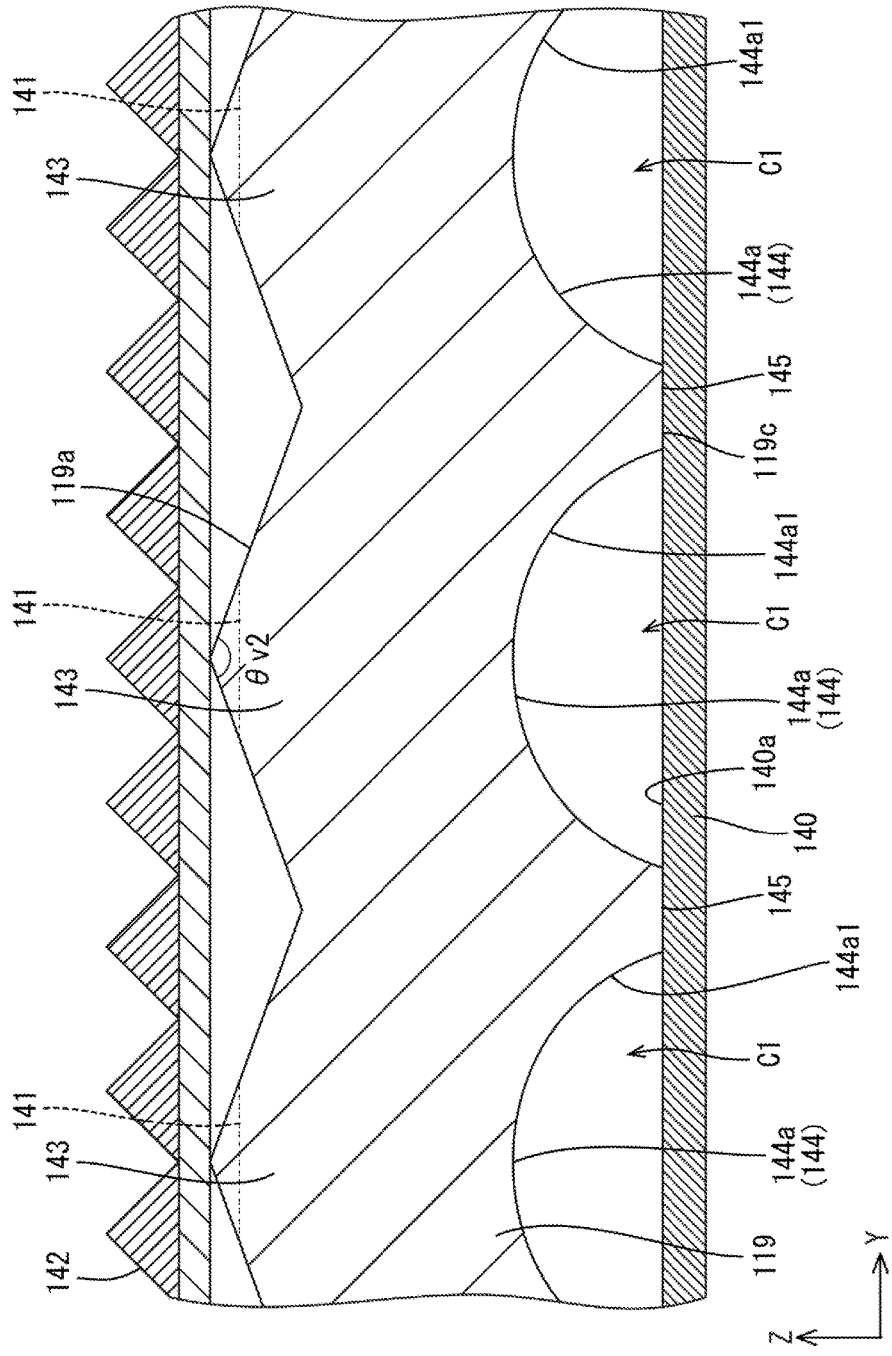
FIG. 24 is a cross-sectional view along line B-B in FIG. 22.

As illustrated in FIGS. 22 to 24, a light guide plate 119 according to this embodiment includes the exiting light reflecting portions 141 and the prism portion 143 on a light exiting surface 119a side and the concave lenticular lens portion (opposite plate surface-side lenticular lens portion) 144 and the flat portions 145 on an opposite plate surface 119c side. Structures on the surfaces 119a and 119c are arranged inversely to the structures on the plate surfaces 19a and 19c of the light guide plate according to the first embodiment described above. The prism portion 143, the concave lenticular lens portion 144, and the flat portions 145 on the light guide plate 119 have configurations similar to those of the first embodiment described above except for the arrangements on the plate surfaces 119a and 119c of the light guide plate 119. As illustrated in FIGS. 22 and 24 to 26, occupancy rates of the concave lenticular lens portion 144 and the flat portions 145 with respect to the second direction in the opposite plate surface 119c vary according to positions with respect to the first direction. In an area closer to a light entering surface 119b with respect to the first direction, the occupancy rate of the concave cylindrical lenses (opposite plate surface-side cylindrical lenses) 144a is higher and the occupancy rate of the flat portions 145 is lower. In an area farther from the light entering surface 119b (or closer to an opposite end surface 119d), the occupancy rate of the concave cylindrical lenses 144a is lower and the occupancy rate of the flat portions 145 is higher.

Figure 25:
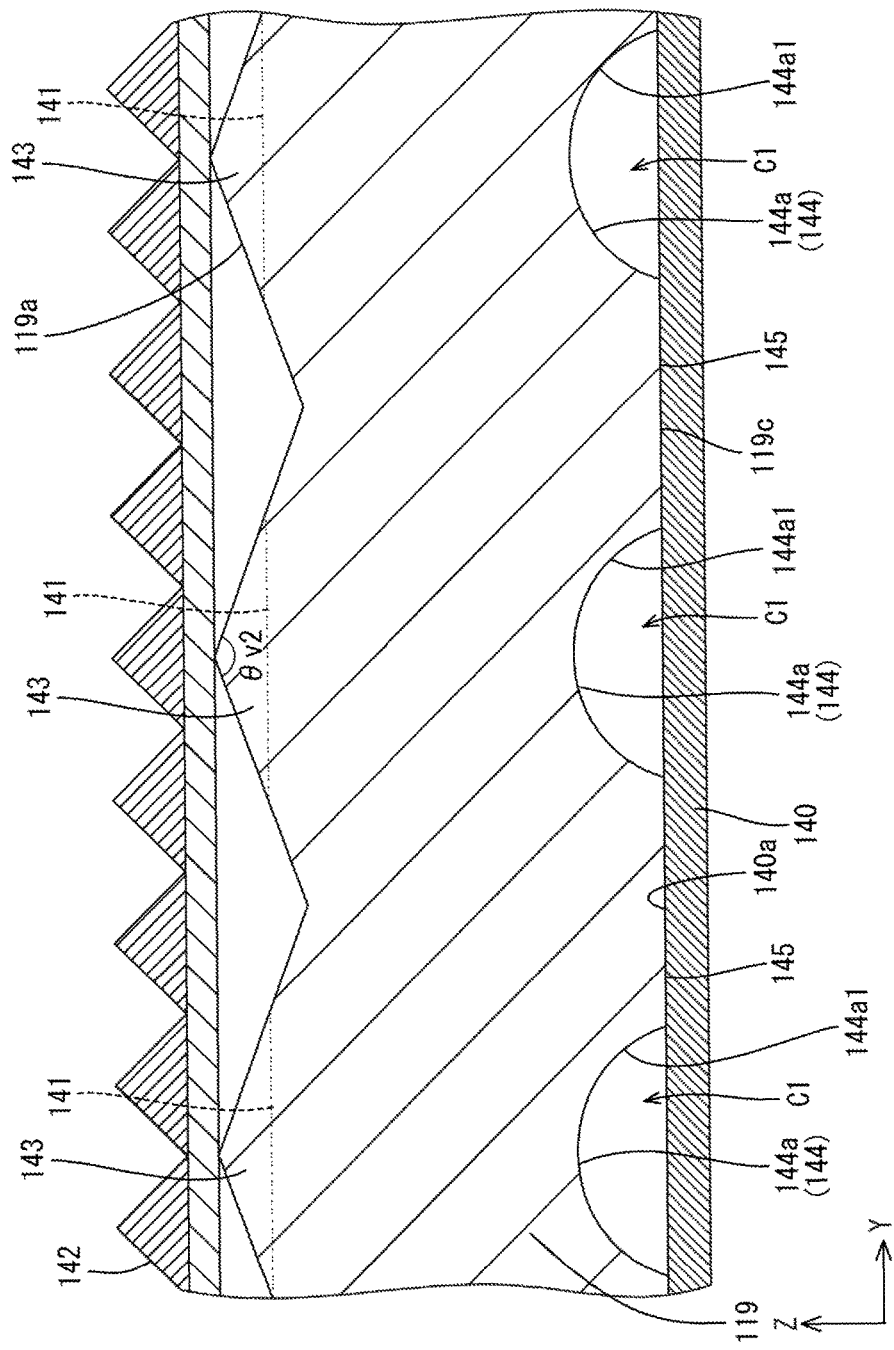
FIG. 25 is a cross-sectional view along line C-C in FIG. 22.
Figure 26:
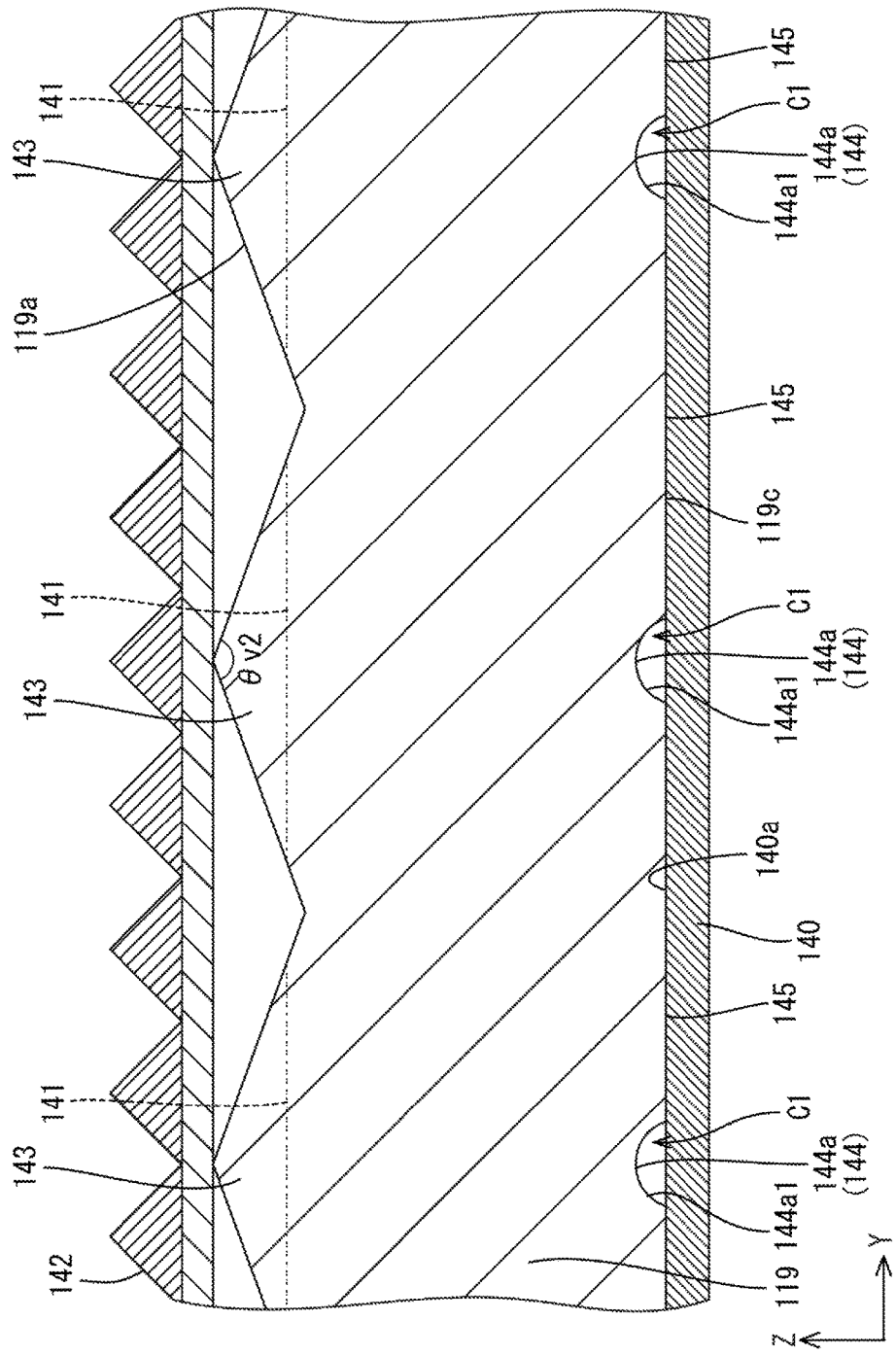
FIG. 26 is a cross-sectional view along line D-D in FIG. 22.

As illustrated in FIG. 24, predefined clearances C1 are provided between the concave cylindrical lenses 144a of the concave lenticular lens portion 144 on the opposite plate surface 119c side of the light guide plate 119 and a reflection sheet 140. The clearances C1 are air layers between the opposite plate surface 119c of the light guide plate 119 and the reflection sheet 140 and each having a refractive index of 1.0. Each clearance C1 has a height (or a dimension in the third direction) which varies according to positions with respect to the second direction (or the X-axis direction). Specifically, the height decreases as a distance from the middle of the concave cylindrical lens 144a toward either end with respect to the second direction increases. A variation in height depends on a curvature of the concave cylindrical lens 144a. As illustrated in FIGS. 24 to 26, each clearance C1 has a height that varies according to positions with respect to the first direction (or the Y-axis direction). Specifically, the height decreases as a distance from the light entering surface 119b toward the opposite end surface with respect to the first direction increases. A variation in height is equal to the variation in height of the concave cylindrical lens 144a. The flat portions 145 are adjacent to a reflecting surface 140a of the reflection sheet 140.

This embodiment includes the exiting light reflecting portions 141 on the light exiting surface 119*a* side of the light guide plate 119. Therefore, this embodiment has the following function. Light rays enter the light guide plate 119 through the light entering surface 119*b* and travel toward the opposite end surface 119*d* through the light guide plate 119 along the first direction. When the light rays reach the light exiting surface 119*a*, some of the light rays may be reflected by the exiting light reflecting portions 141 and directed to the opposite plate surface 119*c*. After the light rays reflected by the exiting light reflecting portions 141 reach the opposite plate surface 119*c*, the light rays may enter concave surfaces 144*a*1 with angles smaller than the critical angle. If the light rays enter the concave surfaces 144*a*1 with the angles smaller than the critical angle, the light rays may be refracted at the concave surfaces 144*a*1 and directed to the clearances C1 between the concave surfaces 144*a*1 and the reflection sheet 140. The light rays directed to the clearances C1 are reflected off a reflecting surface 140*a* of the reflection sheet 140. After reached the opposite plate surface 119*c* again, the light rays reflected off the reflecting surface 140*a* of the reflection sheet 140 enter the concave surfaces 144*a*1 of the concave cylindrical lenses 144*a*. The light rays are refracted at the concave surfaces 144*a*1 and directed to the light exiting surface 19*a*. Every time when the light rays enter the opposite plate surface 119*c* and exit from the opposite plate surface 119*c* via the clearances C1, anisotropic light collecting effects are added to the light rays by the concave cylindrical lenses 144*a*. Namely, light collecting effects with respect to the second direction are selectively added to the light rays by the concave cylindrical lenses 144*a*. Optical effects for diffusing the light rays with respect to the second direction are added to the light rays to which the anisotropic light collecting effects are not added every time when time when the light rays enter the opposite plate surface 119*c* and exit from the opposite plate surface 119*c*. The light rays to which the anisotropic light collecting effects are not added by the concave cylindrical lenses 144*a* are refracted twice when entering and exiting through the opposite plate surface 119*c*. As a result, the light rays are diffused in a wide area with respect to the second direction and the light rays are properly mixed with respect to the second direction. According to the configuration, the uneven brightness is less likely to occur in light exiting from the light exiting surface 119*a* with respect to the second direction. The light rays to which the anisotropic light collecting effects are added by the concave cylindrical lenses 144*a* are less likely to be collected by a prism sheet 142 with respect to the second direction but more likely to be diffused with respect to the second direction. Therefore, the light rays may improve the uneven brightness related to the light exiting from the prism sheet 142 but may not contribute to improvement of the frontward brightness.

Figure 27:
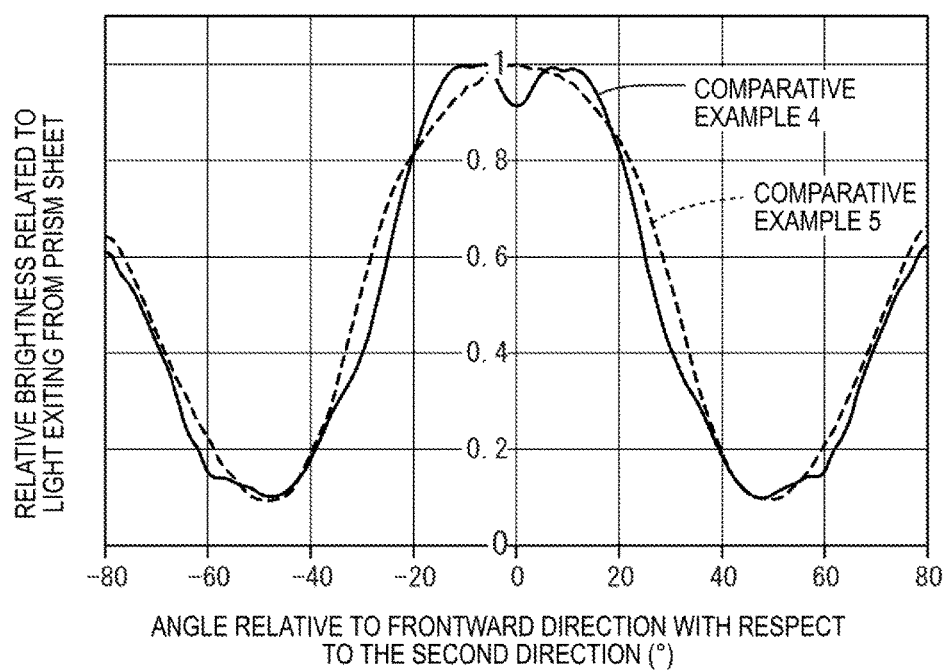
FIG. 27 is a graph illustrating brightness angle distributions of light exiting from the prism sheets after exiting from the light guide plates and traveling through the prism sheets of comparative examples 4 and 5 with respect to the second direction in comparative experiment 6.

Comparative experiment 6 was performed to determine differences in brightness distribution of light exiting from a prism sheet between a light guide plate including a flat portion formed in an entire area of an opposite plate surface and a light guide plate including concave lenticular lens portion formed in an entire area of an opposite plate surface. Each of the light guide plates includes exiting light reflecting portions and a prism portion on a light exiting side and concave lenticular lens portion on an opposite plate surface side. In comparative experiment 6, the following light guide plates were used. The light guide plate including the flat portion in the entire area of the opposite plate surface was referred to as comparative example 4. The light guide plate including the concave lenticular lens portion in the entire area of the opposite plate surface was referred to as comparative example 5. The brightness distributions of light exiting through the light guide plates according to comparative examples 4 and 6 and the prism sheets were measured. Results are presented in FIG. 27. The light guide plate according to comparative example 4 had a configuration in which structures are arranged on the plate surfaces of the light guide plate inversely from those on the light guide plate according to comparative example 1 described in comparative experiment 2. Furthermore, each prism of the prism portion had a vertex angle of 140°. Each prism sheet had a configuration similar to the prism sheet of the first embodiment. In FIG. 27, the vertical axis represents relative brightness levels of light exiting from the prism sheet (no unit) and the horizontal axis represents angle relative to the direction toward the front with respect to the second direction. The relative brightness levels represented by the vertical axis in FIG. 27 are expressed in brightness levels relative to a reference (1.0) which is a brightness level in the frontward direction (with an angle of 0°) on the light guide plate according to each of the comparative examples 4 and 5. In FIG. 27, a solid line expresses the measurements of comparative example 4 and a broken line expresses the measurements of comparative example 5.

The results of comparative experiment 6 will be described. FIG. 27 describes that the frontward brightness levels related to light exiting from the prism sheet of comparative example 4 with respect to the second direction are higher than the frontward brightness levels of comparative example 5. Specifically, the light exiting through the light guide plate of comparative example 4 and the prism sheet include a larger amount of light including light rays that travel in directions in a range ±10° of the frontward direction in comparison to the light exiting through the light guide plate of comparative example 5 and the prism sheet. On the other hand, the light exiting through the light guide plate of comparative example 4 and the prism sheet include a larger amount of light including light rays that travel in directions in a range from ±20° to ±40° of the frontward direction in comparison to the light exiting through the light guide plate of comparative example 5 and the prism sheet. Namely, a degree of collection of the light rays exiting through the light guide plate of comparative example 4 and the prism sheet with respect to the frontward direction is higher in comparison to comparative example 5. Because comparative example 5 include the concave lenticular lens portion in the entire area of the opposite plate surface, the light rays to which the anisotropic light collecting effects are added by the concave lenticular lens portion are less likely to be collected by the prism sheet with respect to the second direction. Therefore, the frontward brightness levels may decrease. Because comparative example 4 includes the flat portion in the entire area of the opposite plate surface, specific optical effects are not added to the light rays by the flat portion. Therefore, optical effects, specifically, the anisotropic light collecting effects are dominantly added to the light rays exiting from the light guide plate by the prism portion. The light rays are more likely to be collected with respect to the second direction by the prism sheet. Therefore, the frontward brightness levels may become higher.

Figure 28:
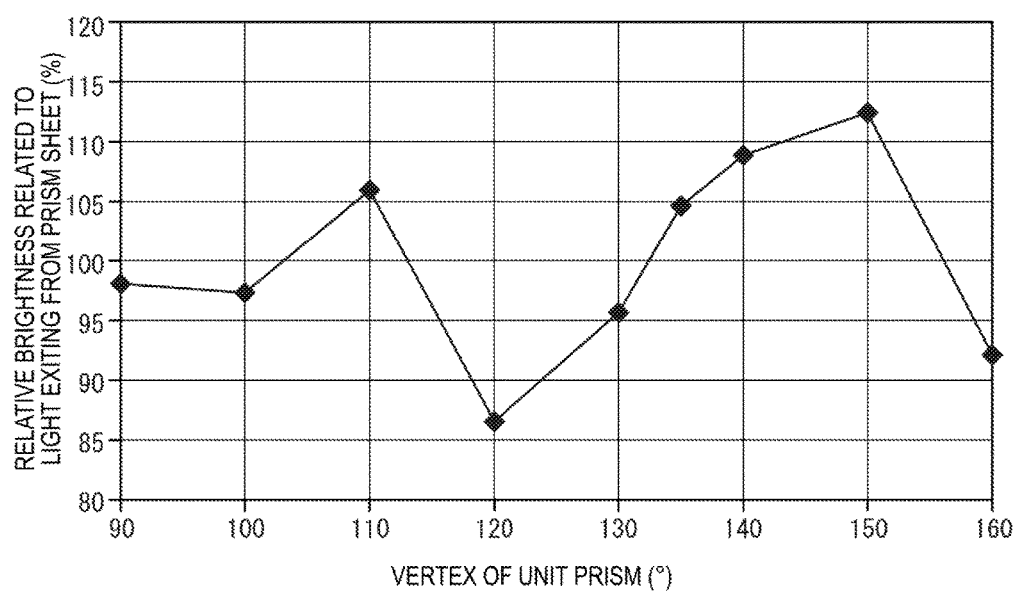
FIG. 28 is a graph illustrating relationships between vertices of unit prisms of the light guide plate and relative brightness levels of light exiting from the prism sheet in comparative experiment 7.

Comparative experiment 7 was conducted to determine how brightness levels varied as vertex angles of unit prisms of the prism portion were altered. The light guide plate used in this experiment included a flat portion formed in an entire area of the opposite plate surface of the light guide plate as in comparative example 4 in comparative experiment 6 described above. In comparative experiment 7, the light guide plate according to comparative example 4 in comparative experiment 6 was used. The vertex angles of the unit prisms of the prism portion ware altered in a range from 90° to 160°. Brightness levels of light exiting from the light guide plate through the light exiting surface and through the prism sheet placed on a light exiting side of the light guide plate were measured. The brightness levels varied as the vertex angles were altered. The results are presented in FIG. 28. In FIG. 28, the horizontal axis represents vertex angle of the unit prisms (in unit of "°") and the vertical axis represents relative brightness levels related to the light exiting from the prism sheet (in unit of "%"). The relative brightness levels related to the exiting light represented by the vertical axis in FIG. 28 are expressed in brightness levels relative to a reference. A brightness level of light exiting through the light guide plate according to comparative example 5 in comparative experiment 6 and the prism sheet was defined as the reference (100%).

The results of comparative experiment 7 will be described. FIG. 28 describes that the relative brightness levels are higher when the vertex angles of the unit prisms are in a range from 102° to 112° or a range from 132° to 156° in comparison to comparative example 5 in comparative experiment 6. When the vertex angles of the unit prisms were 110° or in a range from 135° to 155°, the relative brightness levels were 5% higher than comparative example 5. When the vertex angles of the unit prisms were 150°, the brightness levels were the highest. The relative brightness levels were 13% higher than comparative example 5. Because the flat portion was formed in the entire area of the opposite surface of the light guide plate in comparative experiment 7, specific optical effects were not added to the light rays by the flat portion. Therefore, optical effects, specifically, the anisotropic light collecting effects were dominantly added to the light rays exiting from the light guide plate by the prism portion. The preferable vertex angle of the unit prisms of the prism portion is 110° or in the range from 135° to 155°, a further preferable angle is in a range from 140° to 150°. This is also applicable to the configuration in which the concave lenticular lens portion 114 having a width that vary according to the positions with respect to the first direction and the flat portions 145 are formed on the opposite plate surface 119a of the light guide plate 119.

Figure 29:
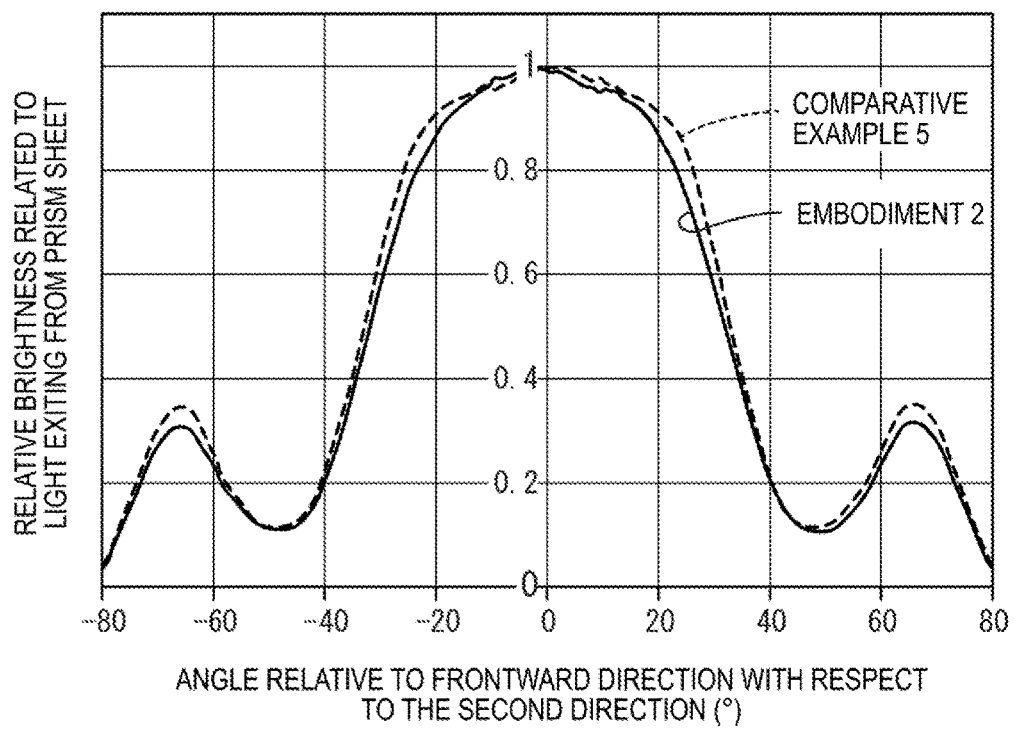
FIG. 29 is a graph illustrating brightness angle distributions of light exiting from the prism sheets after exiting from portions of the light guide plates closer to the light entering surfaces with respect to the first direction and traveling through the prism sheets of comparative example 5 and embodiment 2 with respect to the second direction in comparative experiment 8.
Figure 30:
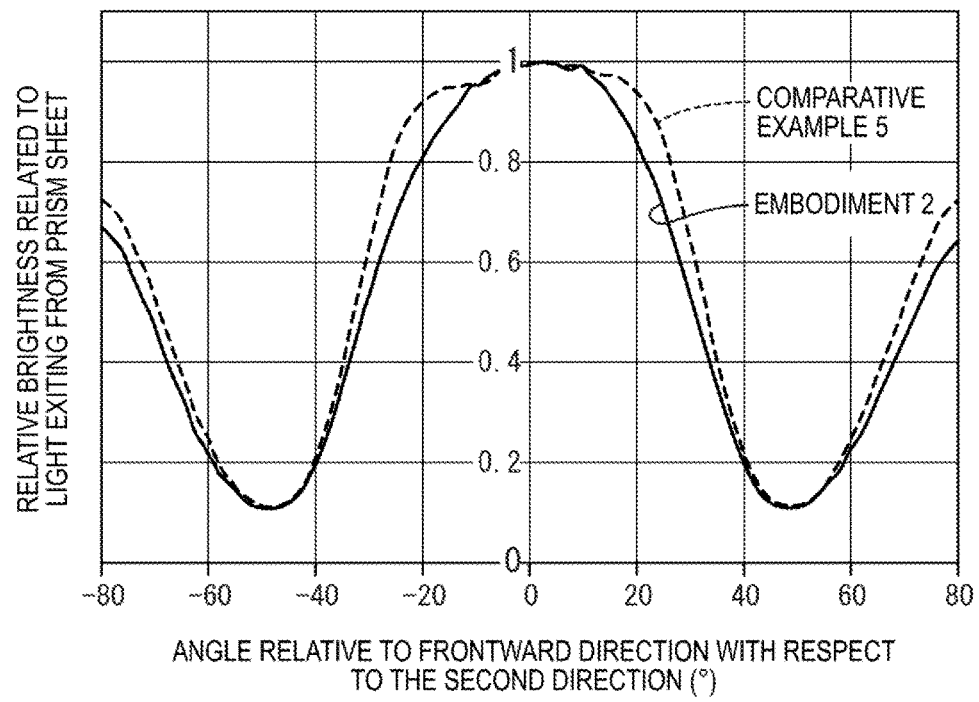
FIG. 30 is a graph illustrating brightness angle distributions of light exiting from the prism sheets after exiting from middle portions of the light guide plates with respect to the first direction and traveling through the prism sheets of comparative example 5 and embodiment 2 with respect to the second direction in comparative experiment 8.
Figure 31:
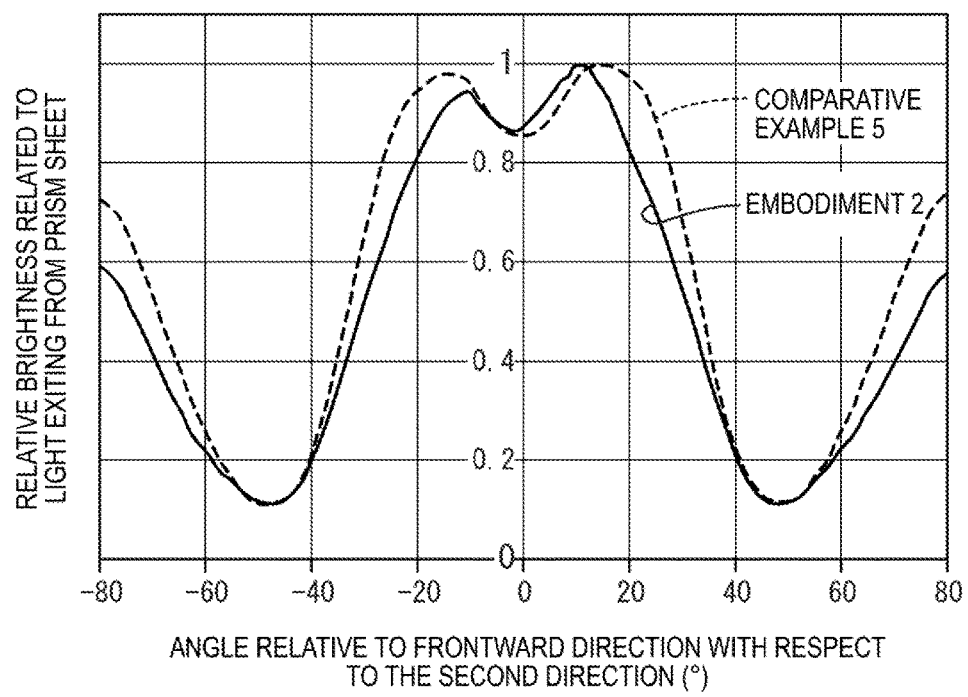
FIG. 31 is a graph illustrating brightness angle distributions of light exiting from the prism sheets after exiting from portions of the light guide plates closer to the opposite end surfaces with respect to the first direction and traveling through the prism sheets of comparative example 5 and embodiment 2 with respect to the second direction in comparative experiment 8.

Comparative experiment 8 was conducted to determine differences in brightness distribution between a configuration in which concave cylindrical lenses of concave lenticular lens portion had a constant width and a configuration in which the width was altered according to positions with respect to the first direction. In comparative experiment 8, light guide plates having the following configurations were used. The light guide plate including concave cylindrical lenses on an opposite plate surface having a width that was constant for an entire length of the light guide plate with respect to the first direction was referred to as comparative example 5. The light guide plate including the concave cylindrical lenses 144a on the opposite plate surface 119c having the width that gradually and continuously decreased as the distance from the light entering surface 119b with respect to the first direction increased was referred to as embodiment 2. The brightness distributions of the light guide plates were measured. Results of the measurement are presented in FIGS. 29 to 31. On each of comparative example 5 and embodiment 2, the brightness distributions were measured at a position closer to the light entering surface with respect to the first direction, a position at the middle, and a position closer to the opposite end surface. Measurements at the position closer to the light entering surface are presented in FIG. 29. Measurements at the position in the middle are presented in FIG. 40. Measurements at the position closer to the opposite plate surface are presented in FIG. 31. The light guide plate according to comparative example 5 has been described in the paragraphs about comparative experiment 6. The light guide plate 119 according to embodiment 2 included the concave lenticular lens portion 144 and the flat portions 145 on the opposite plate surface 119c. An occupancy rate of the concave lenticular lens portion 144 with respect to the second direction varied according to the positions with respect to the first direction. The light guide plate 119 further included the exiting light reflecting portions 141 and the prism portion 143 on the light exiting surface 119a. In the area of the light guide plate 119 according to embodiment 2 closer to the light entering surface 119b with respect to the first direction, the occupancy rate of the concave cylindrical lenses 144a of the concave lenticular lens portion 144 with respect to the second direction was higher and the occupancy rate of the flat portions 145 with respect to the second direction was lower. In the area farther from the light entering surface 119b with respect to the first direction, the occupancy rate of the concave cylindrical lenses 144a of the concave lenticular lens portion 144 with respect to the second direction was lower and the occupancy rate of the flat portions 145 with respect to the second direction was higher. The detailed configuration of the light guide plate 119 has been described in the paragraphs prior to the paragraphs that describe comparative experiment 6. The vertex angles of unit prisms 143a of the prism portion 143 on the light exiting surface 119a of the light guide plate 119 according to embodiment 2 were 140°. In FIGS. 29 to 31, the vertical axis represents relative brightness levels of light exiting from the prism sheet (no unit) and the horizontal axis represents angle (in unit of "°") relative to the frontward direction with respect to the second direction. The relative brightness levels represented by the vertical axis in FIGS. 29 to 31 are expressed in brightness levels relative to a reference. A brightness level with respect to the frontward direction (with the angle of 0°) on the light guide plate according to each of comparative example 5 and embodiment 2 was defined as the reference (1.0). In FIGS. 29 to 31, solid lines express the measurements of comparative example 5 and broken lines express the measurements of embodiment 2.

The results of comparative experiment 8 will be described. According to FIGS. 29 to 31, frontward brightness levels of the light guide plate 119 according to embodiment 2 are higher at any position with respect to the first direction in comparison to the light guide plate according to comparative example 5. In comparison between FIG. 29 and FIG. 30, in embodiment 2, the frontward brightness level at the position in the middle with respect to the first direction is higher than the frontward brightness at the position closer to the light entering surface with respect to the first direction. In comparison between FIGS. 30 and 31, in embodiment 2, the frontward brightness level at the position closer to the opposite end surface with respect to the first direction is higher than the frontward brightness level at the position in the middle with respect to the first direction. Regarding the light guide plate 119 according to embodiment 2, the frontward brightness level increased as the distance from the light entering surface 119b increased and the distance to the opposite end surface 119d decreased. Namely, the frontward brightness level was inversely proportional to the variation in width of the concave cylindrical lenses 144a. The width (or the occupancy rate with respect to the second direction)

of the concave cylindrical lenses 144a was the largest at the end position on the light entering surface 119b side with respect to the first direction and the smallest at the end position on the opposite end surface 119d side. As the width decreased, the frontward brightness level related to the light exiting through the light guide plate 119 and the prism sheet 142 was more likely to increase. With the concave cylindrical lenses 144a having the width that varied as described above and the width that was large on the light entering surface 119b side with respect to the first direction, the uneven brightness with respect to the second direction was properly reduced. At the middle or on the opposite end surface 119d side with respect to the first direction where the uneven brightness was generally less likely to occur, the width was small. Therefore, the frontward brightness related to the light exiting from the prism sheet improved. The measured brightness level of the light exiting through the light guide plate 119 according to embodiment 2 and the prism sheet 142 was about 8% higher than the configuration in which the light guide plate according to comparative example 5 was used.

As described above, this embodiment includes the reflecting member opposed to the opposite plate surface 119c of the light guide plate 119 and including the reflecting surface for reflecting light. The exiting light reflecting portions 141 and the prism portion 143 are on the opposite plate surface 119c side of the light guide plate 119. The concave lenticular lens portion 144 is on the opposite plate surface 119c side of the light guide plate 119. According to the configuration, at least some of light rays reflected by the unit reflectors 141a of the exiting light reflecting portions 141 on the light exiting surface 119a side of the light guide plate 119 travel toward the opposite plate surface 119c. The anisotropic light collecting effects are added to the light rays by the concave lenticular lens portion 144. The light rays to which the anisotropic light collecting effects are added exit from the light guide plate 119. The light rays that have exited from the light guide plate 119 are reflected by the reflecting member and returned to the opposite plate surface 119c. The light rays enter the light guide plate 119 through the opposite plate surface 119c and travel toward the light exiting surface 119a. The light rays to which the anisotropic light collecting effects are added by the prism portion 143 exit the prism portion 143. Namely, the light rays reflected by the exiting light reflecting portions 141 travel to the light exiting surface 119a in complicated paths. The light rays are subjected to refractive action at least twice when the light rays exit from the opposite plate surface toward the reflecting member and when the light rays enter the opposite plate surface 119c from the reflecting member side. Among the light rays reflected by the exiting light reflecting portions 141, the light rays to which the anisotropic light collecting effects are not added by the prism portion 143 are more likely to be diffused with respect to the second direction due to the refractive action described above. Therefore, the light rays are properly mixed and thus the uneven brightness with respect to the second direction is less likely to occur in the light exiting from the light exiting surface 119a.

The vertex angles θv2 of the unit prisms 143a of the prism portion 143 may be in the range from 135° to 155°. In comparison to the configuration in which the occupancy rate of the concave cylindrical lenses with respect to the second direction is constant, this configuration can sufficiently improve the brightness related to the light exiting from the light exiting surface 119a.

The vertex angles θv2 of the unit prisms 143a of the prism portion 143 may be 150°. In comparison to the configuration in which the occupancy rate of the concave cylindrical lenses with respect to the second direction is constant, this configuration can improve the brightness related to the light exiting from the light exiting surface 119a further than any other configurations.

The vertex angles θv2 of the unit prisms 143a of the prism portion 143 may be 110°. In comparison to the configuration in which the occupancy rate of the concave cylindrical lenses with respect to the second direction is constant, this configuration can sufficiently improve the brightness related to the light exiting from the light exiting surface 119a.

Third Embodiment

A third embodiment of the present invention will be described with reference to FIGS. 32 to 34. The third embodiment includes convex lenticular lens portion 46 instead of the concave lenticular lens portion 44 in the first embodiment. Configuration, functions, and effects similar to those of the first embodiment will not be described.

Figure 32:
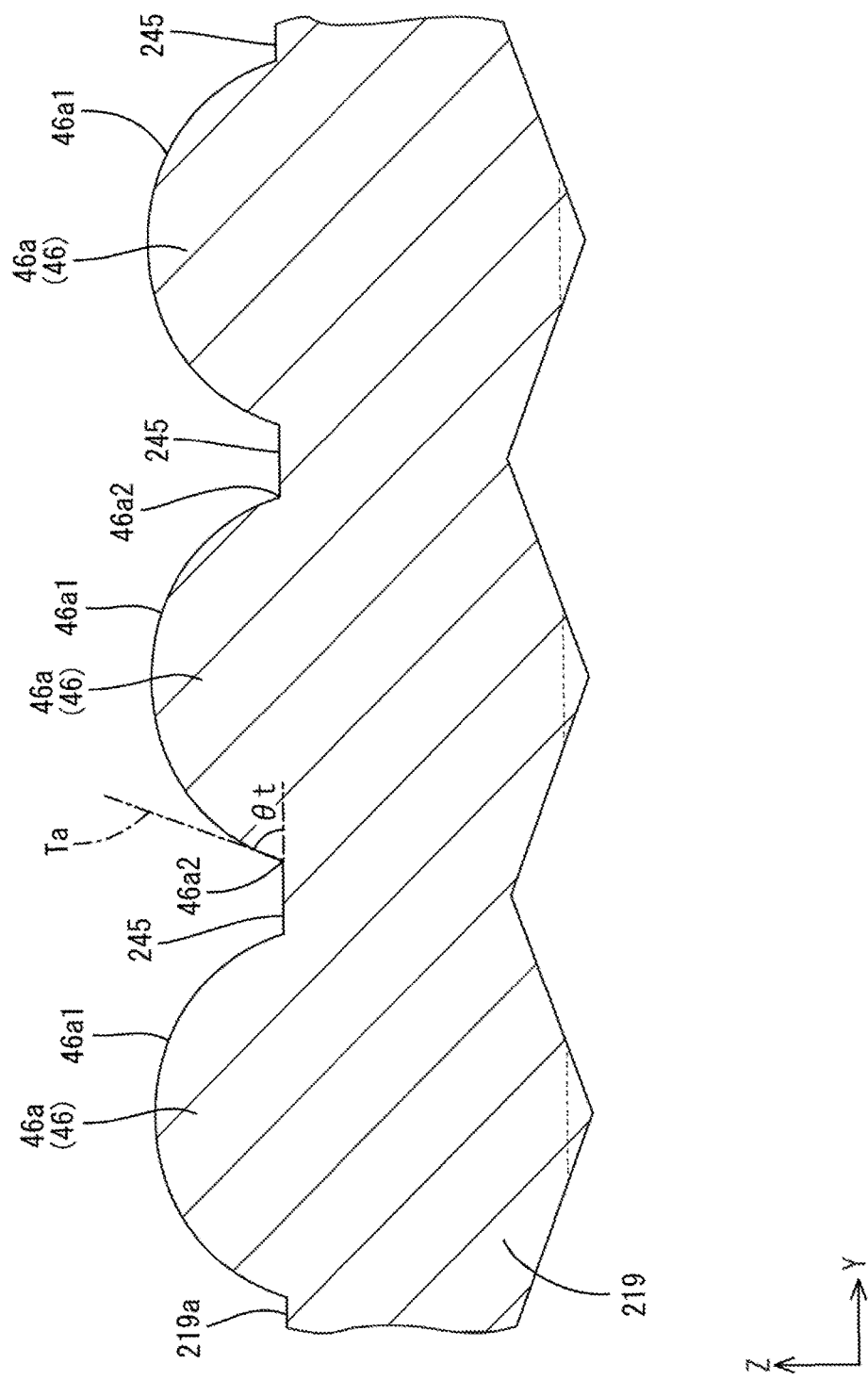
FIG. 32 is a cross-sectional view illustrating a cross-sectional configuration of a light guide plate cut at a position closer to a light entering surface with respect to the first direction along the second direction according to a third embodiment of the present invention.

As illustrated in FIG. 32, the convex lenticular lens portion (lenticular senses, light exiting surface-side lenticular senses) 46 is formed on a light exiting surface 219a of a light guide plate 219 according to this embodiment. The convex lenticular lens portion 46 includes convex cylindrical lenses (cylindrical lenses, light exiting surface-side cylindrical lenses) 46a that extend along the first direction (or the X-axis direction). The convex cylindrical lenses 46a are arranged along the second direction (or the Y-axis direction). The convex cylindrical lenses 46a are convex lenses that protrude from the light exiting surface 219a toward the front (or the light exiting side) along the third direction (or the Z-axis direction). Each of the convex cylindrical lenses 46a has a substantially semi-cylindrical shape with an axial direction thereof corresponding with the first direction. A back surface of each convex cylindrical lens 46a on the rear side is arched and referred to as an arched surface 46a1. Each convex cylindrical lens 46a has a substantially semicircular cross section along an arrangement direction (or the second direction), which is perpendicular to an extending direction (or the first direction). Each convex cylindrical lens 46a has a width (or a dimension in the second direction) which is constant in the first direction for an entire length thereof. A "tangent angle" of each convex cylindrical lens 46a is an angle of a tangent line Ta at a base end 46a2 of the arched surface 46a1 relative to the second direction. The tangent angle θt may be about 70°.

The cylindrical lenses 46a having such a configuration exert optical effects substantially the same as the optical effects exerted by the concave cylindrical lenses 44a of the first embodiment described earlier (see FIGS. 10 to 12). If light rays that have reached the light exiting surface 219a enter the arched surfaces 46a1 of the convex cylindrical lenses 46a with angles of incidence larger than the critical angle, the light rays are totally reflected by the arched surfaces 46a1. As a result, the light rays travel through the light guide plate 219 while diffusing in a wide area with respect to the second direction. According to the configuration, uneven brightness with respect to the second direction is less likely to occur. Furthermore, if the light rays that have reached the light exiting surface 219a enter the arched surface 46a1 of the convex cylindrical lenses 46a with the angles of incidence equal to or smaller than the critical angle, the light rays are refracted at the arched surfaces 46a1 and directed to the prism sheet.

Figure 33:
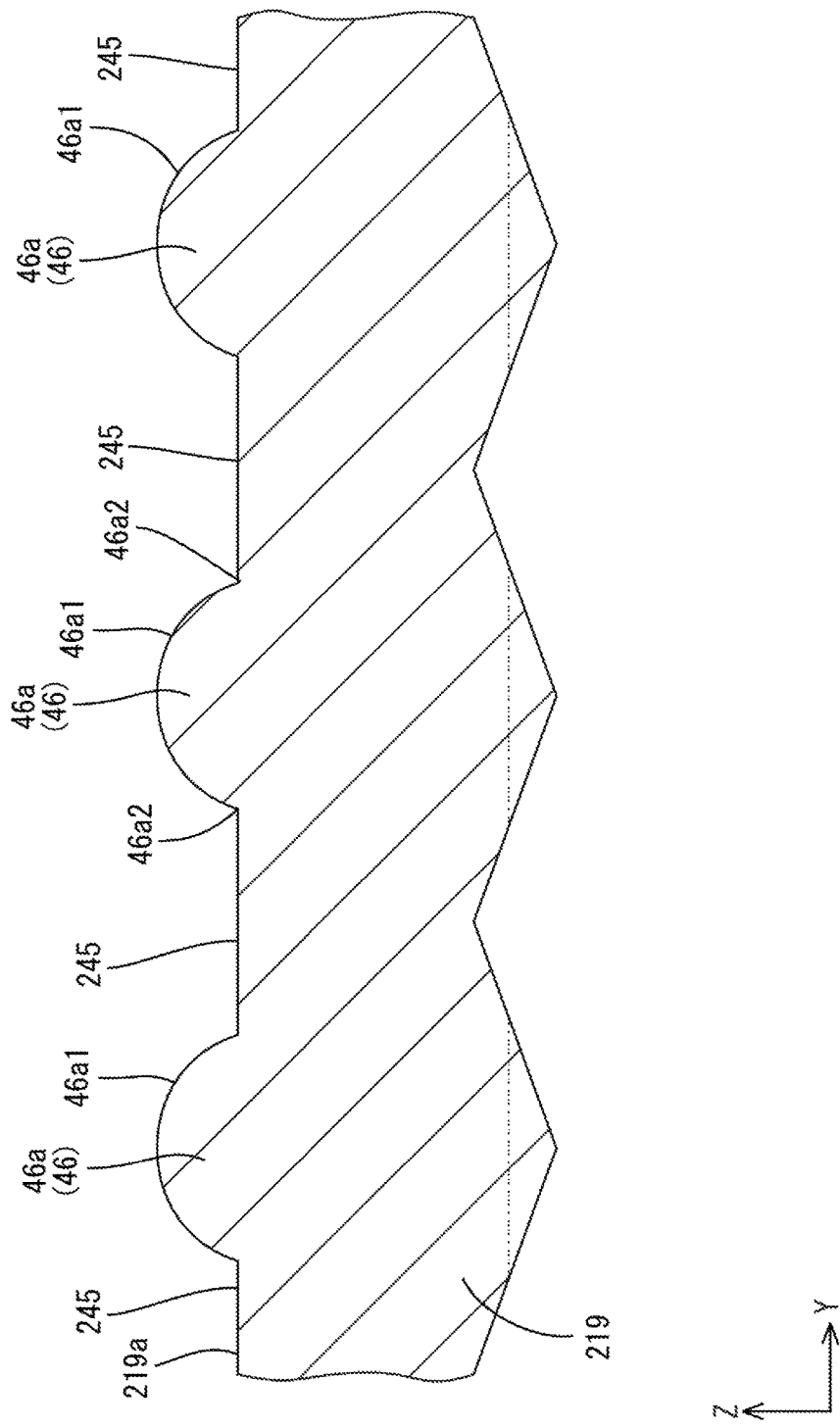
FIG. 33 is a cross-sectional view illustrating a cross-sectional configuration of the light guide plate cut at a position in the middle with respect to the first direction along the second direction.
Figure 34:
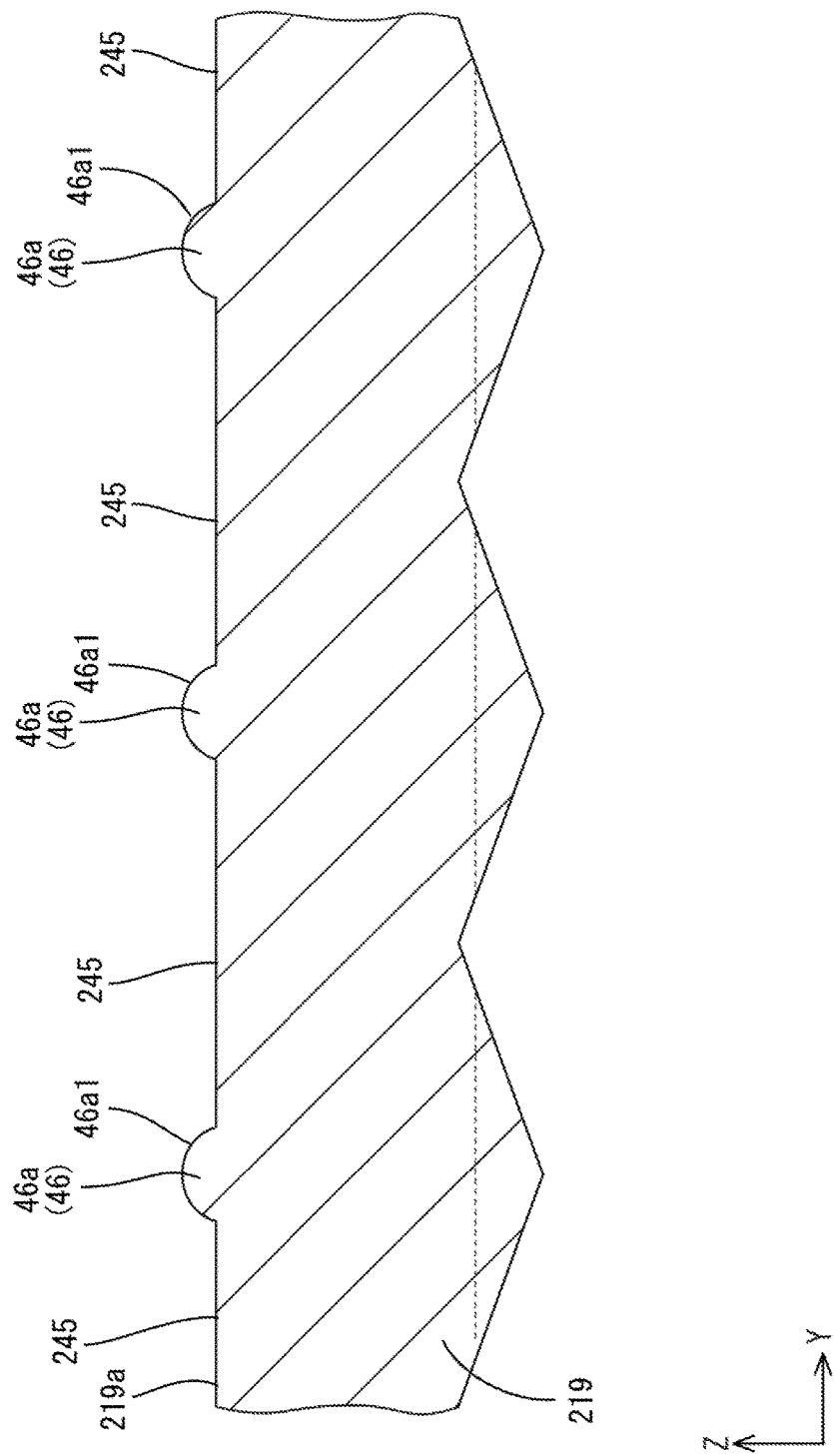
FIG. 34 is a cross-sectional view illustrating a cross-sectional configuration of the light guide plate cut at a position closer to an opposite end surface with respect to the first direction along the second direction.

As illustrated in FIGS. 32 to 34, the convex cylindrical lens 46a of the convex lenticular lens portion 46 has widths (or dimensions in the second direction) which vary according to positions with respect to the first direction. The widths of the convex cylindrical lenses 46a, that is, an occupancy rate of the convex cylindrical lenses 46a with respect to the second direction in the light exiting surface 219a gradually and continuously decreases as a distance from the light entering surface with respect to the first direction increases and a distance to the opposite end surface decreases. The widths, that is, the occupancy rate gradually and continuously increases as the distance from the opposite end surface with respect to the first direction increases and the distance to the light entering surface decreases. The occupancy rate of the convex cylindrical lenses 46a is at a maximum in an end portion (or at an end position) of the light guide plate 219 on the light entering surface side with respect to the first direction and in a range from 70% to 90%. In an end portion on the opposite end surface side, the occupancy rate is at a minimum and in a range from 10% to 30%. In the middle portion with respect to the first direction, the occupancy rate is about 50%. Furthermore, the convex cylindrical lenses 46a have heights (or dimensions in the third direction) which vary according to positions with respect to the first direction. The heights of the convex cylindrical lenses 46a, that is, dimensions from the light exiting surface 219a gradually and continuously decrease as a distance from the light entering surface with respect to the first direction increases and a distance to the opposite end surface decreases. Furthermore, the heights gradually and continuously increase as a distance from the opposite end surface with respect to the first direction increases and a distance to the light entering surface decreases. Namely, the heights of the convex cylindrical lenses 46a vary according to the positions with respect to the first direction, similarly to the widths. Therefore, a surface area of the convex cylindrical lenses 46a (or an area of the arched surfaces 46a1) varies according to positions of the first direction, similarly to the widths and the heights.

In an area of the light exiting surface 219a of the light guide plate 219 in which the convex lenticular lens portion 46 (or the convex cylindrical lenses 46a) is not formed, flat portions 245 are formed. The flat portions 245 are flat along the first direction (or the X-axis direction) and the second direction (or the Y-axis direction). The flat portions 245 are arranged adjacent to the convex cylindrical lenses 46a with respect to the second direction. Namely, the convex cylindrical lenses 46a and the flat portions 245 are alternately arranged on the light exiting surface 219a of the light guide plate 219 with respect to the second direction. The flat portions 245 have widths (or dimensions in the second direction) which vary according to positions with respect to the first direction. The widths of the flat portions 245, that is, an occupancy rate of the flat portions 245 with respect to the second direction in the light exiting surface 219a gradually and continuously decreases as a distance to the light entering surface with respect to the first direction decreases and a distance from the opposite end surface increases. Furthermore, the widths or the occupancy rate gradually and continuously increases as a distance to the opposite end surface with respect to the first direction decreases and a distance from the light entering surface increases. The occupancy rate of the flat portions 245 is at a minimum in an end portion (or at an end position) of the light guide plate 219 on the light entering surface side with respect to the first direction and in a range from 10% to 30%. In an end portion on the opposite end surface side, the occupancy rate is at a maximum and in a range from 70% to 90%. In the middle portion with respect to the first direction, the occupancy rate is about 50%.

Regarding the convex lenticular lens portion 46 and the flat portions 245, in the portion closer to the light entering surface with respect to the first direction, the occupancy rate of the convex cylindrical lenses 46a with respect to the second direction in the light exiting surface 219a of the light guide plate 219c is higher and the occupancy rate of the flat portions 245 with respect to the second direction in the light exiting surface 219a of the light guide plate 219c is lower. In the portion farther from the light entering surface with respect to the first direction, the occupancy rate of the convex cylindrical lenses 46a is lower and the occupancy rate of the flat portions 245 is higher. In the portion closer to the light entering surface with respect to the first direction in which uneven brightness due to the LEDs that are not illustrated may occur, uneven brightness with respect to the second direction is less likely to occur in light exiting from the prism sheet that is not illustrated because of the convex cylindrical lenses 46a. In the portion farther from the light entering surface with respect to the first direction in which the uneven brightness due to the LEDs is less likely to occur, the brightness of the light exiting from the prism sheet is further improved by the flat portions 245 having the higher occupancy rate. According to the configuration, the uneven brightness in the light exiting from the prism sheet is reduced and the brightness of the light is improved.

According to this embodiment, the convex lenticular lens portion 46 includes the convex cylindrical lenses 46a that are formed to protrude. In comparison to a configuration in which the cylindrical lenses are formed to concave, the light rays traveling through the light guide plate 219 are more likely to enter interfaces of the convex cylindrical lenses 46a having curved shapes with angles of incidence smaller than the critical angle. Therefore, the light rays are more likely to exit from the interfaces.

Fourth Embodiment

A fourth embodiment of the present invention will be described with reference to FIG. 35. The fourth embodiment includes a convex lenticular lens portion 346 having a configuration different from the configuration of the convex lenticular lens portion in the third embodiment. Configuration, functions, and effects similar to those of the third embodiment will not be described.

Figure 35:
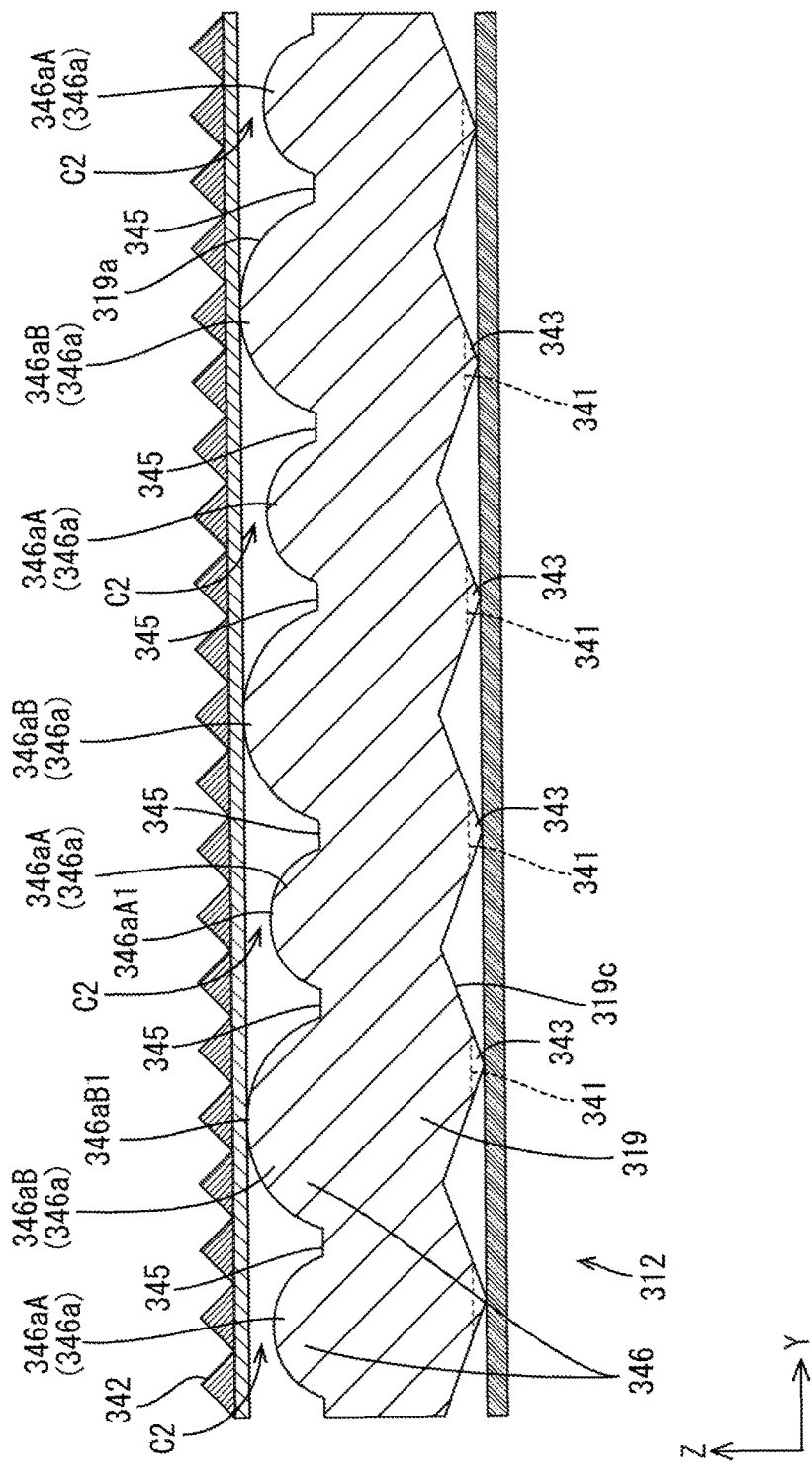
FIG. 35 is a cross-sectional view illustrating cross-sectional configurations of a light guide plate, a reflection sheet, and a prism sheet cut along the second direction according to a fourth embodiment of the present invention.

As illustrated in FIG. 35, the lenticular lens portion 346 according to this embodiment includes convex cylindrical lenses 346a. The convex cylindrical lenses 346a include first convex cylindrical lenses (first cylindrical lenses) 346aA and second convex cylindrical lenses (second cylindrical lenses) 346aB. The first convex cylindrical lenses 346aA have smaller heights and the second convex cylindrical lenses 346aB have larger heights. The first convex cylindrical lenses 346aA and the second convex cylindrical lenses 346aB have widths and heights that vary in the same manner as those of the convex cylindrical lenses 46a in the third embodiment described above. Furthermore, the first convex cylindrical lenses 346aA and the second convex cylindrical lenses 346aB have tangent angles the same as tangent angles of the convex cylindrical lenses 46a in the third embodiment. Namely, each of the first convex cylindrical lenses 346aA has a cross section similar to the cross section of each of the second convex cylindrical lenses 346aB.

A width of a bottom surface and the heights of each second convex cylindrical lens 346aB are larger than those of each first convex cylindrical lens 346aA. Specifically, the width of a bottom surface and the height of each second convex cylindrical lens 346aB are about double of the width and the height of each first convex cylindrical lens 346aA, respectively. Vertices 346aB1 of the second convex cylindrical lenses 346aB are arranged at positions higher (or closer to a prism sheet 342) than positions at which vertices 346aA1 of the first convex cylindrical lenses 346aA to contact with a back plate surface of the prism sheet 342 on the rear side (or a light guide plate 319 side). The vertices 346aA1 of the first convex cylindrical lenses 346aA are arranged at the positions lower (or farther from the prism sheet 342) than the positions at which the vertices 346aB1 of the second convex cylindrical lenses 346aB are arranged. Clearances C2 are provided between the back plate surface of the prism sheet 342 and the vertices 346aA1 of the first convex cylindrical lenses 346aA. Namely, the first convex cylindrical lenses 346aA are not in contact with the back plate surface of the prism sheet 342. According to the configuration, a contact area between the light guide plate 319 and the prism sheet 342 is smaller in comparison to the third embodiment. Furthermore, the clearances C2, which are air layers, are provided between the light guide plate 319 and the prism sheet 342 and thus the light guide plate 319 and the prism sheet 342 are less likely to be in close contact with each other. Flat portions 345 are sandwiched between the first convex cylindrical lenses 346aA and the second convex cylindrical lenses 346aB that are adjacent to one another with respect to the second direction.

As described above, in this embodiment, exiting light reflecting portions 341 and prism portions 343 are arranged on an opposite plate surface 319c side of the light guide plate 319 and the convex lenticular lens portion 346 is arranged on a light exiting surface 319a side of the light guide plate 319. The convex cylindrical lenses 346a of the convex lenticular lens portion 346 include the first convex cylindrical lenses (the first cylindrical lenses) 346aA having the smaller heights and the second convex cylindrical lenses (the second cylindrical lenses) 346AB having the larger heights. Furthermore, the clearances C2 are provided between the first convex cylindrical lenses 346aA and the prism sheet 342. With the clearances C2 between the first convex cylindrical lenses 346aA of the convex cylindrical lenses 346a and the prism sheet 342, the prism sheet 342 is less likely to be in close contact with the convex lenticular lens portion 346. Therefore, uneven brightness is less likely to occur in light exiting from the backlight unit 312.

Fifth Embodiment

A fifth embodiment of the present invention will be described with reference to FIGS. 36 to 38. The fifth embodiment includes a convex lenticular lens portion 446 similar to the convex lenticular lens portion in the third embodiment instead of the concave lenticular lens portion 144 in the second embodiment. Configuration, functions, and effects similar to those of the second and the third embodiments will not be described.

Figure 36:
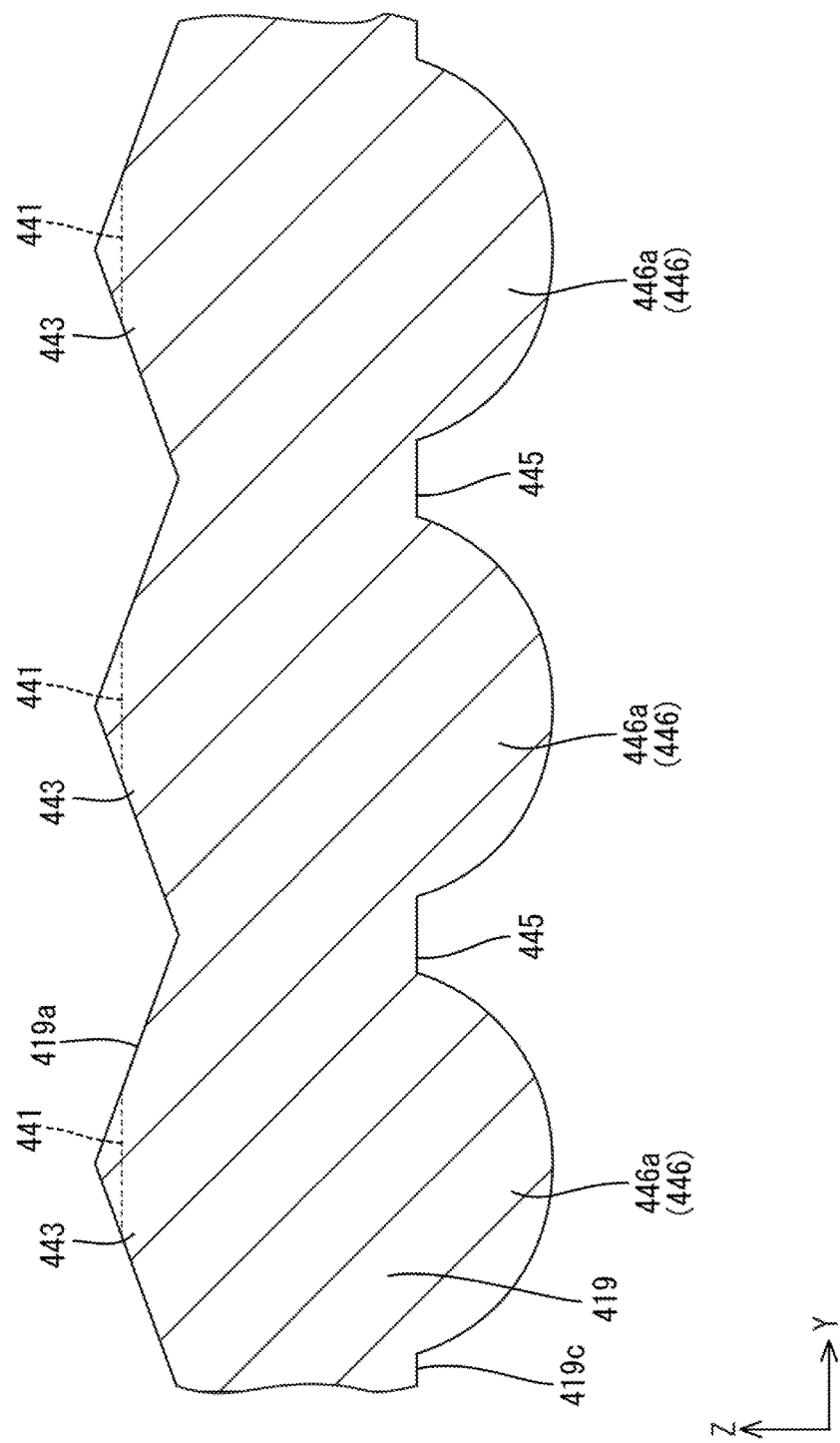
FIG. 36 is a cross-sectional view illustrating a cross-sectional configuration of a light guide plate cut at a position closer to a light entering surface with respect to the first direction along the second direction according to a fifth embodiment of the present invention.
Figure 37:
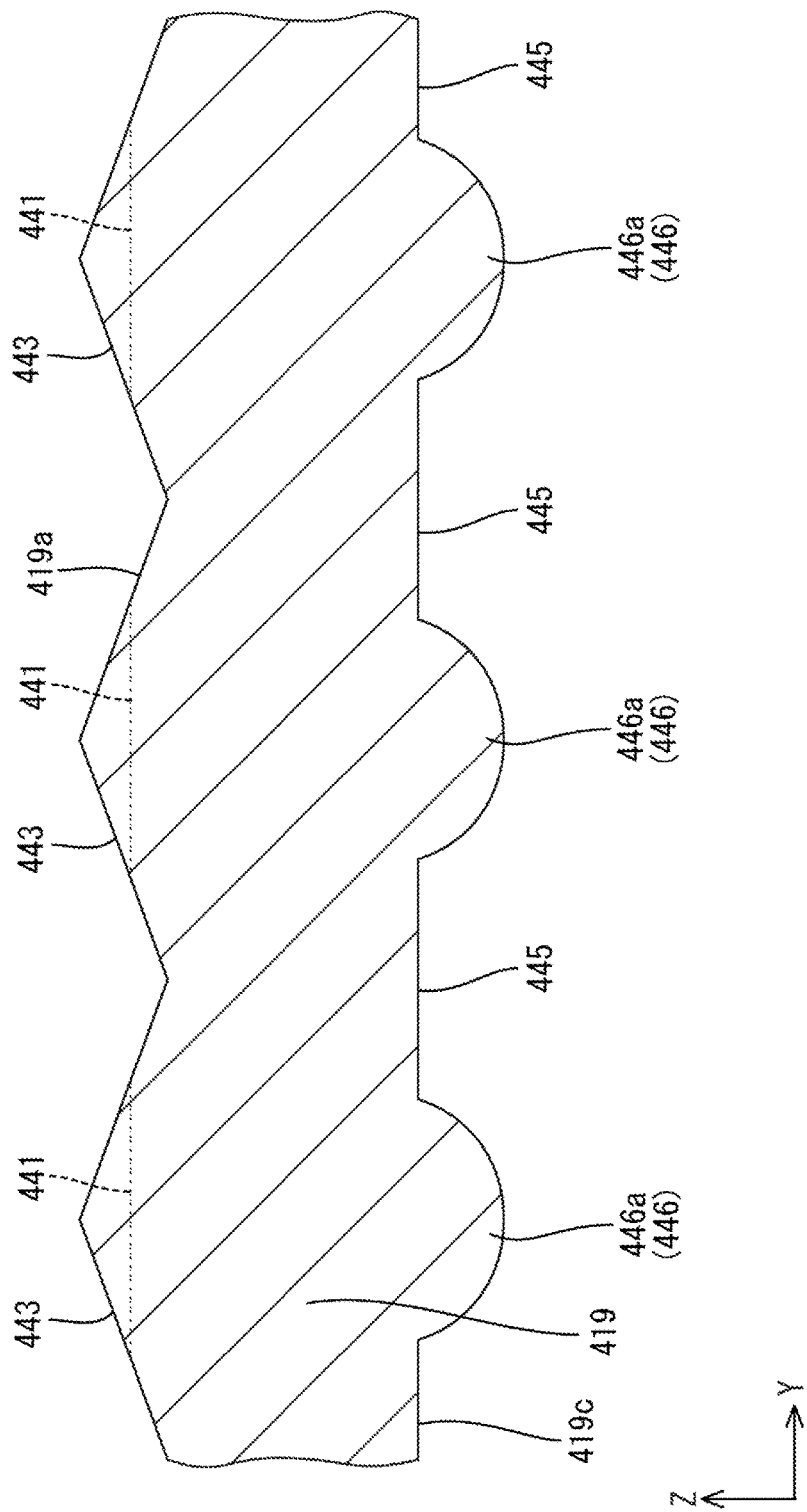
FIG. 37 is a cross-sectional view illustrating a cross-sectional configuration of the light guide plate cut at a position in the middle with respect to the first direction along the second direction.
Figure 38:
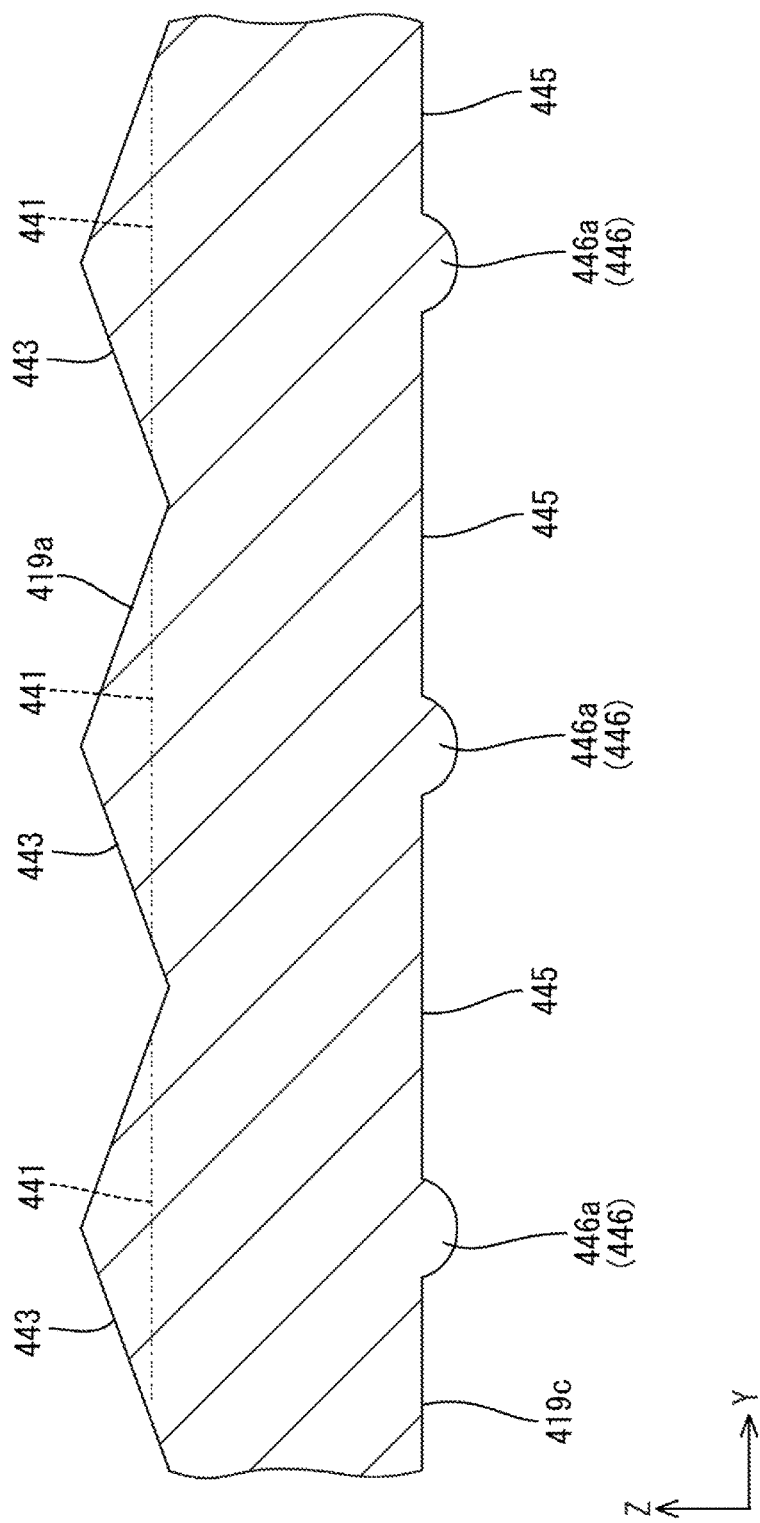
FIG. 38 is a cross-sectional view illustrating a cross-sectional configuration of the light guide plate cut at a position closer to an opposite end surface with respect to the first direction along the second direction.

As illustrated in FIGS. 36 to 38, a light guide plate 419 according to this embodiment includes exiting light reflecting portions 441 and prism portions 443 on an opposite plate surface 419c side and the convex lenticular lens portion 446 and flat portions 445 on a light exiting surface 419a side. Arrangements of structures on the plate surfaces of the light guide plate 419 are reversed from the arrangements of the structures on the plate surfaces 219a and 219c of the light guide plate 219 in the third embodiment described earlier. Configurations of the exiting light reflecting portions 441, the prism portions 443, the convex lenticular lens portion 446, and the flat portions 445 are similar to those of the third embodiment except for the arrangements on the plate surfaces 419a and 419c of the light guide plate 419. With the convex lenticular lens portion 446, the opposite plate surface 419c of the light guide plate 419 has an irregular shape. Therefore, certain clearances are provided between convex cylindrical lenses 446a arranged along the second direction and a reflection sheet that is not illustrated.

Sixth Embodiment

A sixth embodiment of the present invention will be described with reference to FIG. 39. The sixth embodiment includes a concave lenticular lens portion 544 and flat portions 545 having occupancy rates with respect to the second direction different from the occupancy rates in the first embodiment. Configuration, functions, and effects similar to those of the first embodiment will not be described.

Figure 39:
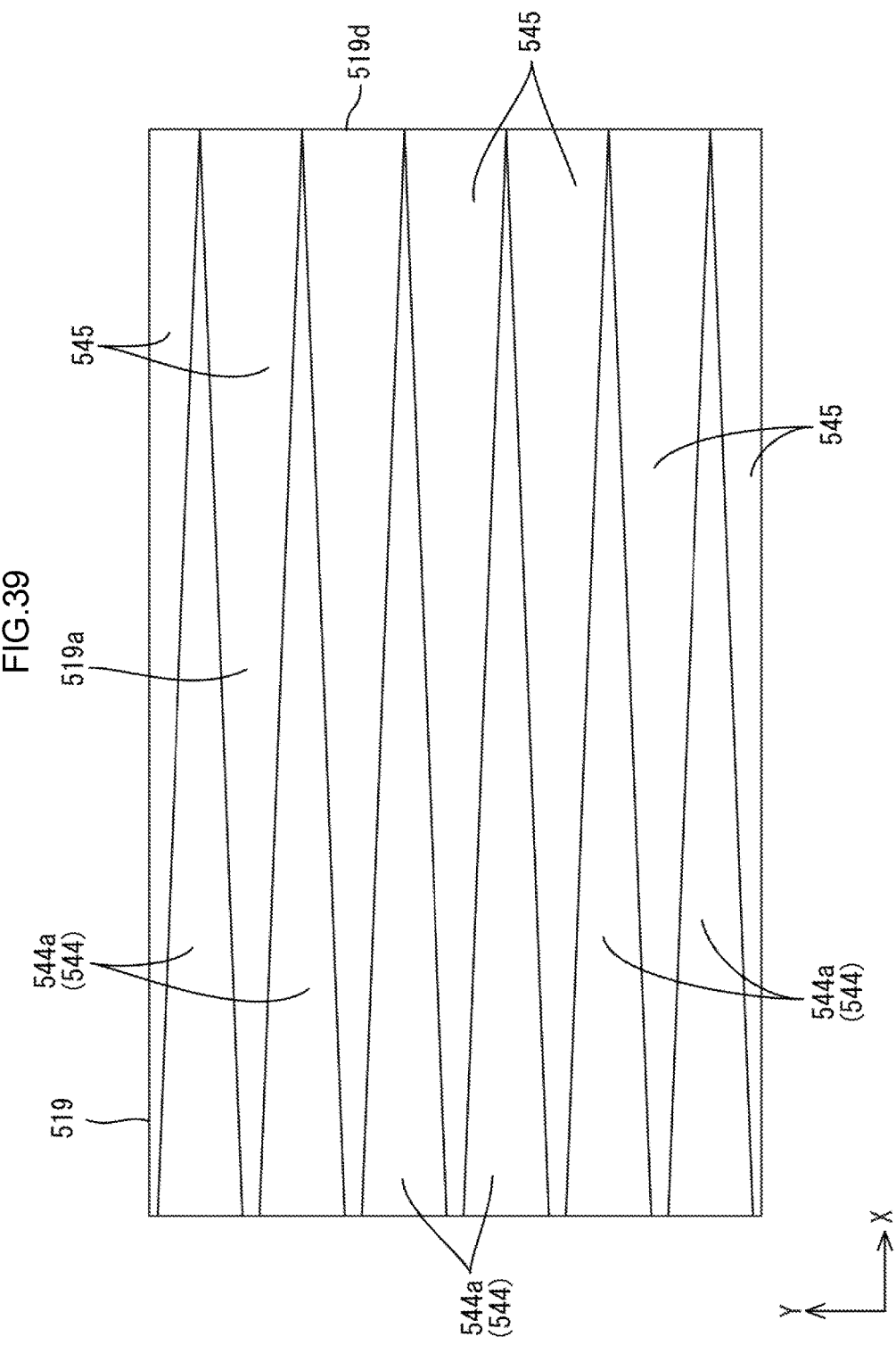
FIG. 39 is a plan view of a light guide plate according to a sixth embodiment of the present invention.

As illustrated in FIG. 39, the concave lenticular lens portion 544 according to this embodiment includes concave cylindrical lenses 544a formed such that an occupancy rate thereof with respect to the second direction in an end portion of a light exiting surface 519a on an opposite end surface 519d side is substantially 0%. Flat portions 545 are formed such that an occupancy rate thereof with respect to the second direction in the end portion of the light exiting surface 519a on the opposite end surface 519d side is substantially 100%. This configuration is especially practical in a case that a sufficient level of brightness cannot be achieved on the opposite end surface 519d side of the light guide plate 519.

Seventh Embodiment

A seventh embodiment of the present invention will be described with reference to FIG. 40. The seventh embodiment includes a convex lenticular lens portion 644 and flat portions 645 having occupancy rates with respect to the second direction different from those of the sixth embodiment. Configuration, functions, and effects similar to those of the first and the sixth embodiments will not be described.

Figure 40:
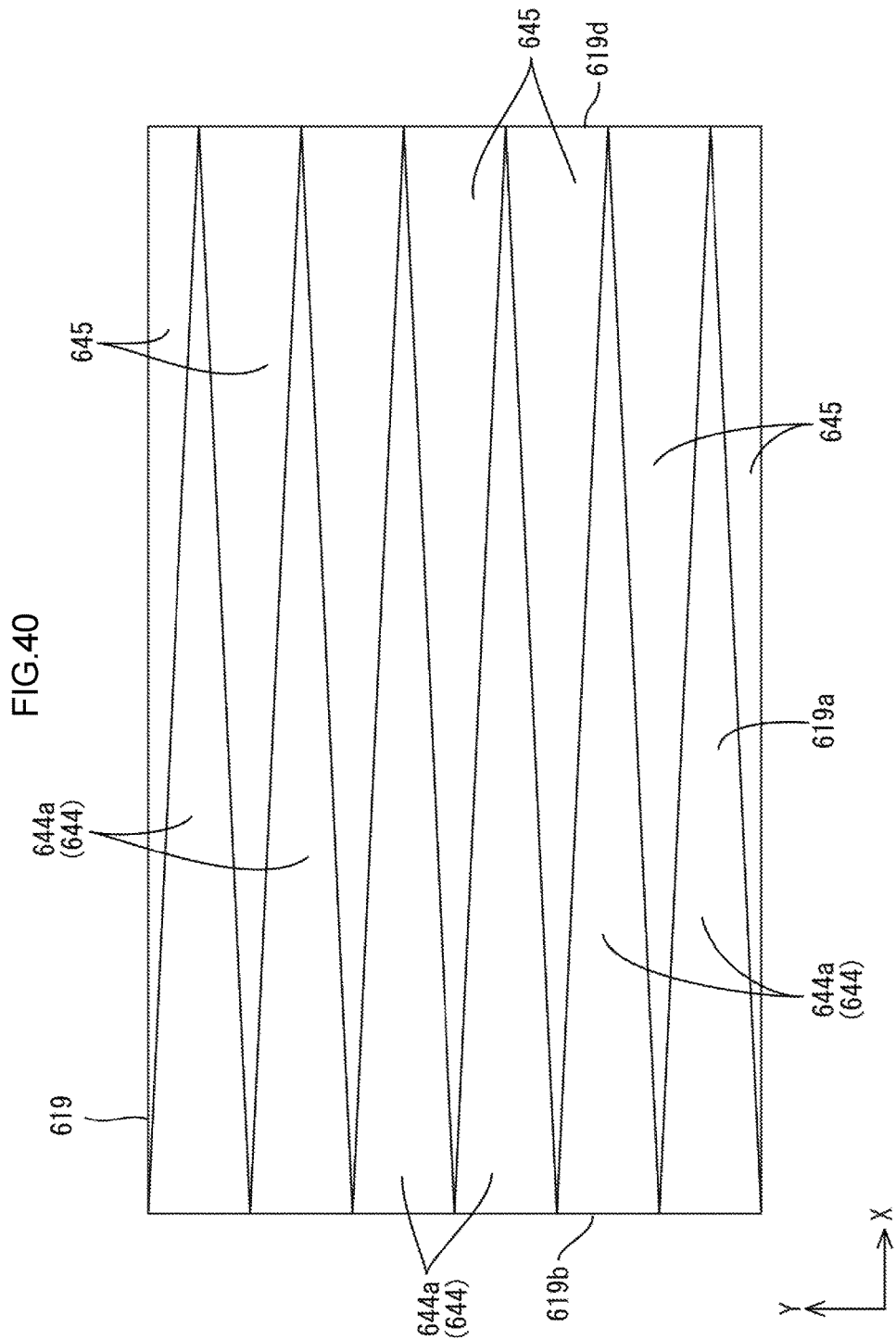
FIG. 40 is a plan view of a light guide plate according to a seventh embodiment of the present invention.

As illustrated in FIG. 40, the concave lenticular lens portion 644 according to this embodiment includes concave cylindrical lenses 644a formed such that an occupancy rate thereof with respect to the second direction in an end portion of a light exiting surface 619a on an opposite end surface 619d side is substantially 0% and in an end portion of the light exiting surface 619a on a light entering surface 619b side is substantially 100%. The flat portions 645 are formed such that an occupancy rate thereof with respect to the second direction in the end portion of the light exiting surface 619a on the opposite end surface 619d side is substantially 100% and in the end portion of the light exiting surface 619a on the light entering surface 619b side is substantially 0%. This configuration is especially practical in a case that a sufficient level of brightness cannot be achieved on the opposite end surface 619d side of the light guide plate 619 and uneven brightness is more likely to occur on the light entering surface 619b side.

Eighth Embodiment

An eighth embodiment of the present invention will be described with reference to FIG. 41. The eighth embodiment includes a convex lenticular lens portion 744 and flat portions 745 having occupancy rates with respect to the second direction different from the occupancy rates in the seventh embodiment. Configuration, functions, and effects similar to those of the first and the seventh embodiments will not be described.

Figure 41:
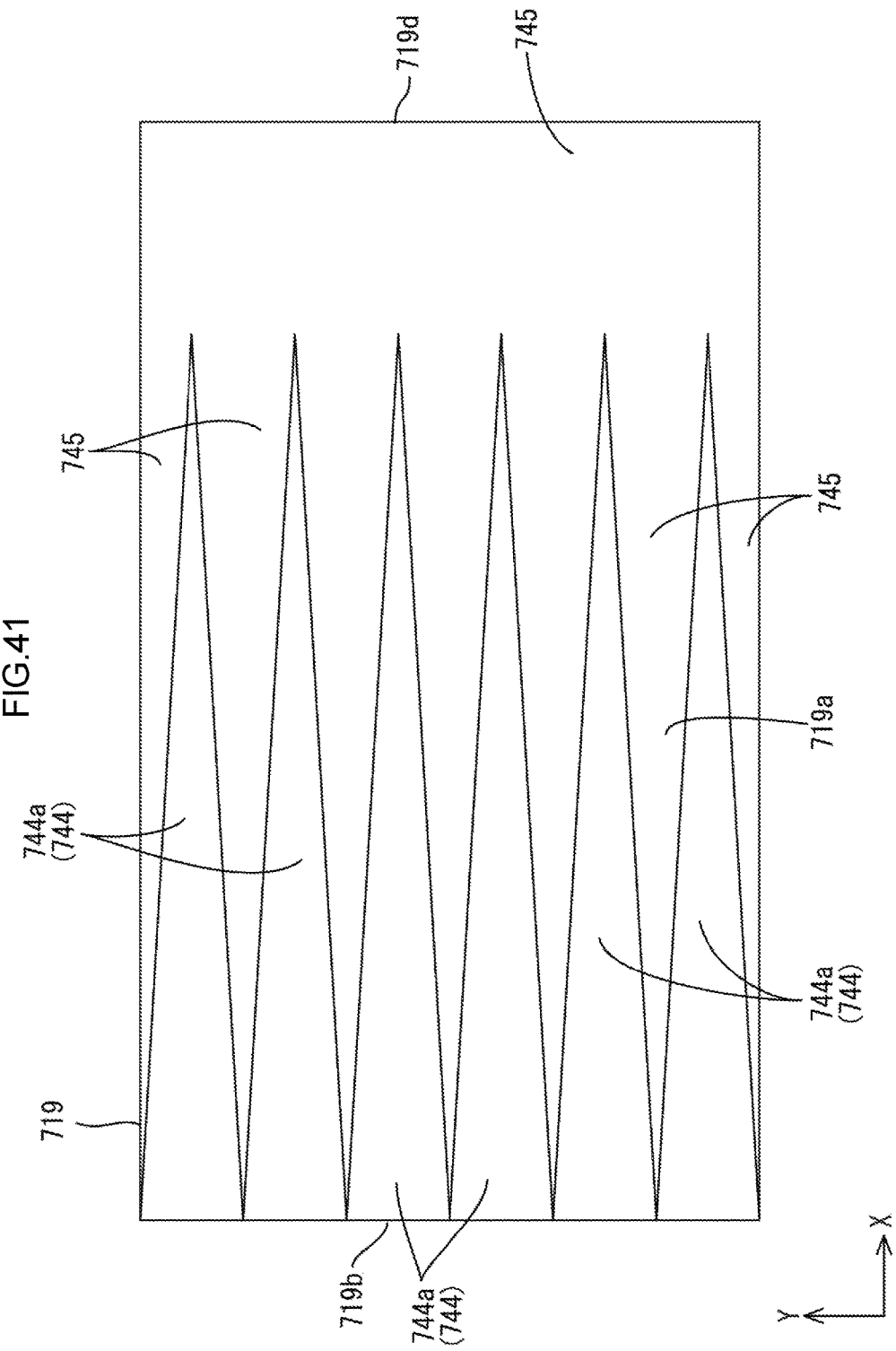
FIG. 41 is a plan view of a light guide plate according to an eighth embodiment of the present invention.

As illustrated in FIG. 41, the convex lenticular lens portion 744 according to this embodiment includes concave cylindrical lenses 744a formed such that an occupancy rate thereof with respect to the second direction in a light exiting surface 719a gradually and continuously decreases as a distance from a light entering surface 719b with respect to the first direction increases and the occupancy rate reaches 0% at a point before reaching an end on an opposite end surface 719d side. A dimension of an area in which the concave lenticular lens portion 744 is formed with respect to the first direction is smaller than the length of a light guide plate 719. The area is from an end on the light entering surface 719b side to the point before reaching the opposite end surface 719d. The flat portions 745 are formed such that an occupancy rate thereof with respect to the second direction in the light exiting surface 719a gradually and continuously increases as a distance from the light entering surface 719b with respect to the first direction increases and the occupancy rate reaches 100% at a point before reaching the end on the opposite end surface 719d side. This configuration is especially practical in a case that the sufficient level of brightness is further less likely to be achieved on the opposite end surface 719d side of the light guide plate 719.

Ninth Embodiment

A ninth embodiment of the present invention will be described with reference to FIG. 42. The ninth embodiment includes a convex lenticular lens portion 844 and flat portions 845 having occupancy rates with respect to the second direction different from those of the first embodiment. Configuration, functions, and effects similar to those of the first embodiment will not be described.

Figure 42:
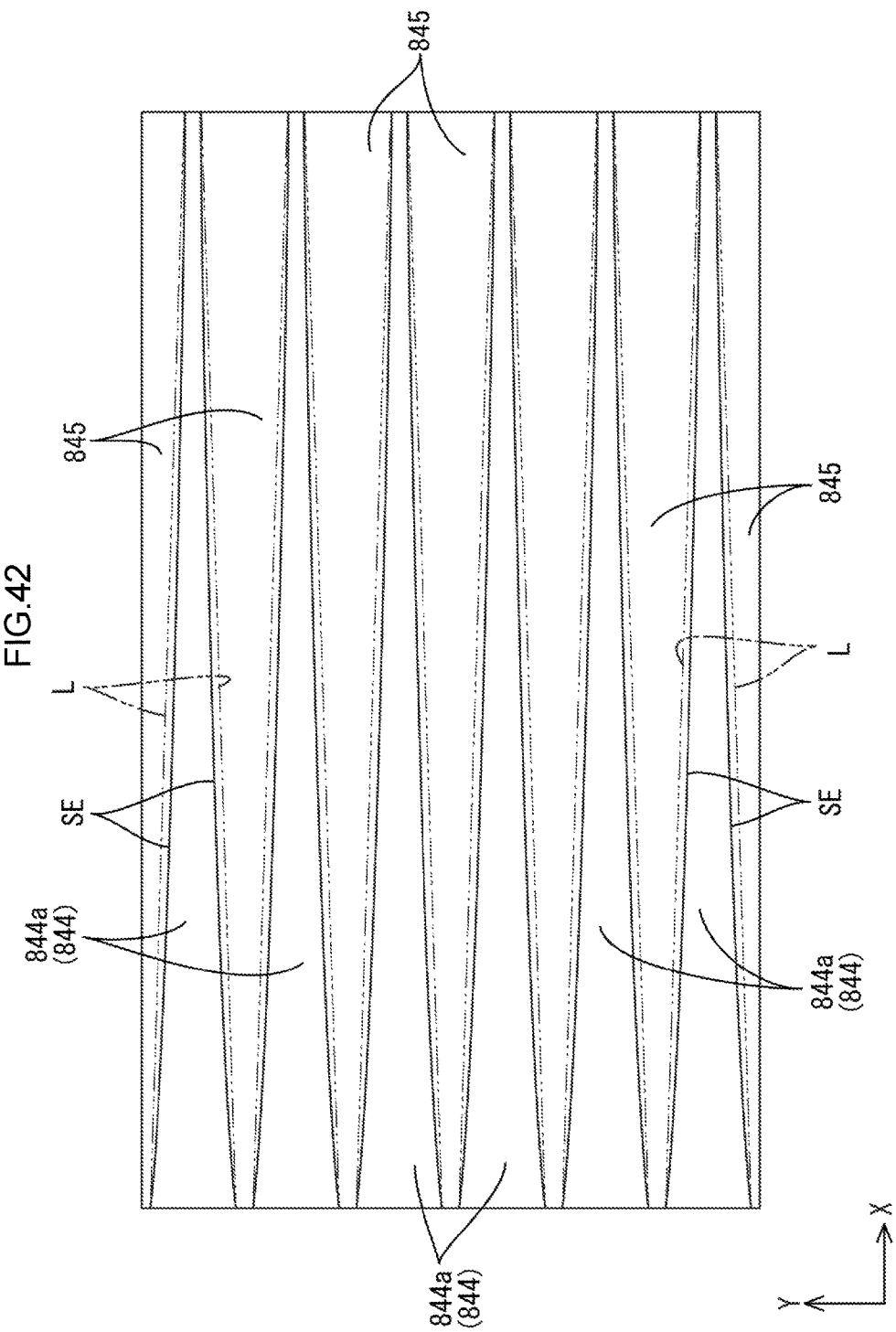
FIG. 42 is a plan view of a light guide plate according to a ninth embodiment of the present invention.

As illustrated in FIG. 42, the concave lenticular lens portion 844 (or concave cylindrical lenses 844a) and the flat portions 845 according to this embodiment include side edges SE that define widths of the concave cylindrical lenses 844a and the flat portions 845. The side edges SE are curved in a plan view. The concave lenticular lens portion 844 and the flat portions 845 are formed such that the side edges SE run on concave cylindrical lens 844a side relative to imaginal lines L between ends of the side edges SE with respect to the first direction and other ends of the side edges SE, respectively (indicated by two-dot chain lines in FIG. 42). According to the configuration, improvement of brightness and reduction of uneven brightness can be achieved at the same time, similarly to the first embodiment described earlier.

Tenth Embodiment

A tenth embodiment of the present invention will be described with reference to FIG. 43. The tenth embodiment includes a concave lenticular lens portion 944 and flat portions 945 having occupancy rates with respect to the second direction different from those of the first embodiment. Configuration, functions, and effects similar to those of the first embodiment will not be described.

Figure 43:
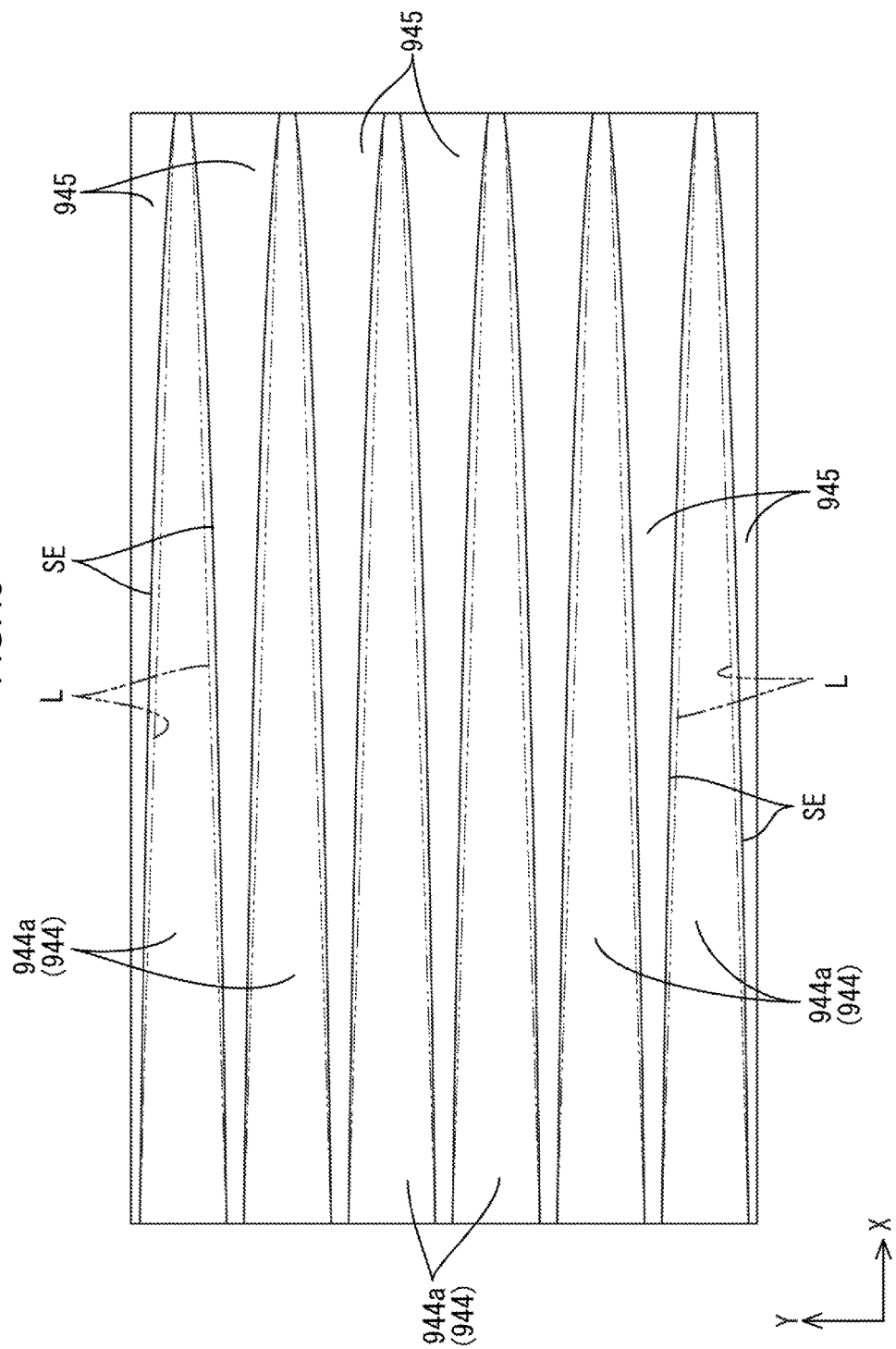
FIG. 43 is a plan view of a light guide plate according to a tenth embodiment of the present invention.

As illustrated in FIG. 43, the concave lenticular lens portion 944 (or concave cylindrical lenses 944a) and the flat portions 945 according to this embodiment include side edges SE that define widths of the concave cylindrical lenses 944a and the flat portions 945. The side edges SE are curved in a plan view. The concave lenticular lens portion 944 and the flat portions 945 are formed such that the side edges SE run on flat portion 945 side relative to imaginary lines L between ends of the side edges SE with respect to the first direction and other ends of the side edges SE, respectively (indicated by two-dot chain lines in FIG. 43). According to the configuration, improvement of brightness and reduction of uneven brightness can be achieved at the same time, similarly to the first embodiment described earlier.

Eleventh Embodiment

An eleventh embodiment of the present invention will be described with reference to FIG. 44. The eleventh embodiment includes a concave lenticular lens portion 1044 and flat portions 1045 having occupancy rates with respect to the second direction different from the occupancy rates in the first embodiment. Configuration, functions, and effects similar to those of the first embodiment will not be described.

Figure 44:
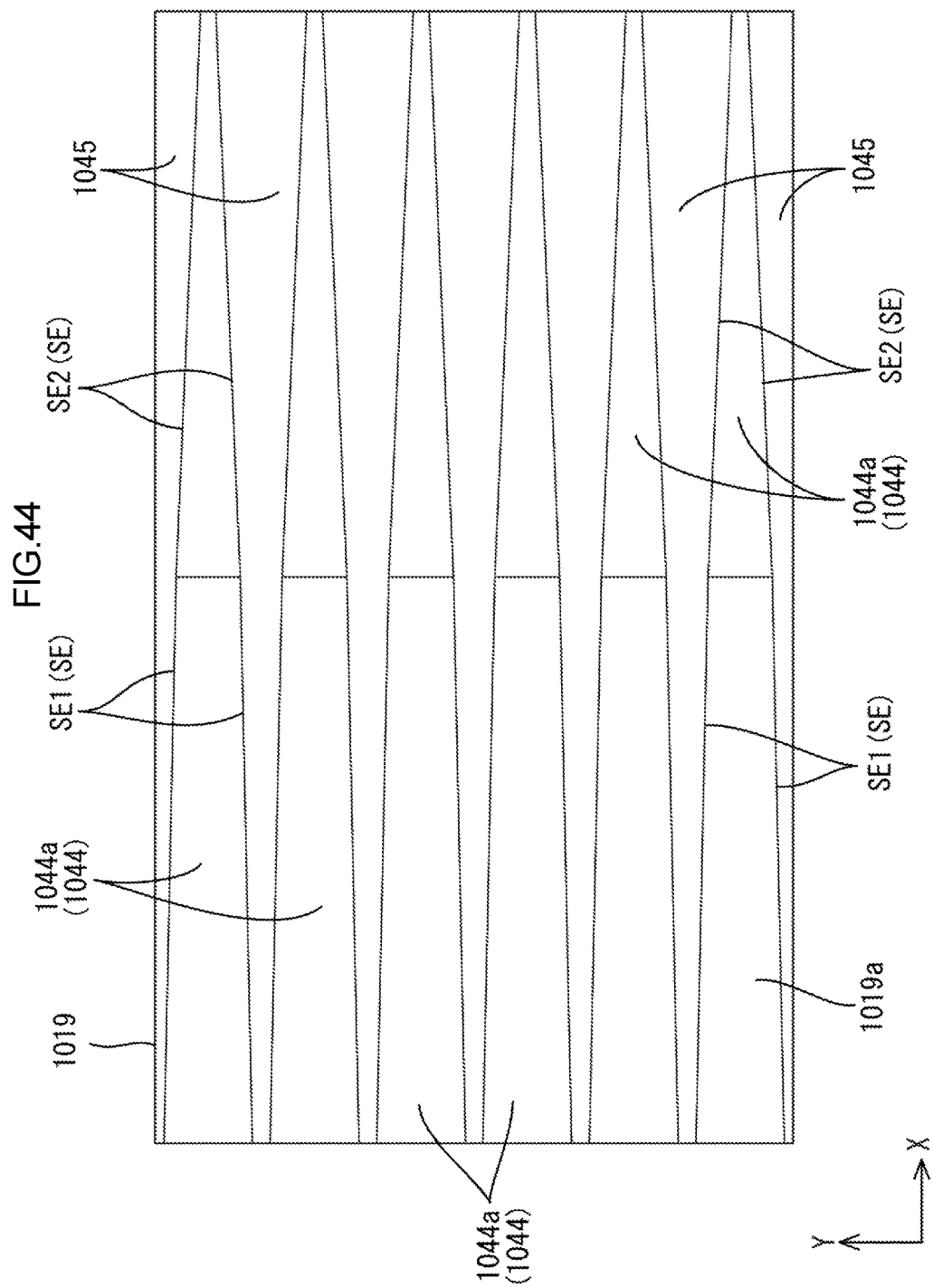
FIG. 44 is a plan view of a light guide plate according to an eleventh embodiment of the present invention.

As illustrated in FIG. 44, the concave lenticular lens portion 1044 (or concave cylindrical lenses 1044a) and the flat portions 1045 according to this embodiment include side edges SE that define widths of the concave cylindrical lenses 1044a and the flat portions 1045. Each side edge SE is angled twice in a plan view. Occupancy rates of the concave lenticular lens portion 1044 and the flat portions 1045 with respect to the second direction in a light exiting surface 1019a vary according to positions with respect to the first direction. Variation rates of the occupancy rates are altered at specified points. The side edges SE of the concave lenticular lens portion 1044 and the flat portions 1045 include first angle side edges SE1 and second angle side edges SE2. Angles of the first angle side edges SE1 are larger and angles of the second angle side edges SE2 are smaller. Boundaries between the first angle side edges SE1 and the second angle side edges SE2 substantially correspond with the middle of a light guide plate 1019 with respect to the first direction. According to the configuration, improvement of brightness and reduction of uneven brightness can be achieved at the same time, similarly to the first embodiment described earlier.

Twelfth Embodiment

A twelfth embodiment of the present invention will be described with reference to FIG. 45. The twelfth embodiment includes a concave lenticular lens portion 1144 and flat portions 1145 having occupancy rates with respect to the second direction different from those of the first embodiment. Configuration, functions, and effects similar to those of the first embodiment will not be described.

As illustrated in FIG. 45, the concave lenticular lens portion 1144 and the flat portions 1145 according to this embodiment include side edges SE that define width thereof. Each side edge SE is angled multiple times in a plan view. The concave lenticular lens portion 1144 is formed such that an occupancy rate of concave cylindrical lenses 1144a with respect to the second direction in a light exiting surface 1119a of a light guide plate 1119 decreases stepwise as a distance from a light entering surface 1119b with respect to the first direction increases and a distance to an opposite end surface 1119d decreases. An occupancy rate of the flat portions 1145 increases stepwise as the distance from the light entering surface 1119b with respect to the first direction increases and the distance to the opposite end surface 1119d decreases. The side edges SE of the concave lenticular lens portion 1144 and the flat portions 1145 include portions parallel to the first direction and portions parallel to the second direction alternately connected to one another. In this embodiment, the widths of the concave lenticular lens portion 1144 and the flat portions 1145 are increased or decreased five times.

Thirteenth Embodiment

A thirteenth embodiment of the present invention will be described with reference to FIG. 46. The thirteenth embodiment includes two LED boards 1218 including LEDs 1217 disposed on either side of a light guide plate 1219. Configuration, functions, and effects similar to those of the first embodiment will not be described. According to the configuration, improvement of brightness and reduction of uneven brightness can be achieved at the same time, similarly to the first embodiment described earlier.

As illustrated in FIG. 46, two LED boards 1218 including the LEDs 1217 according to this embodiment are disposed to sandwich the light guide plate 1219 from sides with respect to the first direction (or the X-axis direction). End surfaces on short sides among end surfaces of the light guide plate 1219 are configured as light entering surfaces 1219b through which light rays from the LEDs 1217 enter. End surfaces 1219e on long sides are configured as non-light entering surfaces through which light rays from the LEDs 1217 are not directly enter. In FIG. 46, the LEDs 1217 and the LED boards 1218 are indicated by two-dot chain lines.

To arrange the LED boards 1218 as described above, a concave lenticular lens portion 1244 and flat portions 1245 on a light exiting surface 1219a of the light guide plate 1219 are configured as follows. The concave lenticular lens portion 1244 is formed such that an occupancy rate of concave cylindrical lenses 1244a with respect to the second direction in the light exiting surface 1219a is higher on the light entering surface 1219b side with respect to the first direction and lower in the middle with respect to the first direction. The flat portions 1245 are formed such that an occupancy rate thereof is lower on the light entering surface 1219b side with respect to the first direction and higher in the middle with respect to the first direction.

Specifically, the concave lenticular lens portion 1244 is formed such that the occupancy rate (or widths) of the concave cylindrical lenses 1244a with respect to the second direction in the light exiting surface 1219a gradually and continuously decreases as a distances from either one of the light entering surfaces 1219b with respect to the first direction increases and a distance to the middle position with respect to the first direction (or to a position the farthest from either one of the light entering surfaces 1219b) decreases. The occupancy rate gradually and continuously increases as a distance from the middle with respect to the first direction increases and a distance to either one of the light entering surfaces 1219b decreases. The occupancy rate of the concave cylindrical lenses 1244a is at a maximum in end portions (closer to edges) of the light guide plate 1219 on the light entering surface 1219b sides with respect to the first direction. The occupancy rate may be in a range from 70% to 90%. The occupancy rate is at a minimum in the middle with respect to the first direction. The occupancy rate may be in a range from 10% to 30%. The occupancy rate of the flat portions 1245 gradually and continuously increases as the distance from either one of the light entering surfaces 1219b with respect to the first direction increases and the distance to the middle with respect to the first direction decreases. The occupancy rate gradually and continuously decreases as the distance from the middle with respect to the first direction increases and the distance to either one of the light entering surfaces 1219b decreases. The occupancy rate of the flat portions 1245 is at a minimum in the end portions of the light guide plate 1219 on the light entering surface 1219b sides with respect to the first direction. The occupancy rate may be in a range from 10% to 30%. The occupancy rate is at a maximum in the middle portion with respect to the first direction. The occupancy rate is in a range from 70% to 90%. Variation rates in the occupancy rates of the concave lenticular lens portion 1244 and the flat portions 1245 are equal to each other. According to the configuration, improvement of brightness and reduction of uneven brightness can be achieved at the same time, similarly to the first embodiment described earlier.

Other Embodiment

The present invention is not limited to the above embodiments described with reference to the drawings. The following embodiments may be included in the technical scope of the present invention.

(1) The occupancy rates of the concave cylindrical lenses and the convex cylindrical lenses with respect to the second direction in the opposite plate surfaces or the light exiting surfaces of the light guide plates may be altered from those in the above embodiments as appropriate. The occupancy rates in the end portions on the light entering surface sides with respect to the first direction may be in a range from 90% to 100% or a range from 50% to 70% and the occupancy rates in the end portions on the opposite end surface sides may be in a range from 0% to 10% or a range from 30% to 50%. The occupancy rates of the concave cylindrical lenses or the concave cylindrical lenses with respect to the second direction in the middle portions of the opposite plate surfaces of the light guide plates with respect to the first direction and the occupancy rates of the flat portions may be different from one another.

(2) The occupancy rates of the flat portions with respect to the second direction in the opposite plate surfaces or the light exiting surfaces of the light guide plates may be altered from the occupancy rates of the above embodiments. The occupancy rates in the end portions on the light entering surface sides with respect to the first direction may be in a range from 0% to 10% or a range from 30% to 50% and the occupancy rates in the end portions on the opposite end surface sides with respect to the first direction may be in a range from 90% to 100% or a range from 50% to 70%.

(3) Other than the above embodiments, the occupancy rates of the concave cylindrical lenses or the convex cylindrical lenses and the occupancy rates of the flat portions with respect to the second direction in the middle portions of the light exiting surfaces or the opposite plate surfaces of the light guide plates with respect to the first direction may be different from one another. In such configurations, the portions in which the occupancy rates are equal to one another may be altered from the middle portions with respect to the first direction to portions closer to either the light entering surfaces or the opposite end surfaces.

(4) In each of the above embodiments, the flat portions and the concave cylindrical lenses or the convex cylindrical lenses are alternately and repeatedly arranged in the second direction. However, the concave cylindrical lenses or the convex cylindrical lenses may be consecutively arranged in the second direction and multiple concave cylindrical lenses or multiple convex cylindrical lenses adjacent to one another may be sandwiched between the flat portions.

(5) In each of the above embodiments, the flat portions are formed on the opposite plate surface or the light exiting surface of the light guide plate. However, the flat portions may be formed on the opposite plate surface and the light exiting surface of the light guide plate in each of the above embodiments. In such a configuration, a prism portion may be formed and the flat portions may be arranged between unit prisms arranged along the second direction.

(6) In each of the above embodiments, each unit prism of the prism portion has the isosceles triangular cross section. However, each unit prism may have a scalene triangular cross section with all sides of different lengths or an isosceles right triangular cross section.

(7) The vertices, the heights, and the widths of the unit prisms of the prism portion and the intervals of the unit prisms with respect to the second direction may be altered from those of the above embodiments as appropriate. The vertices, the heights, and the widths of the light exiting-side unit prisms of the prism sheet and the intervals of the light exiting-side unit prisms with respect to the second direction may be altered from the vertices, the heights, and the width in the above embodiments as appropriate.

(8) The tangent lines, the heights, and the widths of the convex cylindrical lenses of the convex lenticular lens portion or the tangent lines, the heights, and the widths of the concave cylindrical lenses of the concave lenticular lens portion and the intervals of the convex cylindrical lenses or the concave cylindrical lenses may be altered from the tangent lines, the heights, the widths, and the intervals in the above embodiments as appropriate.

(9) In each of the above embodiments, the exiting light reflecting portions and the prism portion are integrally formed with the opposite plate surface or the light exiting surface of the light guide plate. However, the exiting light reflecting portions and the prism portion may be prepared as separate parts and disposed over the opposite plate surface or the light exiting surface. In such a configuration, it is preferable that the exiting light reflecting portions and the prism portion prepared as the separate parts are made of materials having the same refractive index as the refractive index of the material of the light guide plate. It is more preferable that the exiting light reflecting portions and the prism portion are made of the same material as the material of the light guide plate.

(10) In each of the above embodiments, the convex lenticular lens portion or the concave lenticular lens portion and the flat portions are integrally formed with the light exiting surface or the opposite plate surface of the light guide plate. However, the convex lenticular lens portion or the concave lenticular lens portion and the flat portions may be prepared as separate parts and disposed over the light exiting surface or the opposite plate surface of the light guide plate. In such a configuration, it is preferable that the convex lenticular lens portion or the concave lenticular lens portion and the flat portions prepared as the separate parts may be made of materials having the same refractive index as the refractive index of the material of the light guide plate. It is more preferable that the convex lenticular lens portion or the concave lenticular lens portion and the flat portions prepared as the separate parts may be made of the same material as the material of the light guide plate.

(11) The configurations of the sixth to the thirteenth embodiments may be combined with any configurations of the second to the fifth embodiments.

(12) Each of the above embodiments includes the specular reflection sheet. However, a diffuse reflection sheet may be used.

(13) Each of the above embodiments includes the optical sheet that includes a single prism sheet. However, other types of optical sheets (e.g., a diffuser and a reflection type polarizing sheet) may be added to the optical sheet. Furthermore, the optical sheet may include multiple prism sheets.

(14) In each of the above embodiments, a single LED board is disposed along the light entering surface of the light guide plate. However, a configuration including two or more LED boards disposed along the light entering surface of the light guide plate may be included in the scopes of the present invention.

(15) Each first convex cylindrical lens and each second convex cylindrical lens in the fourth embodiment described earlier have the similar cross sections. However, a configuration including first convex cylindrical lenses and second convex cylindrical lenses having non-similar cross sections may be included in the scopes of the present invention. For example, the first convex cylindrical lenses may have tangent angles or curvatures different from tangent angles or curvatures of the second convex cylindrical lenses.

(16) The convex lenticular lens portion of the fourth embodiment described earlier includes two types of the convex cylindrical lenses. However, the convex lenticular lens portion may include three or more types of convex cylindrical lenses having different heights.

(17) A modification of the fourth embodiment described earlier may include second convex cylindrical lenses with round vertices. According to the configuration, the back plate surface of the prism sheet is less likely to be scratched.

(18) In the eleventh embodiment described above, the concave cylindrical lenses and the flat portions include the side edges that define the widths of the concave cylindrical lenses and the flat portions. The side edges are angled twice in a plan view. However, the side edges may be angled three or more times in a plan view.

(19) In the twelfth embodiment described earlier, the widths of the concave cylindrical lenses and the flat portions are increased or decreased five times according to the positions with respect to the first direction. However, the widths may be increased or decreased four times or less. Furthermore, the widths may be increased or decreased six times or more.

(20) In each of the above embodiments (except for the thirteenth embodiment), one of the short peripheral surfaces of the light guide plate is configured as a light entering surface and the LED board is disposed opposite the light entering surface. However, one of the long peripheral surfaces of the light guide plate may be configured as a light entering surface and the LED board may be disposed opposite the light entering surface. The direction in which the light exiting-side unit prisms, the unit prisms, and the convex cylindrical lenses (or the concave cylindrical lenses) extend may be aligned with the short-side direction of the light guide plate. Furthermore, the width directions (or the arrangement directions) of the light exiting-side unit prisms, the unit prisms, and the convex cylindrical lenses (or the concave cylindrical lenses) may be aligned with the long-side direction of the light guide plate.

(21) A modification of the thirteenth embodiment may have a configuration in which both long peripheral surfaces are configured as light entering surfaces and LED boards are disposed opposite the long peripheral surfaces, respectively, may be included in the scope of the present invention.

(22) In each of the above embodiments, the light guide plate has the rectangular shape. However, the light guide plate may have a square shape. Furthermore, the shape of the light guide plate does not need to be complete rectangular. A part of the periphery of the light guide plate may be cut.

(23) In each of the above embodiments, the top surface light emitting type LEDs are used. However, the present invention may be applied to a configuration that includes side surface light emitting LEDs. The side surface light emitting LED includes a side surface adjacent to the mounting surface that is mounted to the LED board and configured as a light emitting surface.

(24) In each of the above embodiments, the touchscreen pattern using the projected capacitive touchscreen technology is used. Other than that, the present invention may be applied to configurations that include a touchscreen pattern using the surface capacitive touchscreen technology, a touchscreen pattern using the resistive touchscreen technology, and a touchscreen pattern using the electromagnetic induction touchscreen technology, respectively.

(25) Instead of the touchscreen in each of the above embodiments, a parallax barrier panel (a switching liquid crystal panel) including parallax barrier patterns may be used. The parallax barrier patterns are for separating images displayed on the liquid crystal panel with a parallax so that a user sees stereoscopic images (3D images, three-dimensional images). The parallax barrier panel may be used in combination with the touchscreen panel.

(26) Touchscreen patterns may be formed on the parallax barrier panel in embodiment (25) to add touchscreen functions to the parallax barrier panel.

(27) In each of the above embodiments, the liquid crystal panel of the liquid crystal display device has the screen size of about 20 inches. The screen size of the liquid crystal panel may be altered as appropriate.

(28) In each of the above embodiments, the color portions of the color filters of the liquid crystal panel are in three colors of R, G and B. However, the color portions may be in four or more colors.

(29) In each of the above embodiments, the LEDs are used as light sources. However, organic ELs or other types of light sources may be used.

(30) In each of the above embodiments, the frame is made of metal. However, the frame may be made of synthetic resin.

(31) In each of the above embodiments, the chemically toughened glass is used for the cover panel. However, a toughened glass prepared with an air-cooling toughening process (a physically toughening process) performed thereon may be used.

(32) In each of the above embodiments, the chemically toughened glass is used for the cover panel. However, a regular glass (non-toughened glass) other than the toughened glass or a synthetic resin member may be used.

(33) In each of the above embodiments, the cover panel is used for the liquid crystal display device. However, the cover panel may not be used. Furthermore, the touchscreen panel may not be used. Still furthermore, some of the components of the liquid crystal display device may be omitted as appropriate.

(34) Each of the above embodiments includes the TFTs as switching components of the liquid crystal display device. However, switching components other than the TFTs (such as thin film diodes (TFDs)) may be included in the scope of the present invention. Furthermore, a liquid crystal display device configured to display black and white images other than the liquid crystal display device configured to display color images.

EXPLANATION OF SYMBOLS

10: Liquid crystal display device (a display device)
11: Liquid crystal panel (a display panel)
12, 312: Backlight unit (a lighting device)
17, 1217: LED (a light source)
19, 119, 219, 319, 419, 519, 619, 719, 1019, 1119, 1219: Light guide plate
19a, 119a, 219a, 319a, 419a, 519a, 619a, 719a, 1019a, 1119a, 1219a: Light exiting surface
19b, 119b, 619b, 719b, 1119b, 1219b: Light entering surface
19c, 119c, 319c, 419c: Opposite plate surface
40, 140, 340: Reflection sheet (a reflecting member)
40a, 140a, 340a: Reflection surface
41, 141, 341, 441: Exiting light reflecting portion
41a: Unit reflector
42, 142, 342: Prism sheet (light exiting-side anisotropic light collecting portion)
42a: Light exiting-side unit prism (light exiting-side unit light collector)
43, 143, 343, 443: Prism portion
43a: Unit prism
44, 144, 544, 644, 744, 844, 944, 1044, 1144, 1244: Concave lenticular lens portion (lenticular lens portion)
44a, 144a, 544a, 644a 744a, 844a, 944a, 1044a, 1144a, 1244a: Concave cylindrical lens (cylindrical lens)
45, 145, 245, 345, 445, 545, 645, 745, 845, 945, 1045, 1145, 1245: Flat portion
46, 346, 446: Convex lenticular lens portion (lenticular lens portion)
46a, 346a, 446a: Convex cylindrical lens (cylindrical lens)
346aA: First convex cylindrical lens (first cylindrical lens)
346aB: Second convex cylindrical lens (second cylindrical lens)
θv2: Vertex angle
C1: Clearance
C2: Clearance

The invention claimed is:

1. A lighting device comprising:

a light source;

a light guide plate having a rectangular plate shape and including peripheral end surfaces opposite from each other and plate surfaces, at least one of the peripheral end surfaces being configured as a light entering surface through which light emitted by the light source enters, one of the plate surfaces being configured as a light exiting surface through which the light exits, the other one of the plate surfaces being defined as an opposite surface;

a light exiting-side anisotropic light collecting portion formed on a light exiting side and including light exiting-side unit light collectors extending along a first direction parallel to peripheral end surfaces of the light guide plate not including the light entering surface, the unit light collectors being arranged parallel to one another along a second direction parallel to the peripheral end surfaces including the light entering surface;

an exiting light reflecting portion formed on one of a light exiting surface side and an opposite plate surface side of the light guide plate for reflecting light traveling through the light guide plate such that the light exits from the light exiting surface, the exiting light reflecting portion including unit reflectors extending along the second direction and being arranged at intervals along the first direction;

a prism portion formed on one of the light exiting surface side and the opposite plate surface side of the light guide plate, the prism portion including unit prisms extending along the first direction and being arranged along the second direction;

a lenticular lens portion formed on the other one of the light exiting surface and the opposite plate surface of the light guide plate, the lenticular lens portion including cylindrical lenses extending along the first direction and being arranged along the second direction such that an occupancy rate of the cylindrical lenses with respect to the second direction is higher in an area closer to the light entering surface and lower in an area farther from the light entering surface; and flat portions formed on the other one of the light exiting surface and the opposite plate surface of the light guide plate, the flat portions being flat along the first direction and the second direction, the flat portions being arranged adjacent to the cylindrical lenses with respect to the second direction such that an occupancy rate of the flat portions with respect to the second direction is lower in the area closer to the light entering surface and higher in the area farther from the light entering surface, the flat portions having an occupancy rate of 0% with respect to the second direction on a light entering surface side.

2. The lighting device according to claim 1, wherein
the exiting light reflecting portion and the prism portion are formed on the opposite plate surface side of the light guide plate, and
the lenticular lens portion is formed on the light exiting surface side of the light guide plate.

3. The lighting device according to claim 1, further comprising a reflecting member including a reflecting surface for reflecting light, the reflecting member being disposed opposite the opposite plate surface of the light guide plate, wherein
the exiting light reflecting portion and the prism portion are formed on the light exiting surface side of the light guide plate, and
the lenticular lens portion is formed on the opposite plate surface side of the light guide plate.

4. The lighting device according to claim 1, wherein each of the cylindrical lenses of the lenticular lens portion has a concave shape.

5. The lighting device according to claim 1, wherein each of the cylindrical lenses of the lenticular lens portion has a convex shape.

6. The lighting device according to claim 5, wherein the cylindrical lenses have heights from the light exiting surface gradually and continuously decreasing as a distance from the light entering surface with respect to the first direction increases.

7. The lighting device according to claim 5, wherein
the exiting light reflecting portion and the prism portion are formed on the opposite plate surface side of the light guide plate,
the lenticular lens portion is formed on the light exiting surface side of the light guide plate,
the cylindrical lenses of the lenticular lens portion include a first cylindrical lens having a smaller height and a second cylindrical lens having a larger height, and
a clearance is provided between the first cylindrical lens and the light exiting-side anisotropic light collecting portion.

8. The lighting device according to claim 1, wherein the lenticular lens portion and the flat portions are formed such that the occupancy rate of the cylindrical lenses with respect to the second direction gradually and continuously decreases as a distance from the light entering surface with respect to the first direction increases and the occupancy rate of the flat portions with respect to the second direction gradually and continuously increases as the distance from the light entering surface with respect to the first direction increases.

* * * * *